US008801418B2

(12) United States Patent  
El-Siblani et al.

(10) Patent No.: US 8,801,418 B2
(45) Date of Patent: Aug. 12, 2014

(54) METHOD AND APPARATUS FOR MAKING THREE-DIMENSIONAL OBJECTS FROM MULTIPLE SOLIDIFIABLE MATERIALS

(75) Inventors: Ali El-Siblani, Dearborn, MI (US); Alexandr Shkolnik, Los Angeles, CA (US)

(73) Assignee: Global Filtration Systems, Dearborn Heights, MI (US)

(*) Notice: Subject to any disclaimer, the term of this patent is extended or adjusted under 35 U.S.C. 154(b) by 276 days.

(21) Appl. No.: 13/361,803

(22) Filed: Jan. 30, 2012

(65) Prior Publication Data

US 2012/0195994 A1   Aug. 2, 2012

Related U.S. Application Data

(60) Provisional application No. 61/554,846, filed on Nov. 2, 2011, provisional application No. 61/437,851, filed on Jan. 31, 2011.

(51) Int. Cl.
*B29C 35/08* (2006.01)

(52) U.S. Cl.
USPC .................. 425/174.4; 425/375; 264/401

(58) Field of Classification Search
USPC ..................... 425/174.4, 375; 264/401
See application file for complete search history.

(56) References Cited

U.S. PATENT DOCUMENTS

| 5,136,515 A | 8/1992 | Helinski |
| 5,287,435 A | 2/1994 | Cohen et al. |
| 5,386,500 A | 1/1995 | Pomerantz et al. |
| 5,447,822 A | 9/1995 | Hull et al. |
| 5,519,816 A | 5/1996 | Pomerantz et al. |
| 5,876,550 A | 3/1999 | Feygin et al. |
| 6,136,252 A | 10/2000 | Bedal et al. |
| 6,259,962 B1 | 7/2001 | Gothait |
| 6,532,394 B1 | 3/2003 | Earl et al. |
| 6,658,314 B1 | 12/2003 | Gothait |
| 6,660,209 B2 | 12/2003 | Leyden et al. |
| 6,936,212 B1 | 8/2005 | Crwford |
| 7,183,335 B2 | 2/2007 | Napadensky |
| 7,209,797 B2 | 4/2007 | Kritchman et al. |
| 7,225,045 B2 | 5/2007 | Gothait et al. |
| 7,364,686 B2 | 4/2008 | Kritchman et al. |

(Continued)

FOREIGN PATENT DOCUMENTS

| AT | 00341440 E | 10/2006 |
| AU | 4101501 A | 9/2001 |

(Continued)

OTHER PUBLICATIONS

Document 1-4 for Complaint Cover Sheet, *Objet Geometries, LTD. v. 3D Systems, Inc.*, Case 0:5-cv-00136-JRT-FLN.

(Continued)

*Primary Examiner* — James Sanders
(74) *Attorney, Agent, or Firm* — Hansen IP Law PLLC

(57) ABSTRACT

Methods and apparatuses for making three-dimensional objects from multiple solidifiable materials is shown and described. Multiple solidifiable material container assemblies are provided for holding different solidifiable materials. Relative movement between the solidifiable material container assemblies and a build platform allows the solidifiable materials to be switched as an object is built. Several exemplary cleaning stations are provided for removing residual solidifiable materials from the surface of the three-dimensional object as it is built to better ensure smooth transitions between materials on the finished object.

25 Claims, 39 Drawing Sheets

(56) References Cited

U.S. PATENT DOCUMENTS

| | | |
|---|---|---|
| 7,368,484 B2 | 5/2008 | Levy |
| 7,479,510 B2 | 1/2009 | Napadensky et al. |
| D588,701 S | 3/2009 | Sperry et al. |
| 7,500,846 B2 | 3/2009 | Eshed et al. |
| 7,614,866 B2 | 11/2009 | Sperry et al. |
| 7,628,857 B2 | 12/2009 | Kritchman et al. |
| 7,685,694 B2 | 3/2010 | Zagagi et al. |
| 7,958,841 B2 | 6/2011 | Kritchman et al. |
| 8,106,107 B2 | 1/2012 | Napadensky |
| 2002/0008333 A1 | 1/2002 | Napadensky et al. |
| 2002/0016386 A1 | 2/2002 | Napadensky |
| 2002/0153640 A1 | 10/2002 | John |
| 2003/0030398 A1 | 2/2003 | Jacobs et al. |
| 2003/0151167 A1 | 8/2003 | Kritchman et al. |
| 2003/0207959 A1 | 11/2003 | Napadensky et al. |
| 2004/0118309 A1 | 6/2004 | Fedor et al. |
| 2004/0187714 A1 | 9/2004 | Napadensky et al. |
| 2005/0104241 A1 | 5/2005 | Kritchman et al. |
| 2005/0192372 A1 | 9/2005 | Napadensky et al. |
| 2005/0208168 A1 | 9/2005 | Hickerson et al. |
| 2006/0054039 A1 | 3/2006 | Kritchman et al. |
| 2006/0206227 A1 | 9/2006 | Kritchman et al. |
| 2007/0168815 A1 | 7/2007 | Napadensky et al. |
| 2007/0173967 A1 | 7/2007 | Kritchman et al. |
| 2008/0042321 A1 | 2/2008 | Russell et al. |
| 2008/0105818 A1 | 5/2008 | Cohen |
| 2008/0110395 A1 | 5/2008 | Kritchman et al. |
| 2008/0118655 A1 | 5/2008 | Kritchman |
| 2008/0121130 A1 | 5/2008 | Kritchman |
| 2008/0121172 A1 | 5/2008 | Kritchman et al. |
| 2008/0124464 A1 | 5/2008 | Kritchman et al. |
| 2008/0124475 A1 | 5/2008 | Kritchman |
| 2008/0166480 A1 | 7/2008 | Kritchman et al. |
| 2008/0179786 A1 | 7/2008 | Sperry et al. |
| 2008/0217818 A1* | 9/2008 | Holmboe et al. ............ 264/401 |
| 2008/0269939 A1 | 10/2008 | Kritchman |
| 2009/0105363 A1 | 4/2009 | Napadensky |
| 2009/0145357 A1 | 6/2009 | Kritchman et al. |
| 2009/0179355 A1 | 7/2009 | Wicker et al. |
| 2009/0196946 A1* | 8/2009 | Kihara et al. ............... 425/171 |
| 2009/0210084 A1 | 8/2009 | Eshbed et al. |
| 2009/0304952 A1 | 12/2009 | Kritchman |
| 2010/0140850 A1 | 6/2010 | Napadensky et al. |
| 2010/0140852 A1 | 6/2010 | Kritchman et al. |
| 2010/0170540 A1 | 7/2010 | Kritchman et al. |
| 2010/0191360 A1 | 7/2010 | Napadensky et al. |
| 2010/0195122 A1 | 8/2010 | Kritchman |
| 2011/0077321 A1 | 3/2011 | Napadensky |
| 2011/0180952 A1 | 7/2011 | Napadensky |
| 2011/0241240 A1 | 10/2011 | Gothait et al. |
| 2011/0260365 A1* | 10/2011 | El-Siblani ................. 264/401 |
| 2011/0309554 A1 | 12/2011 | Liska et al. |
| 2011/0310370 A1 | 12/2011 | Rohner et al. |

FOREIGN PATENT DOCUMENTS

| | | |
|---|---|---|
| AU | 2003286397 A1 | 6/2004 |
| CN | 01926470 A | 3/2007 |
| CN | 01898423 A | 12/2010 |
| DE | G9319405.6 U1 | 5/1994 |
| DE | 19929199 A1 | 1/2001 |
| DE | 10256672 A1 | 6/2004 |
| DE | 60123595 T2 | 8/2007 |
| EP | 1274551 A2 | 1/2003 |
| EP | 2295227 A2 | 12/2003 |
| EP | 1590149 A1 | 11/2005 |
| EP | 1637307 A2 | 3/2006 |
| EP | 1674243 A2 | 6/2006 |
| EP | 1695144 A2 | 8/2006 |
| EP | 1637307 A3 | 9/2006 |
| EP | 1274551 B1 | 10/2006 |
| EP | 1741545 A2 | 1/2007 |
| EP | 1741545 A3 | 1/2007 |
| EP | 1847377 A2 | 10/2007 |
| EP | 1876012 A1 | 1/2008 |
| EP | 1590149 B1 | 10/2008 |
| EP | 2199068 A2 | 6/2010 |
| EP | 2277686 A2 | 1/2011 |
| EP | 2 298 540 A2 | 3/2011 |
| EP | 2011631 B1 | 4/2012 |
| GB | 2311960 A | 10/1997 |
| HK | 01089128 A1 | 7/2009 |
| JP | 08150662 | 6/1996 |
| WO | 2008120183 A1 | 10/2008 |
| WO | 2009013751 A2 | 1/2009 |
| WO | 2009125381 A1 | 10/2009 |
| WO | 2010045950 A1 | 4/2010 |
| WO | 2010045951 A1 | 4/2010 |

OTHER PUBLICATIONS

Complaint, *Objet Geometries, LTD.* v. *3D Systems, Inc.*, Case 0:5-cv-00136-JRT-FLN.
Document 1-1 for Complaint, *Objet Geometries, LTD.* v. *3D Systems, Inc.*, Case 0:5-cv-00136-JRT-FLN.
Document 1-2 for Complaint, *Objet Geometries, LTD.* v. *3D Systems, Inc.*, Case 0:5-cv-00136-JRT-FLN.
Document 1-3 for Complaint, *Objet Geometries, LTD.* v. *3D Systems, Inc.*, Case 0:5-cv-00136-JRT-FLN.
English abstract for CN101898423.
English abstract for AU4104501A.
English abstract for AU2003286397A1.
International Search Report and Written Opinion dated, May 21, 2012.
Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, Natioinal Taiwan University of Science and technology, Taipei, Taiwan.
Huang, et al., "On-line force monitoring of platform ascending rapid prototyping system" Journal of Materials Processing Technology 159 (2005) 257-264.
English translation of JP 08150662 from: http://www19.ipdl.inpit.go.jp/PA1/result/main/woYeaMaDA408150662P1.htm Jul. 15, 2011.
English translation of DE 10256672 from Lexis Nexis Total Patent.
English translation of DE 19929199 from Lexis Nexis Total Patent.

* cited by examiner

US 8,801,418 B2

METHOD AND APPARATUS FOR MAKING THREE-DIMENSIONAL OBJECTS FROM MULTIPLE SOLIDIFIABLE MATERIALS

CROSS-REFERENCE TO RELATED APPLICATIONS

This application claims the benefit of U.S. Provisional Patent Application No. 61/554,846, filed on Nov. 2, 2011, and U.S. Provisional Patent Application No. 61/437,851, filed on Jan. 31, 2011, the entirety of each of which is hereby incorporated by reference.

FIELD

The disclosure relates to a system and method for manufacturing three-dimensional objects, and more specifically, to a method and apparatus for making three-dimensional objects from multiple solidifiable materials.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP® (Digital Light Processing technology) from Texas Instruments®, SXRD™ (Silicon X-tal Reflective Display), LCD (Liquid Crystal Display), LED (Light Emitting Diode) Printheads, LCOS (Liquid Crystal on Silicon), DMD (digital mirror device), J-ILA from JVC, SLM (Spatial light modulator) or any type of selective light modulation system. Pattern generators may comprise linear solidification devices that project energy in a one-dimensional pattern or two-dimensional solidification devices that project the energy in two dimensions, as in the case of a two-dimensional array of mirrors used in a DLP®.

In certain three-dimensional object manufacturing processes, it is desirable to use multiple solidifiable materials. In one scenario, a three-dimensional object is built with attached supports, which are preferably removable. In such cases, it may be useful to construct the supports from a material that is readily removable from what will be the finished object without damaging the object. For example, the finished object may be constructed from a photohardenable material that is resistant to heat and/or water while the supports may be meltable or dissolvable with water to facilitate their removal from the object. Unfortunately, many known processes cannot accommodate the use of multiple materials or cannot accommodate their use in a way that facilitates the accurate building of objects. Thus, a need has arisen for a method and apparatus for making three-dimensional objects which addresses the foregoing issues.

BRIEF DESCRIPTION OF THE DRAWINGS

The disclosure will now be described, by way of example, with reference to the accompanying drawings, in which.

DETAILED DESCRIPTION

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art. Unless otherwise specified, like numerals refer to like components herein.

The system and methods described herein are generally applicable to additive manufacturing of three-dimensional objects, such as components or parts (discussed herein generally as objects), but may be used beyond that scope for alternative applications. Certain of the systems and methods generally include a first solidifiable material source that is separated from a second solidifiable material source in a first direction defining a first axis. An object build platform is moveable along a second direction defining a second axis, and at least one of the build platform and the first solidifiable material source is movable along the first direction relative to the other of the build platform and the first solidifiable material source. Others of the systems and methods include an object build platform that moves in two dimensions (e.g., two linear dimensions or one linear and one rotational dimension) relative to multiple solidifiable material containers. In certain preferred implementations, the two solidifiable material containers include different solidifiable materials within their interior volumes. In other implementations, solidifier container assemblies comprising the solidified material containers are provided. In some implementations, a cleaning station is provided to facilitate the removal of one solidifiable material from the object or object supports prior to the application of another solidifiable material. In additional implementations, the system includes a build platform and a pattern generator which remain in fixed alignment with one another in a plane perpendicular to the axis (the "build axis") along which the build platform moves during an object building operation. In other implementations, the object build platform and one or more pattern generators move relative to one another.

Figure 1:
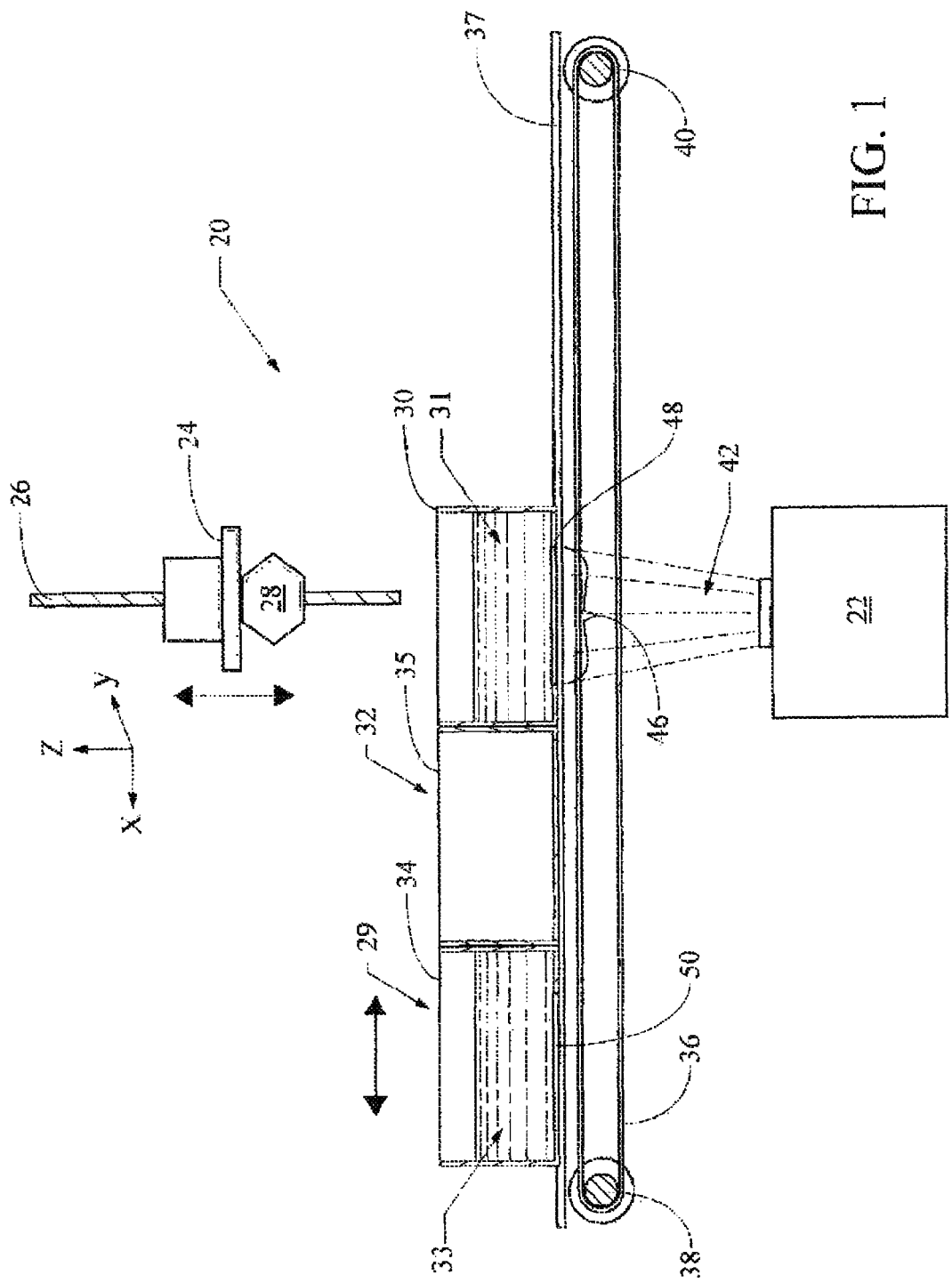
FIG. 1 is a cross-sectional schematic view of a system for making a three-dimensional object from multiple solidifiable materials depicted in a first configuration.

Referring to FIG. 1, a system 20 for making a three-dimensional object is provided. System 20 includes a pattern generator 22 (such as a digital light projector, laser, etc.) for supplying an image that defines a pattern of solidification energy 42 to a solidification region 46. Solidification region 46 is a generally (x, y) planar region perpendicular to the build (z) axis which receives solidification energy from pattern generator 22. Solidifiable material assembly 29 is provided and selectively provides one or more solidifiable materials 31, 33 to solidification region 46. Build platform 24 is a generally rigid and planar surface upon which object 28 is progressively built during an object build process. As indicated in FIG. 1, build platform 24 is moveable in a direction along the build (z) axis during an object build process. Build platform 24 is moveably supported by and along a shaft 26 which is substantially parallel to the build axis (z-axis) and is driven in the z-direction by a motor drive (not shown). During an object build process, solidifiable materials 31 and/or 33 are solidified via solidification energy provided by pattern generator 22 to progressively build object 28 and/or supports (not shown in FIGS. 1-4) in the build (z) axis direction. If present, the supports connect object 28 to build platform 24 and are preferably removable from a finished object portion of object 28 once object 28 is fully built. It should be noted that the build (z) axis does not necessarily have a fixed relationship with any particular axis that may be defined along an object that is being built. In certain implementations, a given object can be oriented in a variety of different ways during the object build process, and a given object axis may or may not be parallel to the build (z) axis depending on the preference of the system 20 user.

At least one of the build platform 24 and a source of solidifiable material 31 is movable along the x-axis direction with respect to the other of the build platform 24 and the source of solidifiable material 31. In FIG. 1, sources of both the solidifiable material 31 and the solidifiable material 33 are movable in the x-axis direction relative to the build platform 24.

In the illustrated embodiment, solidifiable material assembly 29 is moveable relative to the build (z) axis defined by shaft 26. In the example of FIG. 1, a belt drive is provided comprising parallel belts 36 (only one of which is shown) which are spaced apart in the y-direction, i.e., the direction that is perpendicular to both the build (z) axis and the direction along which solidifiable material assembly 29 is moveable (the x-axis direction). Solidifiable material assembly 29 further comprises a drive shaft 38 and rotating pulleys 40 (only one of which is shown). A motor (not shown) causes drive shaft 38 to rotate about its longitudinal axis, causing belt 36 (and its parallel counterpart) to circulate. Solidifiable material assembly 29 is preferably coupled to belt 36 and two parallel rails 37 (only one of which his shown), such as by linear bearings (not shown). In this manner, solidifiable material assembly 29 slidably engages rails 37 and moves relative to the build (z) axis, preferably perpendicularly thereto along the x-axis shown in FIGS. 1-4.

As shown in FIG. 1, solidifiable material assembly 29 comprises two solidifiable material container assemblies 30 and 34 that act as sources of corresponding solidifiable materials 31 and 33. However, additional solidifiable material container assemblies and solidifiable materials may be provided and the configuration of FIGS. 1-4 is merely exemplary. Solidifiable material container assembly 30 has frame or frame assembly (described below with reference to FIG. 5) which defines an interior volume in which first solidifiable material 31 is disposed. Solidifiable material container assembly 34 is similarly configured and has an interior volume in which second solidifiable material 33 is disposed. Each solidifiable material 31 and 33 is solidifiable upon exposure to solidification energy (i.e., energy sufficient to cause solidification) supplied by pattern generator 22. However, in preferred embodiments, first and second solidifiable materials 31 and 33 are different from one another. In one embodiment, material 33 comprises an object support material and material 31 comprises a finished object material. In accordance with the embodiment, the support material is used to create object supports that connect the finished object to the build platform 24. At the completion of the object build process, the supports are removed to yield the finished object.

As discussed herein, a solidifiable material is a material that when subjected to a sufficient energy density, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Photoinitiators will have an absorption spectrum based on their concentration in the photopolymer. That spectrum corresponds to the wavelengths that must pass through solidification substrate 48 (or substrate 50 in the case of solidifiable material container assembly 34) and, therefore, which must be absorbed by the photoinitiator to initiate solidification.

Suitable types of photoinitiators include metallocenes, 1,2 di-ketones, acylphosphine oxides, benzyldimethyl-ketals, $\alpha$-amino ketones, and $\alpha$-hydroxy ketones. Examples of suitable metallocenes include Bis(eta 5-2,4-cyclopenadien-1-yl) Bis[2,6-difluoro-3-(1H-pyrrol-1-yl)phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable $\alpha$-amino ketones include 2-benzyl-2-(dimethylamino)-[4-(4-(4-morpholinyl)phenyl]-1-butanone, which is supplied under the name Irgacure 369. Suitable $\alpha$-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) 22 may be configured in a number of ways. Many may provide controlled electromagnetic radiation to provide a desired pattern. The pattern generator (s) 22 may be one-dimensional (e.g., single row LED devices or linear laser scanning devices) in that they project a pattern along only one dimension or two-dimensional (e.g., spatial light modulators, digital light projectors, digital mirror array devices, LCD masks), in that they project a pattern along two-dimensions. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Object 28 is shown here as an example of a design that is made by system 20. The size, shape, or any other feature of object 28 is a function of energy pattern 42 (which may be a function of the z-axis position along the object) and the motion of object build platform 24. For example, the arbitrary shape shown may be produced through movement of build platform 24 upward while pattern generator 22 selectively hardens solidifiable material 31 and/or 33 (i.e., platform 24 moves during the exposure). However, such a shape could also be constructed as a series of layers by moving object build platform 24 a certain distance upward and then exposing solidifiable material 31 or 33 to energy supplied by pattern generator 22 for a predetermined time, and then repeating the process until the object is built.

Figure 2:
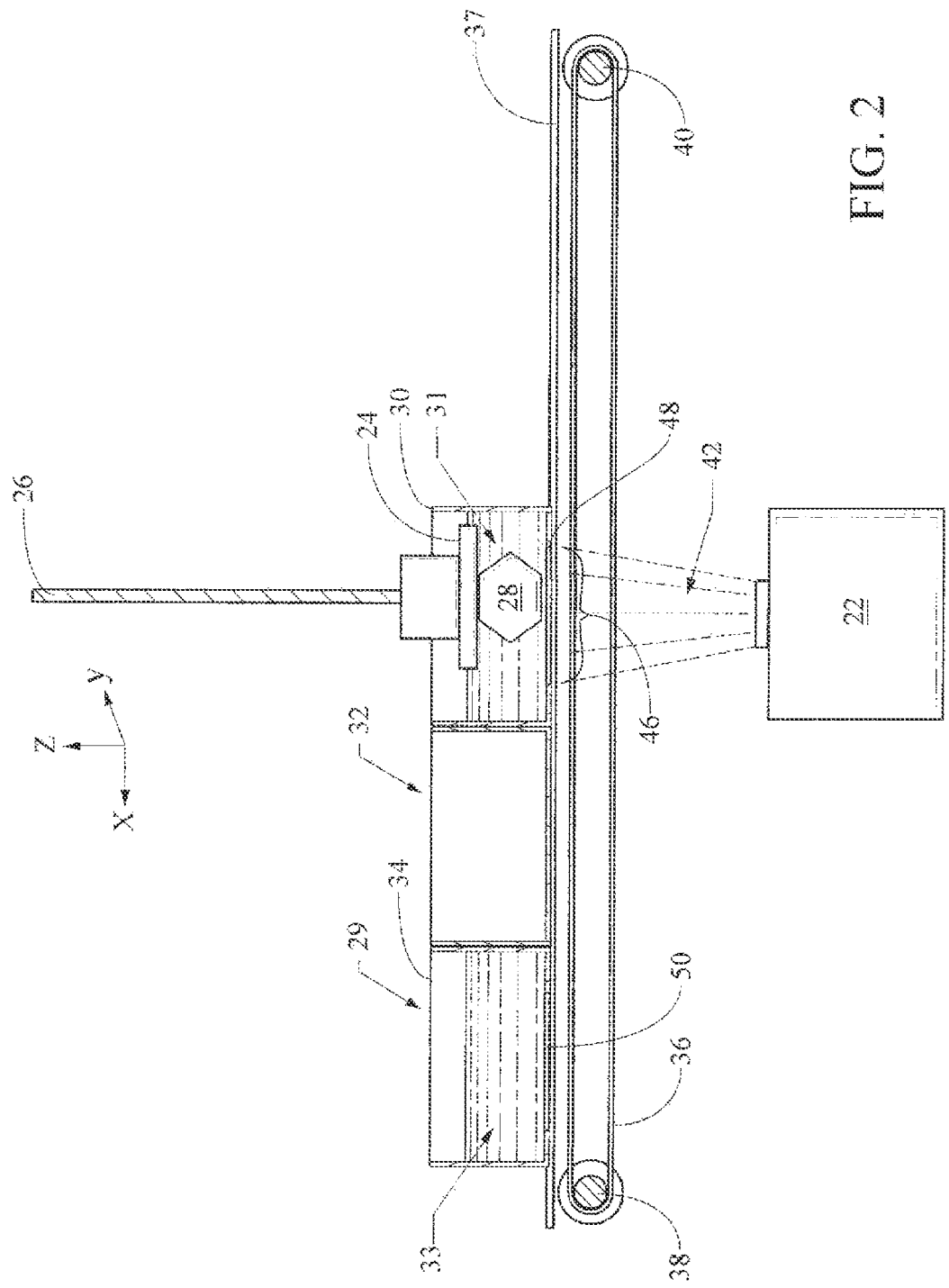
FIG. 2 is a depiction of the system of FIG. 1 in a second configuration.
Figure 3:
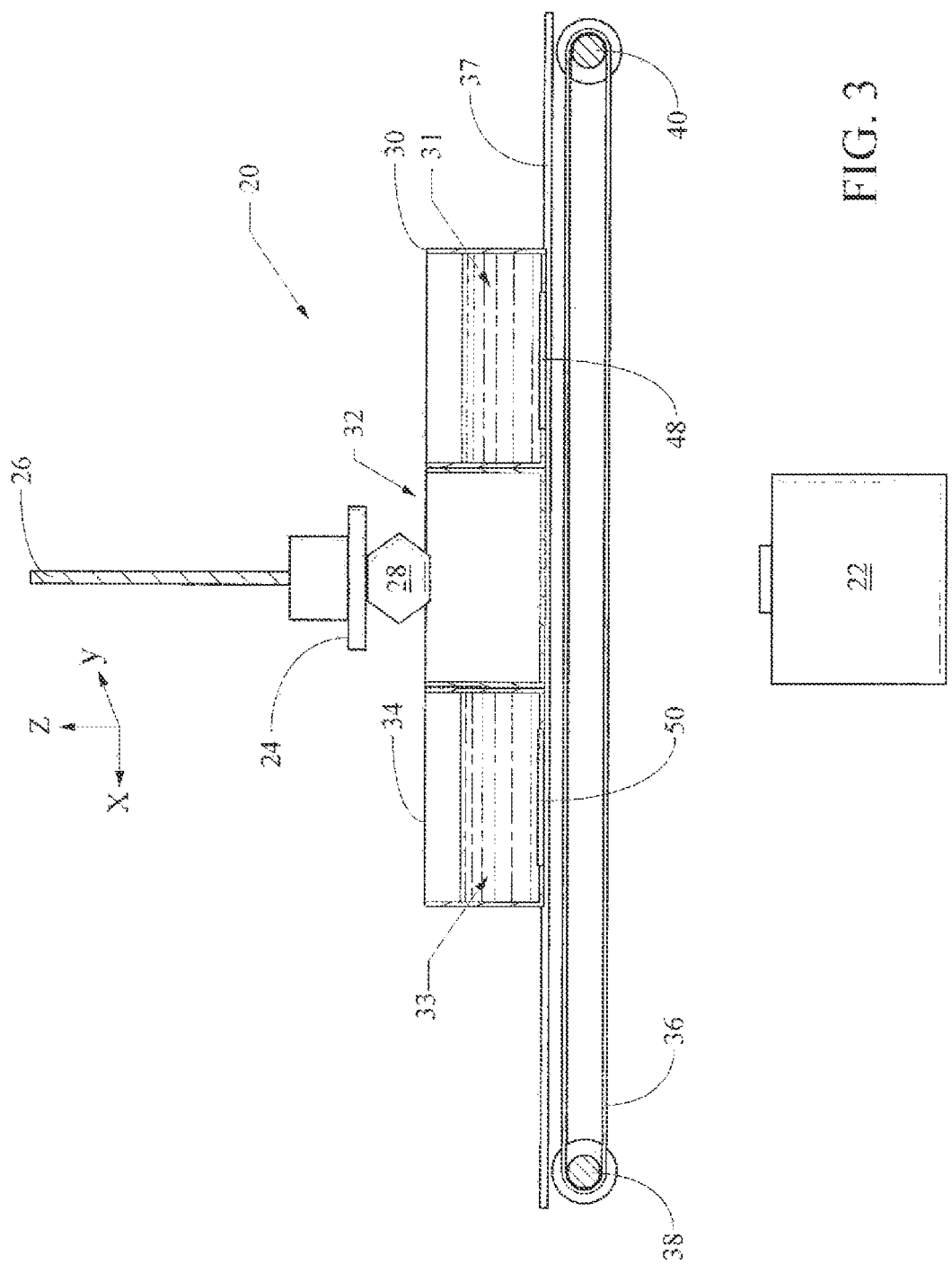
FIG. 3 is a depiction of the system of FIG. 1 in a third configuration.

Pattern generator 22 is positioned to supply solidification energy pattern 42 such as electromagnetic radiation to solidifiable material 31 or 33 (depending on the position of solidifiable material assembly 29 relative to the build (z) axis) to selectively solidify material 31 or 33 in accordance with a generated energy pattern 42. In FIGS. 1 and 2, solidifiable material container assembly 30 is positioned in solidification region 46 to receive solidification energy from pattern generator 22. As used herein, the term "solidification region" refers to an area orthogonal to the build (z) axis in which projected energy from pattern generator 22 may contact the exposed surface of a solidifiable material. For example, when a DLP® is used as pattern generator 22, the solidification region will be the area of the exposed surface of the solidifiable material which receives electromagnetic energy when all the DLP® mirrors are activated. In any given step of a solidification process, it may be the case that not all areas lying within the solidification region 46 will receive solidification energy because some of the mirrors may be off or set such that they do not project sufficient energy to cause solidification. With respect to moving pattern generators (e.g., pattern generators that move relative to the object build platform), the maximum area over which solidification energy may be provided (i.e., the extent of the solidification area that corresponds to the full traversal area of the moving pattern generator) will be the solidification region.

In an example wherein pattern generator 22 is a digital light projector, the generated energy pattern 42 corresponds to volumetric pixels or "voxels." Each voxel defines a location in the x, y plane (orthogonal to the build (z) axis) and has a projected energy density associated with it. The projected energy density is a function of both the time and power intensity (e.g., in $J/m^2/sec$ of the energy). The energy density may also be referred to as the "total exposure" for a given x, y location.

Referring to FIG. 2, in solidifiable material container assembly 30, solidifiable material 31 defines an exposed surface proximate rigid or semi-rigid transparent solidification substrate 48, through which energy pattern 42 is projected. In certain examples, solidifiable material 31 will directly contact and solidify against rigid or semi-rigid transparent substrate 48. In other examples, a solidification substrate assembly comprising substrate 48 and one or more films or resilient coatings may be provided, in which case solidifiable material 31 will be in contact and interface with a film or resilient coating. Likewise, in FIG. 4 solidifiable material 33 defines an exposed surface proximate rigid or semi-rigid transparent solidification substrate 50 through which energy pattern 42 is projected when solidifiable material container assembly 34 is placed in alignment with projected energy pattern 42. Each voxel defines a position in the x, y plane of the exposed surface of solidifiable material 31 or 33 as well as a solidification depth, z, along the build (z) axis, which in FIGS. 1-4 is a distance above the exposed solidifiable material surface in which solidification occurs. At any given location on an exposed surface of solidifiable material 31 or 33, the voxel depth will depend, at least in part, on the localized intensity of the energy supplied by pattern generator 22 (e.g., light intensity) as well as the time period for which the energy is supplied. In an example wherein pattern generator 22 is a moving light source (e.g., a movable laser), the generated energy pattern corresponds to the path of travel of the light source. Again, the depth of curing at any particular location will depend, at least in part, on the exposure time and intensity of the energy supplied.

A control unit (not shown) supplies image data to pattern generator 22 to drive the pattern generation process and create the particular pattern defined by projected energy pattern 42. The supplied image data may include voxel data that includes an intensity for each pixel in the x, y plane, slice-data files, or bitmaps that are derived from slice-data files. Typical file types used to generate bitmaps include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data used by the pattern generator 22. The image data corresponds to energy pattern 42 and may be generated by a control unit, by pattern generator 22, or by an external source or device (e.g., a network or storage device). The image data may also be modified to a format suitable for pattern generator 22 (e.g., modification of a compressed file such as a TIFF file using CCIT type 4 compression into a standard bitmap). In general, the image data may be define bi-tonal (e.g. "ON/OFF") bitmap images, "grayscale" (e.g., pixel data with variable energy intensities and/or exposure times associated with each pixel), color, or color with intensity and/or exposure time information. Other pattern formats may be available for use such as JPEG, DXF, BMP, PNG, SVG, etc., or other vector or pixel-defined image files (which may be based on industry standards or custom file types).

In certain examples, the image data comprises voxel data. Voxel data may be considered a collection or set of data that represents volumetric pixels. The voxel data may be organized into a voxelized bitmap pattern that includes a grayscale value for each pixel and/or an exposure time. The voxelized bitmap may be considered an organized collection of individual voxels, each voxel having its own depth that is independent of the other voxels. Although the voxels may be organized into a bitmap, each voxel is generally treated individually and has its own curing depth (which can be determined by the exposure time and/or intensity value assigned to each voxel) to determine each voxel's geometry independent of any other voxel data. The object 28 may be formed using the voxel data where each voxel may be created in the solidifiable material 31 or 33 by exposing the exposed surface of the solidifiable material 31 or 33 to obtain a particular depth (in the upward z-direction along the build axis) of cure (typically determined by the grayscale value and/or exposure time) and thereby create the three-dimensional voxel in the solidifiable material 31 or 33. Each voxel may be generated individually, in a group or subset (e.g., more than one voxel), or as a whole of the voxel data (e.g., all voxels at once).

Two-dimensional bitmap data may also be used as the image data. The bitmap information may be a typical (x,y) location for a pixel (whether inherent to the file format or having specified locations). The grayscale value corresponds to a total exposure or energy density for the pixel (E) which may be expressed as follows:

$$E = \text{Total Exposure} = \int I \, dt$$

where I is the power flux or intensity of the supplied solidification energy (e.g., power/area in units of Watts/pixel, $Watts/cm^2$, etc.) and the integration is performed over the exposure time period, $\Delta t$. In certain examples, the grayscale output value may be used to control the pattern generator's output to provide full intensity, no output, or variations in between. In processes using a fixed exposure time per pixel, the pattern generator 22 may reduce the amount of electromagnetic radiation (e.g., intensity, I) that the solidifiable material 31, 33 is exposed to for each pixel for the specified exposure time. For example, where a DLP® type pattern generator is used, the DLP® micro-mirror for a particular pixel or group of pixels may be positioned to direct the electromagnetic radiation away from the solidifiable material 31 or 33. Thus, the electromagnetic radiation is reflected away, but not necessarily completely, from the solidifiable material 31 or 33 using the micro-mirror to reduce or eliminate exposure after the elapsed time. Alternatively, the pattern generator may "turn off" the light entirely for that pixel after the exposure time has elapsed. When using a voxelized construction process, each voxel may have its own thickness (e.g., depth of cure) which is controlled by the grayscale value.

In an example where a grayscale value is assigned to a pixel and a DLP® type pattern generator 22 is used, the DLP® micro-mirror may be moved so as to expose the pixel at the build surface in an alternating manner to provide an overall grayscale value. Where a 50% grayscale is desired, the micro-mirror may be moved so that the solidifiable material 31 or 33 is exposed for 50% of the time, and the other 50% of the time the micro-mirror may be moved so as to reflect light away from whichever solidifiable material 31 or 33 is in the solidification region 46.

The control unit (not shown) may be constructed as part of an integral three-dimensional object forming machine, portions of a machine without direct connection to the machine, or distributed elsewhere and connected via a communication medium, such as a network. The control unit may be, for example, a computing device (that may be an embedded resource, external, or a distributed resource) and may be configured as a computer, a programmable logic device, a specialized processor, etc. The control unit also receives signals indicative of the levels of solidifiable materials 31 and 33 in their respective solidifiable material container assemblies 30 and 34. Based on the signals, the control unit adjusts a flow rate and/or duration of flow additional solidifiable material from a corresponding reservoir (not shown). Although not visible in the figures, in one embodiment, a level sensor is provided at a fixed location relative to the build (z) axis to sense the level of solidifiable material present in whichever solidifiable material container assembly 30 or 34 is in the solidification region 46. Separate fill tubes are provided for each material 31 and 33, and the control unit adjusts the flow of the corresponding material 31 or 33 depending on the level in its corresponding solidifiable material container assembly 30 or 34. In another example, a first level sensor is fixed in location relative to the build (z) axis and is provided to sense the level in solidifiable container assembly 34 when it is in the position shown in FIGS. 1 and 2. A fill tube proximate the same location supplies solidifiable material 33 to solidifiable material container assembly 34 based on the detected level therein. A similar arrangement is provided to detect the level of solidifiable material 31 in solidifiable material container assembly 30 when it is in the position shown in FIG. 4 and provide solidifiable material 31 based on the detected level. In one example, one or both of solidifiable material container assemblies 30 and 34 has a liquid level $\Delta z$ of its respective solidifiable material (31, 33) which is generally no greater than about 1.0 mm, preferably no greater than about 0.5 mm, and even more preferably no greater than about 0.2 mm.

The systems and methods described herein may be used with "downward", "upward" and "side" projecting systems in continuous or non-continuous exposure modes (e.g., pattern generating modes), any of which may include additional optical elements such as a mirrors or lenses. The systems and methods may be used in a layer, slice, or voxelized data production process, among others, where the pattern generating system provides the electromagnetic radiation to react with (e.g., solidify or partially solidify) a solidifiable material 31 or other material to create the three-dimensional object. However, the systems and methods may be utilized with numerous types of three-dimensional manufacturing processes, including voxelization processes and slicing and layering processes. Moreover, the systems and methods described herein may also apply to layered construction processes using "upward" or "downward" build directions that may use lithography (generally), FTI (Film Transfer Imaging), three-dimensional Printing technologies, SLS (Selective Laser Sintering) or SLA (Stereolithography Apparatus). Examples of pattern generators may include Digital Light Processing technology (DLP) from Texas Instruments® or SXRD™ or LCD or LCOS or J-ILA from JVC, or LVT (Light Valve Technology), DMD (digital mirror device), or GLV (Grating Light Valve) technology, SLM (Spatial light modulator), or any type of selective electromagnetic radiation or light modulation system, in addition to scanned and/or vector pattern generators (e.g., using a laser). Other examples of pattern generators include LED printheads, including UV LED printheads. One example of a suitable UV LED printhead is the P150-3072 printhead supplied by Optotek Ltd. of Ottawa, Canada. The P150-3072 printhead is a linear scanning printhead with a resolution of 150 dots per inch (5.9 dots/mm). Another example of a one-dimensional, linear pattern generator, discussed further below, comprises a laser source in optical communication with a rotating light deflector which scans lines of laser light in one dimension while moving in a second direction.

The matching of technologies between the pattern generator 22 and solidifiable materials 31 and 33 may be determined based on the compatibility of the respective technologies used (e.g., a reactive UV photopolymer material and a UV pattern generator). Typical solidifiable materials include photo-reactive (or photo curable) resins that may be in liquid, paste, powder, or other form. Moreover, the systems and methods described herein are not tied to a particular pattern generator or imager technologies.

In the case of voxel-based systems, the electromagnetic radiation supplied by pattern generator 22 may have an adjustable intensity range. In one example of a voxel-based system, electromagnetic radiation from pattern generator 22 is scaled from zero (the minimum) to 255 (maximum). Pattern generator 22 may receive bitmaps having intensity and/or exposure time values for each individual pixel. However, in an example where each voxel is individually addressed (e.g., $x_i, y_i, z_i$), bitmaps are unnecessary since pattern generator 22 can uniquely receive and access each voxel. The bitmaps include "bits" or regions that collectively determine the energy pattern 42. These "bits" or regions (e.g., that make up the voxelized bitmap) are typically defined as rectangular or square regions, but when each "bit" is treated as a voxel, the depth of cure (which determined the depth of the voxel) may be determined for each voxel independently of the other.

Each bit in a bitmap may also have a unique intensity value associated with it. Thus, a voxelized bitmap may cover a wide range of curing depths through the use of the independent grayscale value associated with each bit. Although the intensity may be used to adjust the total exposure that a given voxel receives, the exposure time may also be used. In addition, methods using both a variable intensity and variable exposure time for each pixel may be used.

While the intensity may be expressed as an integer number on a reference scale (e.g., 0 . . . 255), the intensity value may also be compensated or adjusted before being sent to the pattern generator, or may be compensated or adjusted at the pattern generator, or both. For example, where solidifiable material 31 or 33 has a minimum intensity threshold that is required for polymerization or partial-polymerization, the "off" or zero (0) value intensity (e.g., brightness and/or "on" time) may be determined based on the minimum intensity threshold specific to the particular solidificable material 31, 33. A zero value for intensity does not necessarily imply that the energy supplied by pattern generator 22 is actually zero. In a typical case, a low level of brightness insufficient to cause solidification may correspond to a zero (0) intensity.

Intensity ranges of 0 to 255 are convenient for examples when an 8-bit system is used to determine intensity. However, systems having more or less resolution for intensity may be used. Examples may include a 4 bit system or a 16 bit system. Further, the exposure time of the electromagnetic radiation may have a wide range, for example, 1 millisecond to 100 seconds. Note that the time range is merely an example and is not limiting as the "on time" for the electromagnetic radiation may be dependent on other variables such as the minimum switching time of the pattern generator, the intensity of the electromagnetic radiation, the solidifiable material's minimum effective time and radiation intensity for solidification, the speed of movement of build platform 24, and other factors.

Both intensity and exposure time, or either of them, may be parameters for the bitmap. For example, when a pattern generator 22 has a fixed intensity (such as a laser), the time the source is "on" may be modulated to produce a total exposure value. Alternatively, where the time of exposure is a predetermined value, the intensity of the voxels generated by pattern generator 22 may be modified produce the desired total exposure value.

As discussed herein, the terms "total exposure" or "energy density" may be considered the integral of the electromagnetic radiation intensity with respect to time ($E=\int I\,dt$) over the exposure period. When performing voxelized construction, the total exposure determines the depth of cure for each voxel separately and independently of any other voxel. The time and intensity to achieve a particular depth of cure is material dependent. Thus, the time and intensity determined to provide a particular curing depth for first solidifiable material 31 may not be usable for second solidifiable material 33. The depth of cure can be a function of at least the exposure time, the intensity of the electromagnetic radiation, and the properties of the solidifiable material 31 or 33. The combination of intensity and exposure time can be expressed independently (e.g., in data file or data structure) or they may be combined and expressed for each voxel as a grayscale value where the exposure time is predetermined.

Solidifiable material 31 or 33 may behave differently based on the intensity of electromagnetic radiation and/or the time. For example, a low level intensity may not reach a minimum threshold required for the solidifiable material 31 or 33 to become wholly or partially solidified. In this case, no amount of exposure time will be sufficient to harden the solidifiable material 31 because the necessary polymerization and/or cross-linking reactions will not be initiated. Alternatively, a higher intensity may cause solidifiable material 31 to become solidified or partially solidified non-linearly faster.

Figure 5:
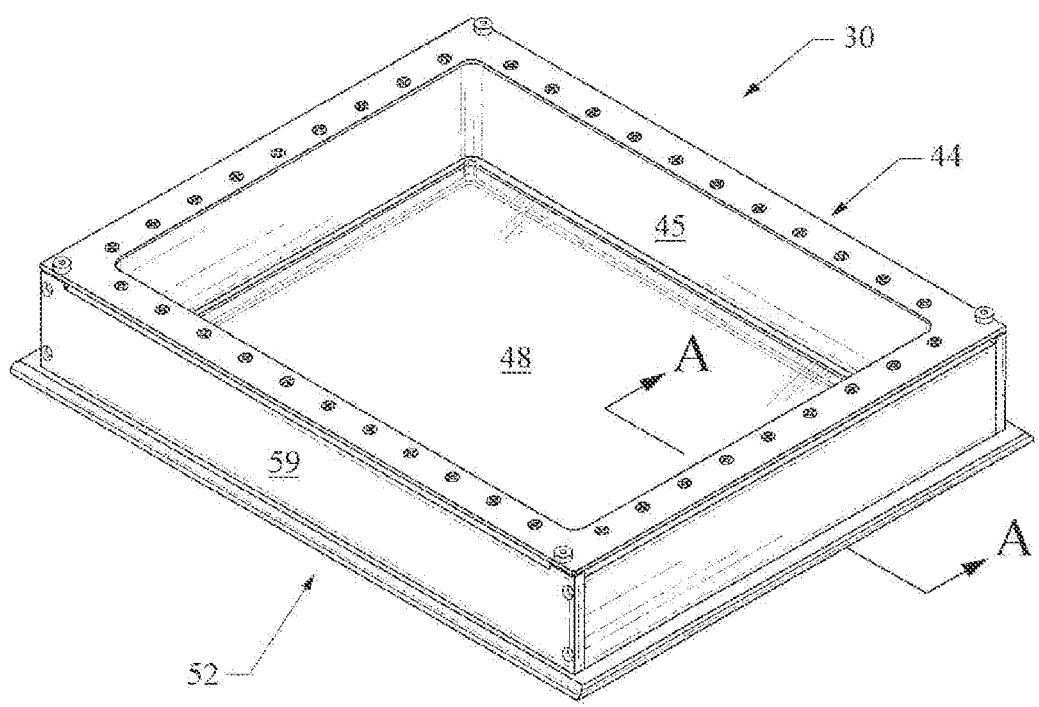
FIG. 5 is a perspective view of a solidifiable material container assembly used in the system of FIG. 1.
Figure 6:
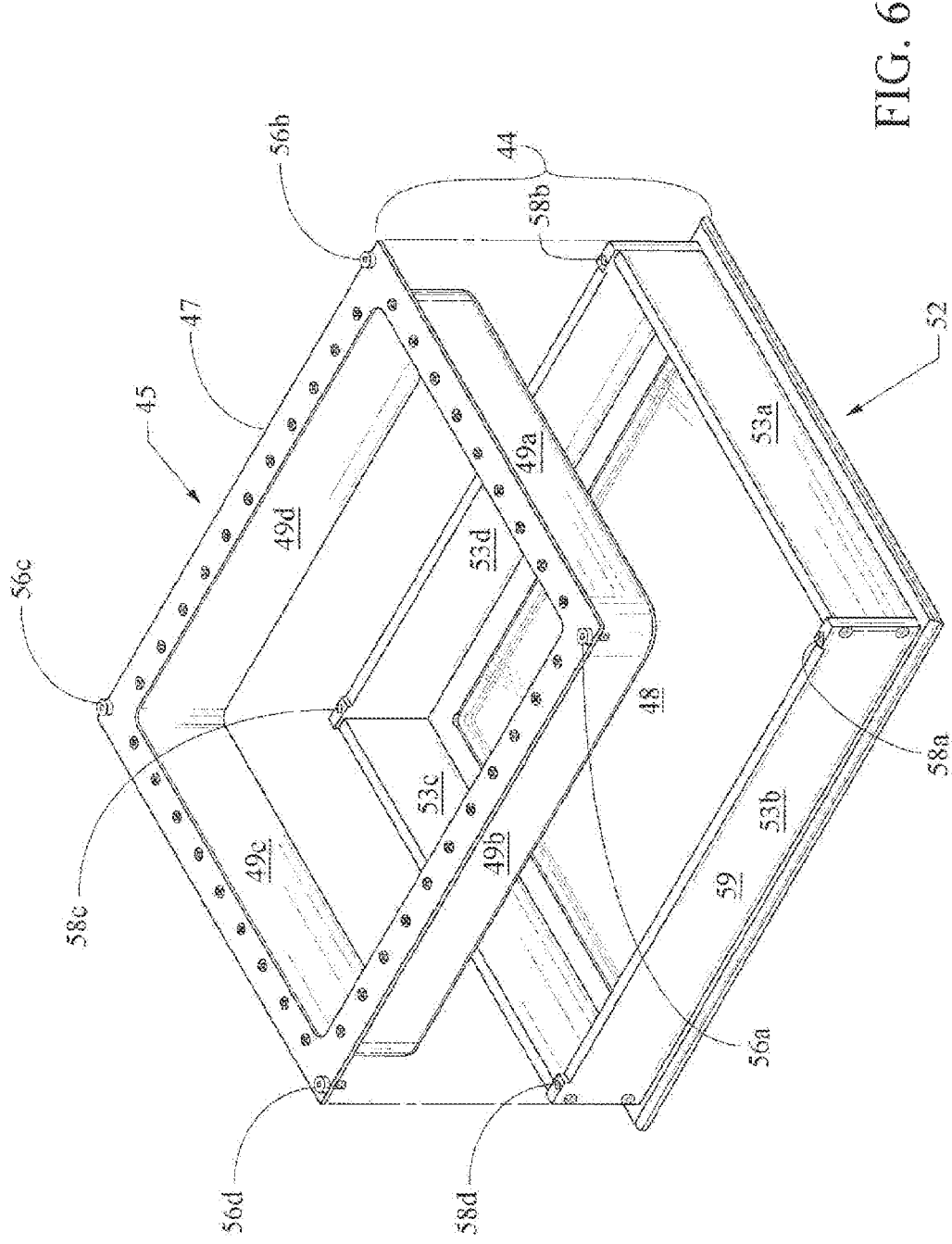
FIG. 6 is an exploded perspective view of the solidifiable material container assembly of FIG. 5 with the inner frame and outer frame separated from one another.
Figure 7:
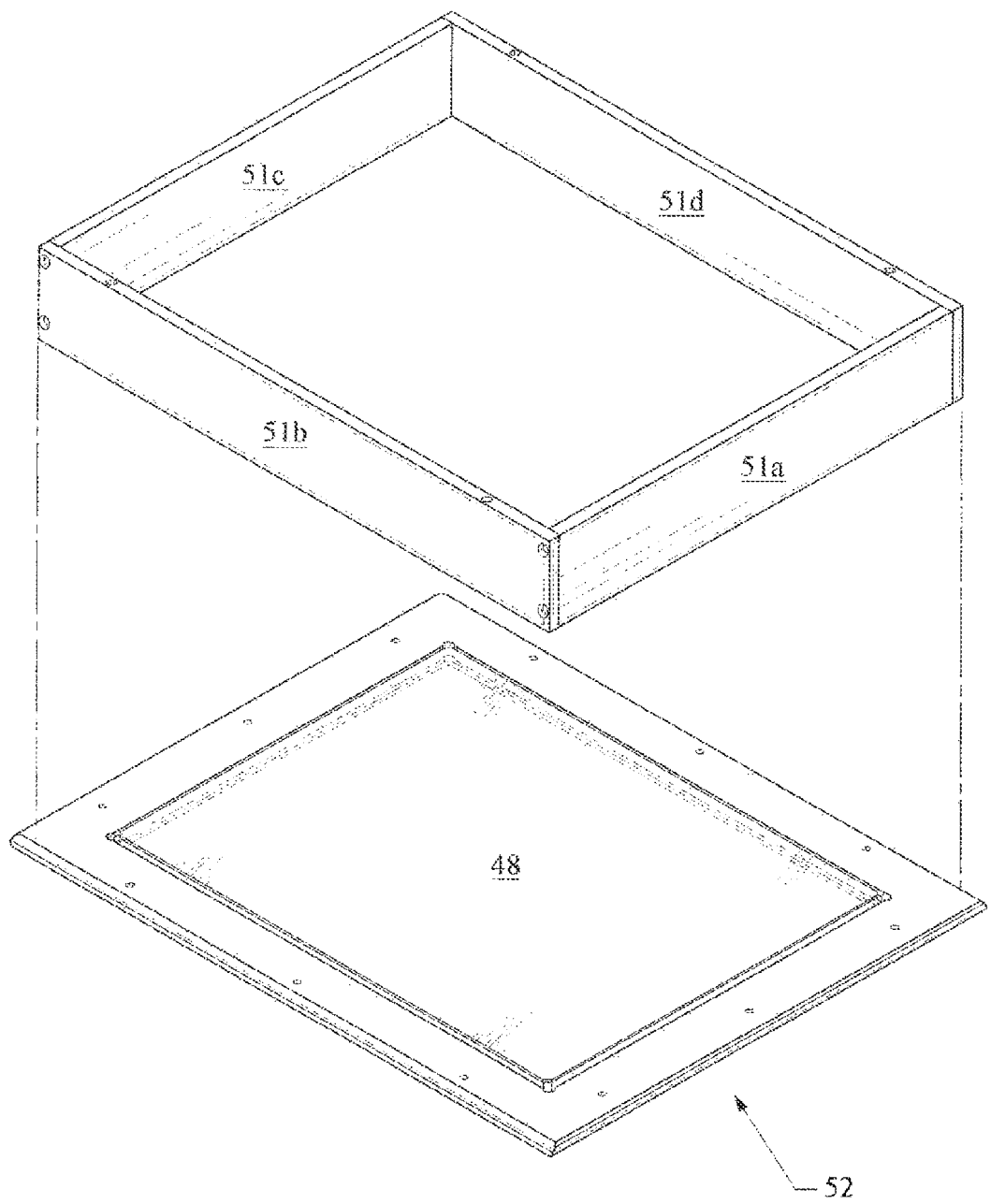
FIG. 7 is an exploded view of an outer frame and a rigid or semi-rigid transparent solidification substrate used in the solidifiable material container assembly of FIG. 5.
Figure 8:
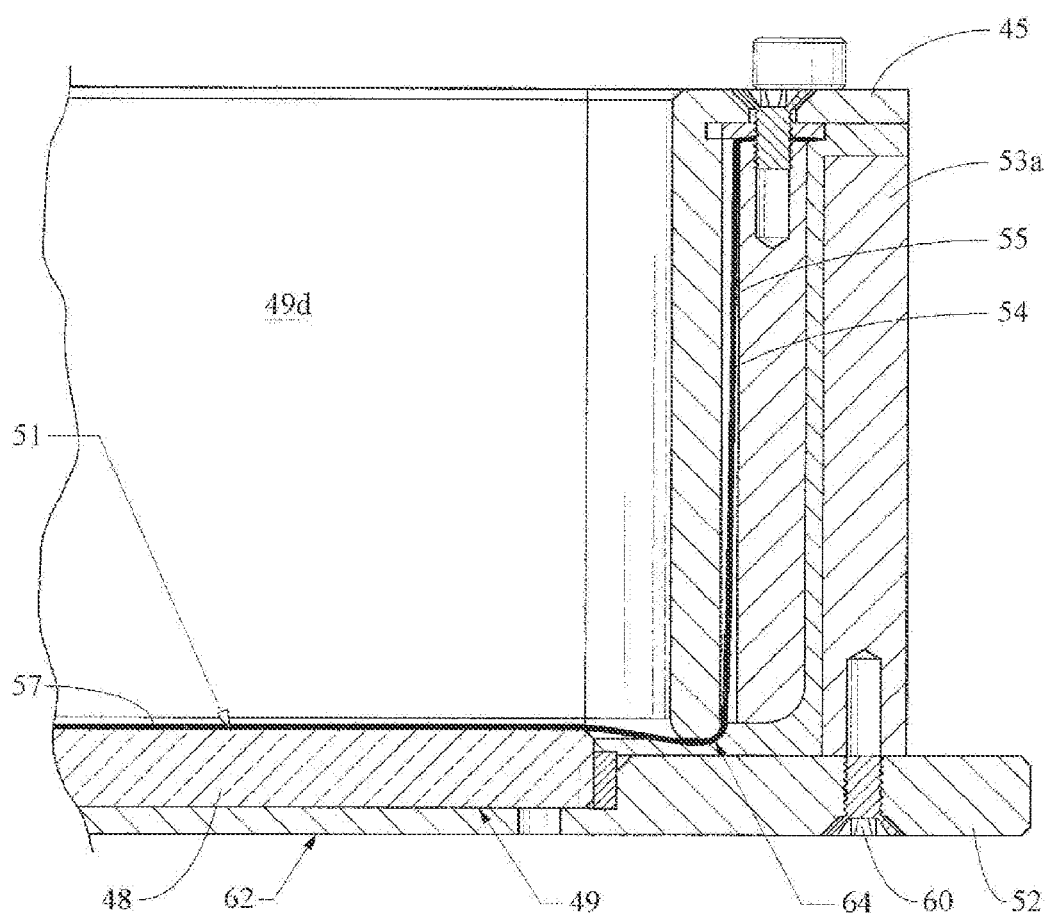
FIG. 8 is a partial side cross-sectional view taken along line A-A of FIG. 5.

Referring to FIG. 5, an exemplary solidifiable material container assembly 30 is shown. The depicted construction may also be used for solidifiable material container assembly 34. Solidifiable material container assembly 30 comprises a rigid or semi-rigid transparent solidification substrate 48, a base, 52, and a frame assembly 44 comprising an inner frame 45 and an outer frame 59. As best seen in FIG. 6, inner frame 45 is generally rigid (e.g., plastic or metal) and comprises four side walls 49a-49d and a horizontal lip 47 that projects outwardly away from the interior space defined by vertical walls 49a-49d. Outer frame 59 is also generally rigid (plastic or metal) and comprises four vertical walls 53a-53d. As shown in FIGS. 5 and 6, inner frame 45 and outer frame 59 define frame assembly 44. In an installed condition, the horizontal lip 47 of inner frame 45 fits over the top surface of outer frame 59 to define the upper surface of frame assembly 44. A plurality of fasteners 56a-56d project through horizontal lip 47 and engage corresponding holes 58a-58d formed in the upper surface of outer frame 59 to secure the inner frame 45 to the outer frame 59. In one example, as shown in FIG. 8, base 52 is connected to outer frame 59 such as by a plurality of screws or other fasteners. In FIG. 8, one screw 60 is shown.

Rigid or semi-rigid transparent solidification substrate 48 is connected to base 52 such as by an adhesive applied around the inner perimeter of base 52 and/or the outer perimeter of substrate 48. In the example of FIG. 8, the lower surface 49 of substrate 48 is disposed above the lower surface 62 of base 52 to prevent damaging substrate 48 when base 52 is placed on a table or other surface such as during maintenance activities. Solidification substrate 48 is generally rigid or semi-rigid and substantially permeable to the energy supplied by pattern generator 22. In certain examples, it is preferred that the energy from pattern generator 22 can pass through solidification substrate 48 without a significant diminution in transmitted energy or a significant alteration of the energy spectrum transmitted to solidifiable material 31 or 33 relative to the spectrum of the radiation that is incident to lower solidification substrate surface 49 (FIG. 8). In the case where energy pattern 42 is a light pattern (including non-visible light such as UV light), solidification substrate 48 is preferably substantially transparent to the wavelengths of light supplied by pattern generator 22. As energy is supplied to the exposed surface of solidifiable material 31 it will begin to solidify in accordance with the energy pattern 42 supplied by pattern generator 22.

One example of a rigid or semi-rigid solidification substrate 48 is a transparent float glass. Another example is a transparent plastic. A variety of different float glasses and plastics may be used. Exemplary plastics that may be used include transparent acrylic plastics supplied by Evonik under the name Acrylite®. Substrate 48 is preferably rigid enough to provide a substantially planar exposed surface of solidification material 31 when energy pattern 42 is projected onto the exposed surface. The term "transparent" is meant to indicate that substrate 48 is capable of transmitting the light wavelengths (including non-visible light such as UV light if supplied by pattern generator 22) necessary to solidify solidifiable material 31 and that the intensity of such wavelengths is not significantly altered as the light passes through substrate 48. Correspondingly, in the case of solidifiable material container assembly 34, rigid or semi-rigid transparent solidification substrate 50 is preferably capable of transmitting light wavelengths necessary to solidify solidifiable material 33 such that the intensity of the wavelengths is not significantly altered as the light passes through substrate 50. In certain examples, the solidifiable material container assembly 30 is tiltable relative to an object build platform and an object section formed thereon to facilitate peeling of solidified material from rigid or semi-rigid transparent solidification substrate 50.

In certain embodiments, the solidifiable material 31, 33 may adhere strongly to the corresponding rigid or semi-rigid transparent solidification substrate 48, 50 causing the object 28 to break or deform when build platform moves away from pattern generator 22 during a build process. Thus, in certain examples, a solidification substrate assembly comprising both a rigid or semi-rigid transparent solidification substrate and one or more films is provided. In the example of FIG. 8, a single film 54 is provided adjacent rigid or semi-rigid solidification substrate 50. In some examples, film 54 is resilient, while in others a resilient film is not required. Suitable resilient films include silicone elastomers. One particular example of a suitable silicone elastomer is Elastosil® RT 601, which is supplied by Wacker Silicones. Elastosil® RT 601 is a transparent, addition-curing silicone rubber having greater than 88 percent transmission of light in the 325-700 nm range (for a 10 mm layer). The material has an elongation at break of about 100 percent (ISO 37), and a tensile strength of about 7.0 N/mm2 (DIN ISO 37) tear strength (ASTM D 624B) of about 3.0 N/mm$^2$. Suitable non-resilient films include homopolymers or copolymers formed from ethylenically unsaturated, halogenated monomers, such as Fluoropolymers. Examples of suitable non-resilient films include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Other suitable films include PVDF films sold under the Kynar® name by Arkema, ECTFE films sold under the Halar® name by SolvaySolexis, ETFE films sold under the Tefzel® name by DuPont, PFA films sold under the Teflon® —PFA name by DuPont, and MFA films sold under the name Nowofol.

A variety of combinations of films and configurations may be used to create a suitable solidification substrate assembly. In one example, a rigid or semi-rigid transparent solidification substrate is attached to a resilient film, such as a silicone film. In another example, a rigid or semi-rigid transparent solidification substrate is attached to a resilient film which is in turn attached to a non-resilient film, such as an MFA film. In yet another example, a rigid or semi-rigid transparent solidification substrate is attached to a resilient film and a loose non-resilient film is provided between the resilient film and the rigid or semi-rigid transparent solidification substrate.

As an alternative to the structure depicted in FIG. 5, solidifiable material container assembly 30 may comprise a basin formed from polymeric materials. In one example, a basin comprising a transparent resilient bottom and resilient side walls is used. In certain implementations, both the transparent resilient bottom and the non-resilient side walls are formed from the same or different silicone polymers. In another implementation, a basin comprising non-resilient acrylic side walls and a resilient silicone bottom is used. In another example, the bottom of the basin is defined by a rigid or semi-rigid transparent solidification substrate 50 that is connected to side walls formed of a resilient or plastically deformable polymeric material. In a further example, the substrate 50 may be coated with a resilient transparent material, such as a silicone, that extends only a portion of the way to the side walls, leaving a peripheral gap around the coating and between the coating and the sidewalls. In yet another example, the substrate 50 may be coated with a resilient transparent material that extends all the way to the side walls. In certain examples, a tilting mechanism may be provided that tilts the basin with respect to the build platform 24 to peel solidified solidifiable material from the bottom of the basin. A non-resilient material such as a transparent non-resilient film 54 may also be provided as a layer on top of the resilient bottom between the resilient bottom and the build platform 24.

In the example of FIG. 8, a perimeter portion 55 of film 54 is disposed between inner frame 45 and outer frame 59, and another portion 57 inward of perimeter portion 55 stretches across upper surface 51 of rigid or semi-rigid transparent solidification substrate 48. In certain examples, film 54 is preferably stretched substantially taut and flush against rigid or semi-rigid transparent solidification substrate 48 to ensure that any solidifiable material in contact with film 54 solidifies evenly and is not distorted. To facilitate taut and flush film stretching, inner frame 45 may be provided with a lower wall surface 64 that is positioned below upper surface 51 of rigid or semi-rigid transparent solidification substrate 48. In certain examples, a vertical gap is created between upper surface 51 of rigid or semi-rigid transparent solidification substrate 48 and lower wall surface 64 which is at least about 0.2 mm, more preferably at least about 0.5 mm, and more preferably at least about 1.0 mm. The vertical gap is preferably no greater than about 3.0 mm, more preferably no greater than about 2.5 mm and even more preferably no greater than about 2.0 mm. In one example, a gap of 1.5 mm is used. In some applications, vacuum forces may cause film 54 to adhere to rigid or semi-rigid transparent solidification substrate 48, resulting in damage to the object 28 as build platform 24 pulls away from substrate 48. In such cases, an additional film (not shown) may be provided between rigid or semi-rigid transparent solidification substrate 48 and film 54. In certain embodiments, the additional film and/or substrate 48 has microtexturing, such as a plurality of grooves, which allow air to enter between the additional film and substrate 50, thereby preventing the formation of a vacuum.

Figure 17:
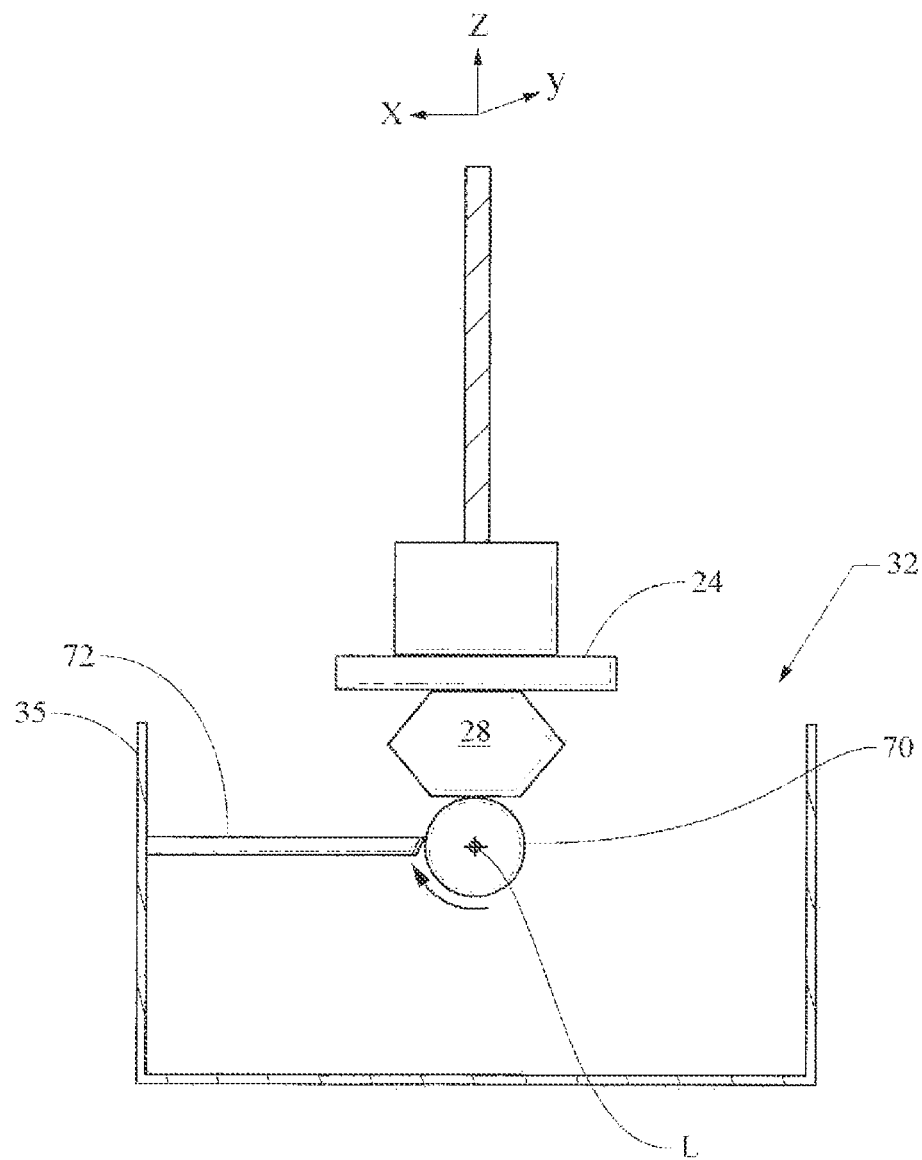
FIG. 17 is a close-up cross-sectional schematic view of a cleaning station used in a system for making a three-dimensional object from multiple solidifiable materials.

As shown in FIGS. 1-4, in certain embodiments, a cleaning station 32 is provided. Cleaning station 32 is provided to remove residual solidifiable material 31 or 33 from partially built object 28 prior to the application of the other solidifiable material 31 or 33. The use of cleaning station 32 facilitates the creation of a smooth interface between solidified object regions of material 31 and material 33. The cleaning station 32 may take a number of different forms, each of which is intended to remove residual solidifiable material 31 or 33 from the lower surface of object 28. In one example, depicted in FIG. 17, cleaning station 32 includes a housing 35 and an enclosed roller 70. The roller 70 is mounted with its longitudinal axis L substantially perpendicular to the build (z) axis and to the direction of travel (x direction) of solidifiable material assembly 29. Roller 70 is configured to rotate about its longitudinal axis L. During a cleaning operation, roller 70 contacts the lower exposed surface of object 28. Frictional contact between roller 70 and object 28 removes residual solidifiable material 31 or 33 from object 28. In one embodiment, a motor (not shown) is disposed in the housing 35 and is operatively connected to roller 70 to cause it to rotate. Roller 70 is preferably constructed of a material that is sufficiently rigid to remove solidifiable material 31 or 33 from object 28 without damaging object 28. One exemplary roller 70 material is a hard rubber. In one example, a fixed blade 72 is also disposed in housing 35 of cleaning station 32 and is in contact with roller 70 along its length. Fixed blade 72 removes solidifiable material 31 or 33 collected on roller 70 to provide a clean contact surface between roller 70 and object 28. Fixed Blade 72 may be constructed of a rigid or semi-rigid material such as a plastic, metal, or hard rubber and may act as a "squeegee" in removing solidifiable material 31 or 33 from roller 70. In the example of FIG. 17, roller 70 and blade 72 are configured so that during a given revolution, a given location on the surface of roller 70 contacts object 28 first and then contacts the underside of blade 72 (i.e., the side facing the bottom of the cleaning station 32) so that any material scraped off of roller 70 falls to the bottom of cleaning station 32.

In certain examples, it may be desirable to planarize the lower exposed surface of object 28 prior to applying a new solidifiable material. In one implementation, roller 70 comprises a plurality of blades (not shown). In another implementation, roller 70 comprises a helical cutter blade (not shown) that frictionally engages the lower exposed surface of object 28 to increase the planarity of the surface by removing solidifiable material 31 or 33 and/or by removing previously solidified material. In implementations that use a roller 70 with a helical cutter blade, fixed blade 72 may optionally be provided to remove residual material collected on the helical cutter blade and reduce the likelihood of clogging the inter-blade spaces therein. Cleaning station 32 may also include a source of solidification energy that can be used to solidify any remaining unsolidified solidifiable material that is not otherwise removed from object 28. Alternatively, the solidification of such material can be carried out by pattern generator 22 or another pattern generator after cleaning station 32 performs a cleaning operation.

In another embodiment, cleaning station 32 may be configured as an enclosure with its interior substantially isolated from the atmosphere. A compressor 74 (not shown) may be provided within the interior of cleaning station 32 to control and maintain the interior pressure in cleaning station 32 below atmospheric pressure (i.e., at "sub-atmospheric pressure"). During a cleaning operation, object 28 is completely or partially inserted into cleaning station 32 and subjected to the sub-atmospheric pressure maintained therein, causing residual solidifiable material to separate from object 28. In one example, an expandable and retractable bellows is provided which partially encloses object 28 and build platform 24. During a cleaning operation, the bellows is adjusted, preferably automatically using a suitable control mechanism, to substantially seal object 28 from the atmosphere. A subatmospheric pressure is created in the interior of the bellows, using a compressor 74 (not shown). Embodiments using a vacuum system in this manner may also be combined with rollers, helical cutter blade rollers, and/or fixed blades based on the system design and desired results.

Figure 24:
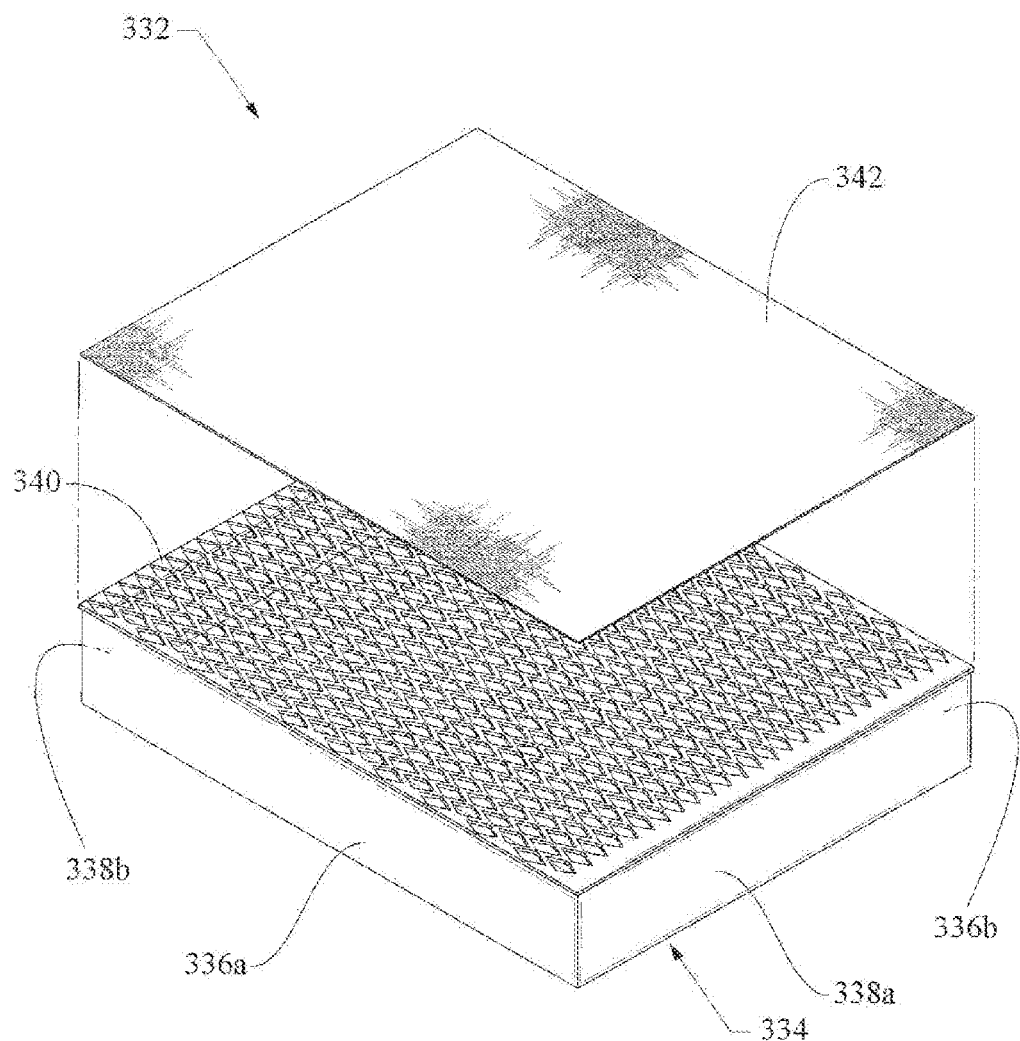
FIG. 24 is an exploded perspective view of a vacuum cleaning station for use with a system of making a three-dimensional object from multiple solidifiable materials.
Figure 25:
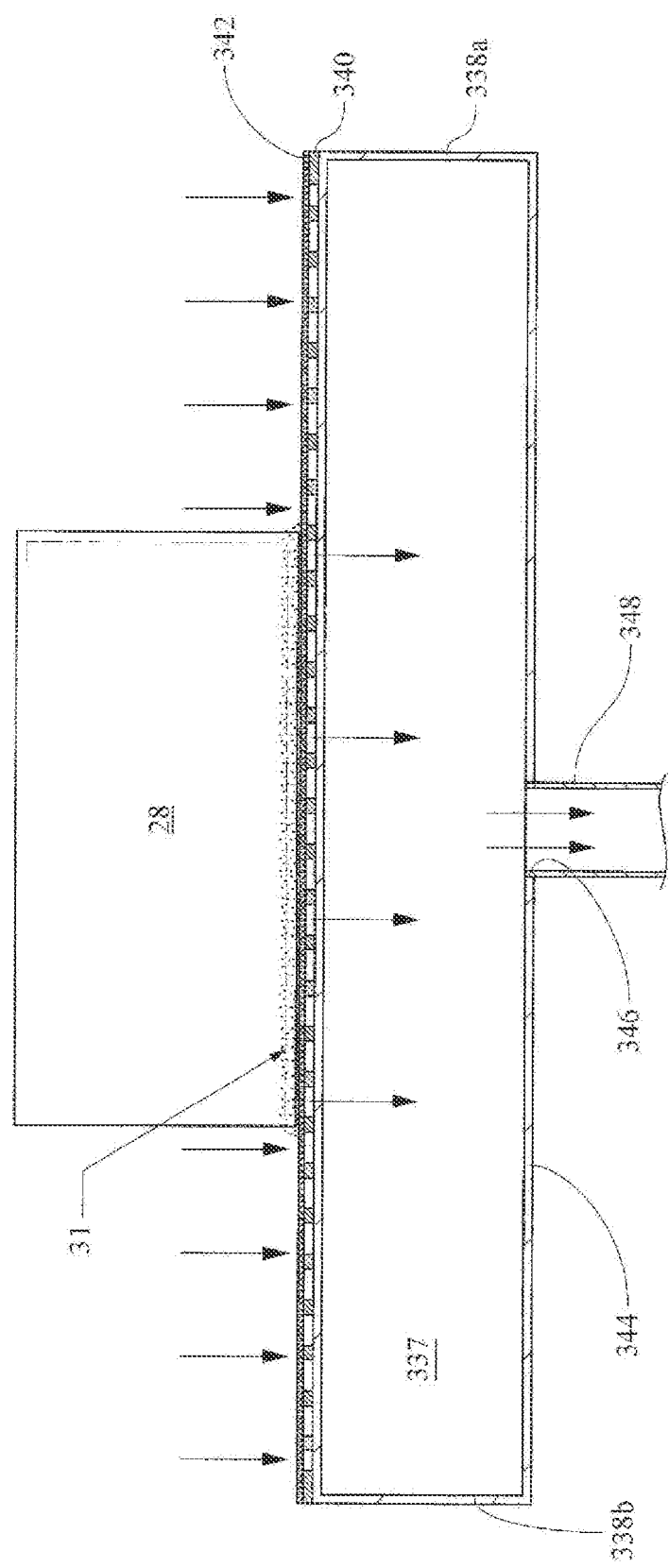
FIG. 25 is a cross-sectional schematic view of the vacuum cleaning station of FIG. 24 in operation removing unsolidified solidifiable material from a three-dimensional object surface.

Another example of a cleaning station that can be used to apply a subatmospheric pressure to a three-dimensional object surface is provided in FIGS. 24-25. In this example, no bellows is used to enclose or isolate the object from the atmosphere. Instead, a surface of the three-dimensional object is placed in fluid communication with a region of subatmospheric pressure without enclosing the object. In accordance with the figures, cleaning station 332 comprises an enclosure 334 having an air-permeable upper surface in fluid communication with an interior space that is selectively adjustable to and maintainable at a subatmospheric pressure. In the embodiment of FIGS. 24-25, perforated mesh layer 340 provides an upper air-permeable surface. If desired, an additional air permeable layer can also be provided, such as mesh layer 342. In the exemplary embodiment, the upper air permeable layer 342 has a finer mesh than does the upper air permeable layer 340. In certain examples, the air permeable layer 340 is formed from rigid plastic or metal, and the upper air permeable layer 322 is a plastic mesh.

Enclosure 334 further comprises a first set of opposing side walls 336a and 336b, second set of opposing side walls 338a and 338b, and bottom 344. Upper air permeable layer 340 is preferably spaced apart from bottom 344 in the build axis direction, which is the z-axis direction in FIGS. 1-4.

As shown in FIG. 25, bottom 344 includes a vacuum line port 346 for connecting a vacuum line 348. Vacuum line 348 is connected to a vacuum source (not shown) that is in fluid communication with interior space 337. In preferred examples, the vacuum source can be selectively activated and deactivated to selectively maintain the interior space 337 at subatmospheric pressure when it is desired to remove residual solidifiable material 31 from a solidified object surface of object 28. In certain examples, the most recently solidified surface of object 28 is placed in contact with the air permeable upper surface (340 or 342 if an additional mesh layer is used) of enclosure 334, and the vacuum source is activated to reduce the pressure of enclosure interior 337 to a subatmospheric pressure. The application of the subatmospheric pressure to the unsolidified material 31 causes the material to flow into enclosure 334 and into vacuum line 348 for subsequent removal. In certain examples, force or pressure sensors may be used to activate the vacuum source when a threshold force or pressure is exerted against the air-permeable upper layer 342 and/or air permeable upper layer 340. Alternatively, position sensors could be used to activate the vacuum source based on the position of the build platform with respect to cleaning station 332.

Referring again to FIGS. 1-4, in another example, cleaning station 32 comprises an ultrasonic tank in which aqueous, organic or aqueous-organic solvent is contained. Ultrasonic waves are generated in the solvent by an ultrasonic wave generator to cause cavitation and clean object 28. In one example, a mixture of water and a polar organic solvent is provided. In another example, the polar organic solvent is an organic alcohol. In one particular implementation, the solvent comprises a mixture of isopropyl alcohol and water in a defined ratio. The amount of isopropyl alcohol (by volume) is preferably from about 50% to about 90%, more preferably from about 65% to about 85%, and even more preferably from about 70% to about 80% of the total mixture volume. In accordance with the example, the object 28 and build platform 24 are immersed in the solvent and then removed. The object 28 and build platform 24 are then blown with dry air to remove residual solvent, after which the next solidifiable material may be applied and solidification may resume.

In certain methods of making a three-dimensional object from a photohardenable material, the exposed (downward-facing) surface of the object 28 will be submerged below the upward-facing surface (i.e., the surface facing upward in the build (z) axis direction) of solidifiable material 31, 33 in solidifiable material container assembly 30, 34. In certain examples, the distance between the exposed surface of object 28 and the bottom of the solidifiable material container assembly 30, 34 ranges from about 20 microns to about 80 microns, preferably from about 40 microns to about 60 microns, and more preferably from about 45 microns to about 55 microns. In some examples, the distance from the exposed surface of object 28 and the bottom of solidifiable material container assembly 30, 34 is the maximum depth of solidification at any point in the x,y plane. In certain examples, the level of solidifiable material 31, 33 in its respective solidifiable material container assembly 30, 34 (i.e., the distance from the upward facing surface of the solidifiable material 31, 33 and the bottom of the corresponding solidifiable material container assembly 30, 34) ranges from about 0.5 mm to about 4 mm, more preferably from about 1 mm to about 3 mm, and even more preferably from about 1.5 mm to about 2.5 mm. In those implementations in which the object 28 is submerged beneath the upper surface of solidifiable material 31, 33, the solidifiable material 31, 33 may accumulate around the perimeter of the object 28. It may be desirable to remove the accumulated solidifiable material 31, 33 before switching materials. In such embodiments, the use of a cleaning station 32 with a solvent of the type described previously can advantageously be used to remove accumulated unsolidified solidifiable material 31, 33 around the perimeter of object 28. In accordance with such embodiments, object 28 is preferably submerged in the solvent to a depth sufficient to remove the accumulated unsolidified solidifiable material 31, 33. In accordance with one example, the level of solidifiable material 31 in solidifiable material container assembly 30 (relative to the bottom of assembly 30) is about 2 mm, and the distance between the lower exposed surface of object 28 and the bottom of solidifiable material container assembly is about 50 microns (0.050 mm). Following solidification of material 31, object 28 is cleaned in cleaning station 32. When object 28 is cleaned, it is preferably immersed in the solvent to a level of about 2 mm relative to the exposed bottom surface of object 28 to ensure that residual solidifiable material 31 is substantially completely removed. In certain examples, the solvent depth to which the object 28 is submerged in the cleaning station 32 solvent is at least as great as the depth to which object 28 was submerged in solidifiable material 31 or 33 at the time of the previous solidification (exposure) prior to cleaning.

The example of FIGS. 1-4 provides a system 20 in which multiple materials may be used to construct a three-dimensional object while maintaining a fixed alignment in the x-y plane (i.e., orthogonal to the build (z) axis) between the build platform 24 and both the build region 46 and pattern generator 22, thereby eliminating distortions in object 28 that can arise when the x-y alignment between build platform 24 and pattern generator 22 is disturbed during solidifiable material changes or cleaning operations.

Figure 9:
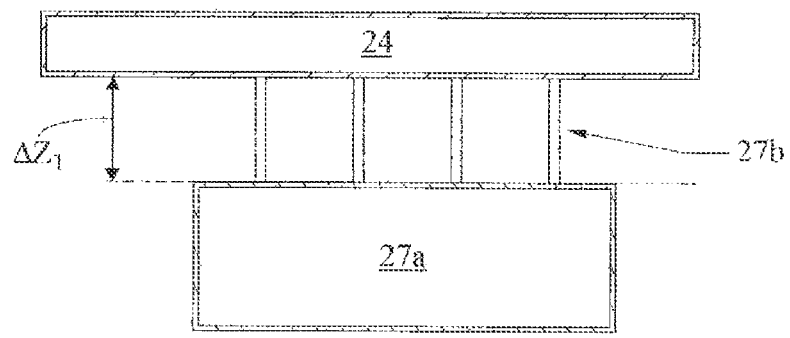
FIG. 9 is a cross-sectional schematic view of a first exemplary three-dimensional object comprising a finished object region and a support region.
Figure 10:
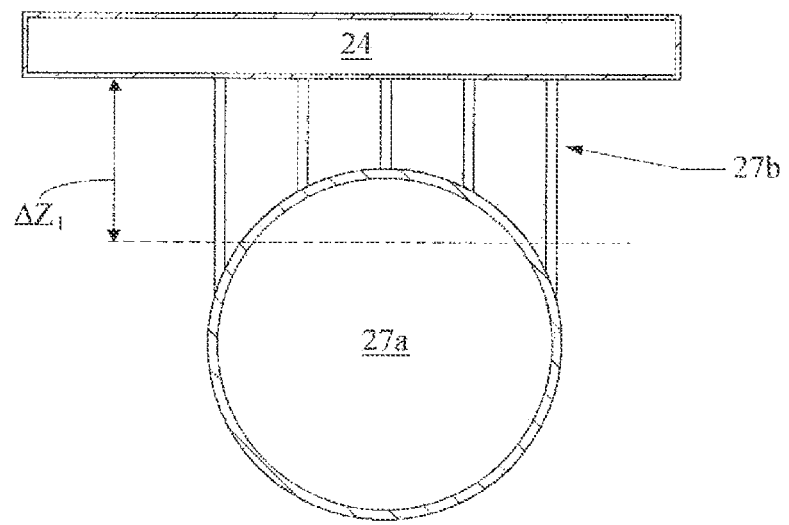
FIG. 10 is a cross-sectional schematic view of a second exemplary three-dimensional object comprising a finished object region and a support region.

A method of using system 20 to build a three-dimensional object from multiple solidifiable materials will now be described. In this example, an unfinished object 28 is formed which comprises both a finished object section 27a (FIGS. 9 and 10) and a removable support section 27b (FIGS. 9 and 10). The removable support section 27b comprises one or more sections of solidified material which connect the finished object section 27a to build platform 24. Following the completion of the build process, the removable support section 27b is removed by mechanical means, heat, and/or the application of a solvent that dissolves the support section 27b (e.g., water), thereby yielding the finished object 27a.

In certain examples, support section 27b is dissolvable with a water-based solvent (e.g., water or alkali-water solutions) and/or organic-based solvent (e.g., acetone, isopropyl alcohol, etc.). Examples of suitable solvent-dissolvable support materials include water-soluble highly ethoxylated acrylates and methacrylates, water soluble polyethylene glycol acrylates and methacrylates, photopolymers based on hygropscopic acrylated monomers, photopolymers based on acryalted monomers with acid functionality, and alki soluble acrylic resins.

Examples of suitable water-soluble highly ethoxylated acrylates and methacrylates include water-soluble ethoxylated bisphenol A dimethacrylates, ethoxylated bisphenol A diacrylates, and ethoxylated alkyl trialkylates. One example of a suitable ethyoxylated methacrylate is SR 9036A, an ethyoxylated bisphenol A dimethacrylate which is supplied by Sartomer and which includes 30 moles of ethoxy functionality per mole of the compound. An example of a suitable ethoxylated diacrylate is CD 9038, an ethoxylated bisphenol A diacrylate which is supplied by Sartomer and which includes 30 moles of ethoxy functionality per mole of the compound. An example of a suitable ethyoxylated alkyl trialkylate is SR 415, an ethoxylated trimethylpropane triacrylate supplied by Sartomer and comprising 20 moles of ethoxy functionality per mole of compound. Another example of a suitable ethoxylated alkyl trialkylate is SR 9035, an ethoxylated trimethylpropane triacrylate with 15 moles of ethoxy functionality per mole of compound.

Suitable water-soluble photopolymers based on hygroscopic acrylated monomers include those based on SR 256, a 2(2-ethoxyethoxy) ethyl acrylate monomer supplied by Sartomer or N,N-DMA (dimethylacrylamide). Suitable water-soluble photopolymers based on acrylated monomers with acid functionality include those based on β-carboxyethyl acrylate. Suitable water-soluble photopolymers based on alkali soluble acrylic resins include those based on alkali-soluble acrylic resins supplied by Inortech Chimie. Suitable polyethylene glycol acrylates and methacrylates include SR 344, a polyethylene glycol (400) diacrylate supplied by Sartomer, SR 610, a polyethylene glycol (600) diacrylate, supplied by Sartomer, and SR 252, a polyethylene glycol (600) dimethacrylate supplied by Sartomer.

In FIGS. 1-4, object 28 is depicted generically. However, a method will now be described in which object 28 comprises both a support region and a finished object region. Although supports are not separately shown, it should be understood that for purposes of this exemplary method they are formed in the operation depicted in FIG. 2 while the finished object is formed in the operation depicted in FIG. 4.

Figure 4:
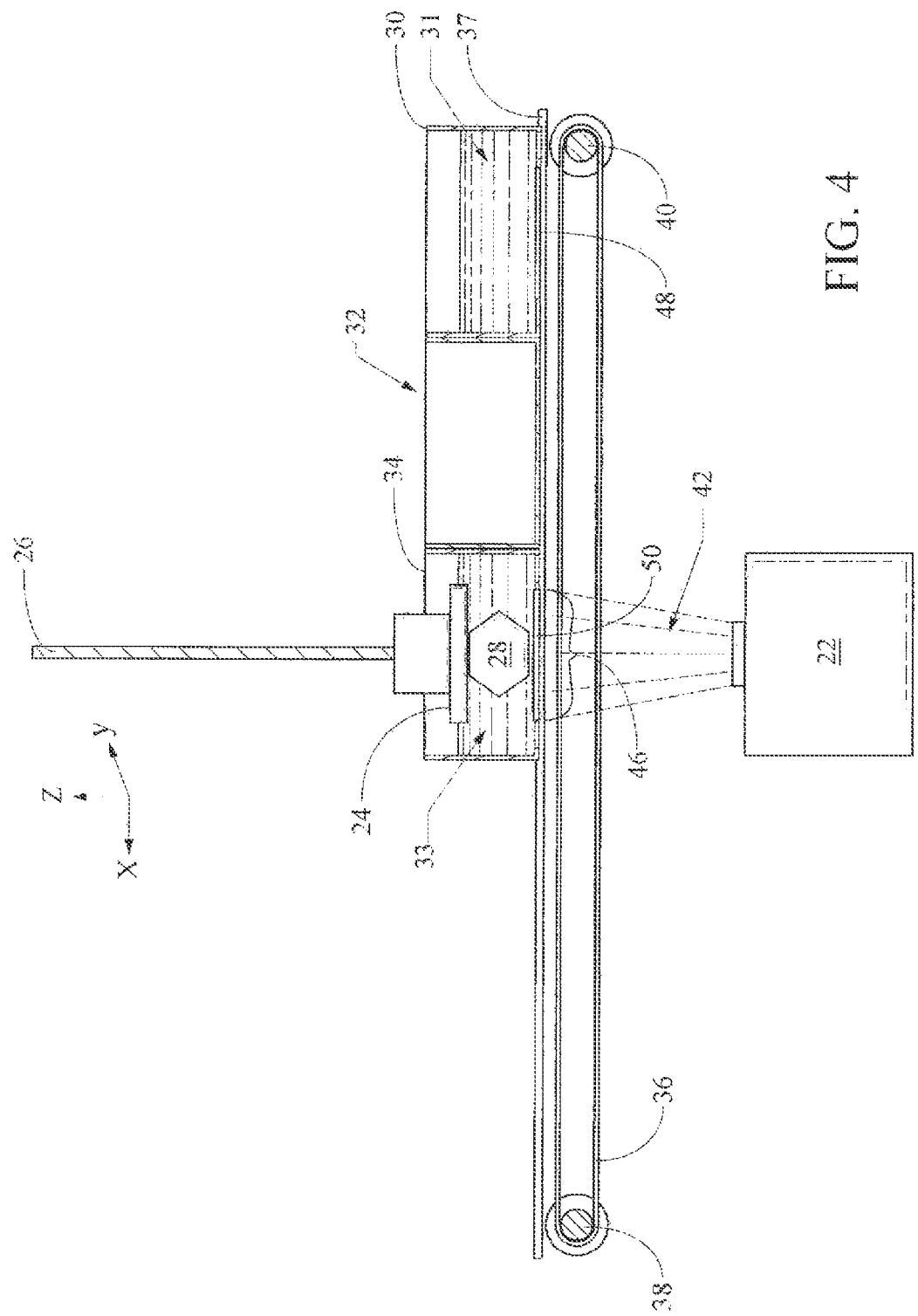
FIG. 4 is a depiction of the system of FIG. 1 in a fourth configuration.

Referring to FIG. 4, solidifiable material assembly 29 is positioned with rigid or semi-rigid transparent solidification substrate 50 in solidification region 46, thereby allowing projected energy pattern 42 to contact and solidify solidifiable material 33. Object 28 (which comprises a removable support region at this point) is wholly or partially immersed in solidifiable material 33 so that its lower exposed surface is spaced apart from rigid or semi-rigid transparent solidification substrate 48 by the maximum curing depth in the x, y plane. In voxel-based systems, this depth will be the maximum voxel depth. This spacing ensures that the lower exposed solidified surface will contact the next solidified region and maintain the integrity of object 28.

Projected energy pattern 42 causes solidifiable material 33 to solidify in accordance with the projected pattern 42. In voxel-based systems or systems in which varying energy densities are provided in the projection (x-y) plane, solidification depths in the build (z) axis direction will vary across the x-y plane. A series of energy patterns is projected, and the build platform 24 moves upward to progressively build object 28. In FIG. 4 object 28 comprises only a removable object support region (such as region 27b shown in FIG. 9) which is attached to build platform 24. Multiple exposures are provided using one or more energy patterns 42 to progressively build the support region in the build (z) axis direction.

At some point during the build process, a transition will be made from the formation of removable supports to the formation of the finished object. In the example of FIG. 9, the transition occurs when the lower-most solidified object section is at a position $\Delta z_1$ relative to build platform 24. To make the transition, solidifiable material assembly 29 moves to the configuration of FIG. 3 to align object 28 with cleaning station 32. As shown in FIGS. 1-4, after applying solidifiable material 33, solidifiable material assembly 29 moves to the left to move cleaning station 32 toward the build (z) axis defined by shaft 26. At the same time, solidifiable material container assembly 34 moves away from the build (z) axis, and solidifiable material container assembly 30 moves toward it. Cleaning station 32 cleans and/or planarizes the lower exposed surface of object 28 in the manner described previously. During or after the cleaning operation, any residual liquid remaining on the surface of the solidified object 28 may be solidified such as by exposing object 28 to solidification energy of a suitable wavelength.

Following the completion of cleaning and/or planarization, solidifiable material assembly 29 moves to the position shown in FIG. 2 to create some or all of the finished object region (such as region 27a in FIG. 9). Object 28 is wholly or partially immersed in solidifiable material 31 such that its lower-most exposed surface is separated from rigid or semi-rigid transparent solidification substrate 48 by no more than the maximum curing depth anywhere in the x, y plane, which is the maximum voxel depth in voxel-based systems. Pattern generator 22 projects energy pattern 42 to solidify solidifiable material 31 in contact with the previously solidified object. Build platform 24 moves upwards to allow unsolidified solidifiable material 31 to flow under object 28 for subsequent solidification. The process continues and object 28 is progressively built in the build (z) axis direction. In certain implementations, a "continuous build" process is used in which build platform 24 moves during one or more exposures and between one or more exposures. In other implementations, build platform 24 remains stationary during one or more exposures. In the example of FIGS. 1-4, two solidifiable materials 31 and 33 are used. However, additional solidifiable materials may be used. For example, one solidifiable material may be used to create object supports and two or more others may be used to create what will ultimately be the finished object. If multiple cleaning operations are carried out, during or after any or all of such operations, residual unsolidified solidifiable material remaining on the object 28 may be solidified by exposure to solidification energy from pattern generator 22 or another suitable source of such energy.

In the example of FIG. 10, finished object section 27a has a curved surface that is connected to build platform 24 via removable supports 27b. As indicated in the figure, in such examples, a portion of support region 27b and a portion of finished object region 27a will be formed at the same build axis (z) position. One such position is identified with a dashed line in FIG. 10 and is positioned at a distance $\Delta z_1$ relative to build platform 24. In such cases, both material 31 and 33 must be applied at the same build platform 24 position along the build (z) axis. In one example, solidifiable material assembly 29 is positioned as shown in FIG. 4 to create portions of support region 27b and is then moved to the position of FIG. 3 for cleaning. While maintaining build platform 24 at the same z-axis position as shown in FIG. 4, solidifiable material assembly 29 is then moved to the position of FIG. 2 to apply solidifiable material 31 and create the portions of finished object section 27a dictated by energy pattern 42. Thus, at the same z-axis position, two different energy patterns 42 will be projected, each respectively corresponding to the support region 27b (using solidifiable material 33) and the finished object region 27a (using solidifiable material 31).

Referring to FIGS. 11-14, a first alternate embodiment of a system 120 for making a three-dimensional object is depicted. In FIGS. 11-14, at least one of a build platform 124 and a source of a solidifiable material 131 is movable in the x-axis direction with respect to the other of the source of the solidifiable material 131 and the build platform 124. In the illustrated example, solidifiable material assembly 129 comprises sources of both of solidifiable materials 131 and 133 (shown in FIG. 16) and is movable in the x-axis direction with respect to the build platform 124. As with the previous embodiments, system 120 may used to prepare a three-dimensional object from multiple materials. The principal difference between the embodiment of FIGS. 11-14 and that of FIGS. 1-4 is in the design and operation of the solidifiable material container assemblies 130 and 134. In the embodiment of FIGS. 11-14, solidifiable material container assemblies 130 and 134 comprise film transfer imaging assemblies. Suitable film transfer imaging assemblies are known in the art and include those disclosed and described in U.S. Pat. No. 7,614,866, the entirety of which is hereby incorporated by reference.

Figure 11:
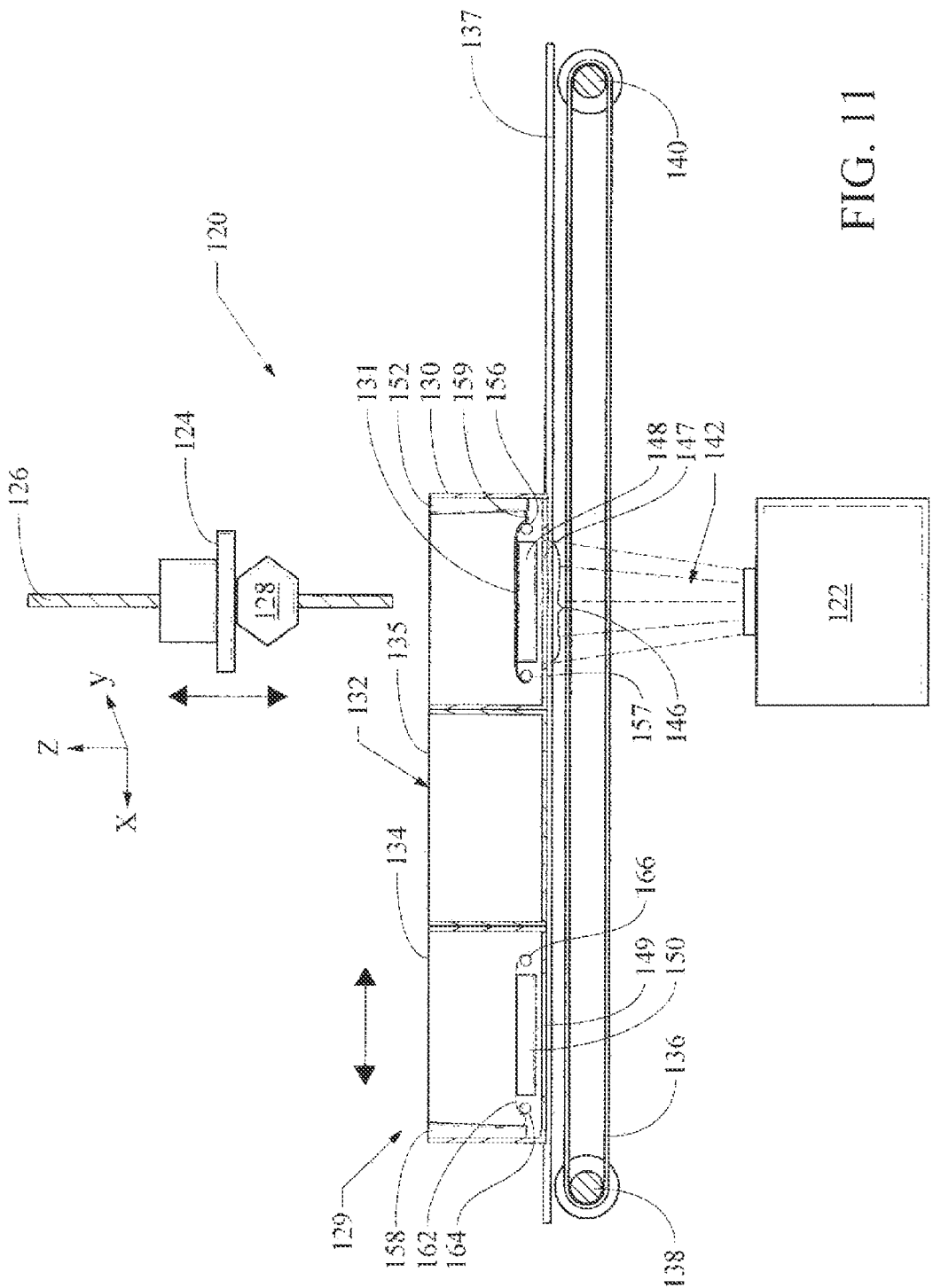
FIG. 11 is a cross-sectional schematic view of a first alternate embodiment of a system for making a three-dimensional object from multiple solidifiable materials depicted in a first configuration.

Referring to FIG. 11, solidifiable material container assembly 130 comprises a cartridge 152 having a transparent film 159 that is partially disposed in cartridge 152 and which is extendable therefrom and retractable thereinto. Cartridge 152 and transparent film 159 comprise a source of solidifiable material 131. Correspondingly, solidifiable material container assembly 134 comprises a cartridge 158 having a transparent film 162 that is partially disposed in cartridge 158 and which is extendable therefrom and retractable thereinto. Cartridge 158 and transparent film 162 comprise a source of solidifiable material 133. Transparent films 159 and 162 preferably allow electromagnetic radiation from pattern generator 122 to pass without significantly altering the wavelengths and/or intensities of the passing radiation. In certain implementations, transparent films 159 and 162 are composed of one or more fluoropolymer resins, such as poly (propylene), poly (carbonate), fluorinated ethylene propylene, and mixtures and copolymers thereof. Polytetrafluororetheylene (PTFE) films including Teflon® films are generally suitable.

Figure 16:
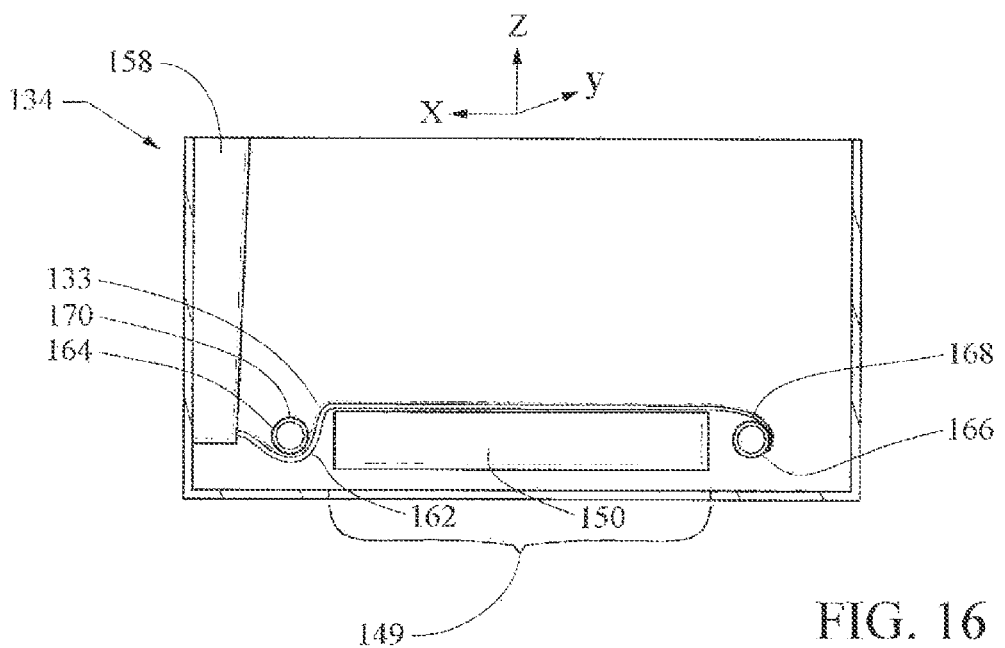
FIG. 16 is a close-up cross-sectional schematic view of an alternative exemplary solidifiable material container assembly comprising a film transfer imaging assembly.

Each cartridge 152 and 158 includes a volume of a corresponding solidifiable material, 131 and 133 (not shown in FIG. 11), respectively disposed in its interior along with a coating apparatus (not shown) for applying a coating to the respective films. Suitable coating apparatuses include the gravure coating apparatuses disclosed in U.S. Pat. No. 7,614,866. When each film 159 and 162 is in a retracted position, a retracted portion of film is disposed within the interior of its respective cartridge, 152 and 158. During a film coating operation, the previously retracted portions of films 159 and 162 are extended from their respective cartridges 152 and 158, causing a coating of the respective solidifiable material 131 and 133 to be applied to the previously retracted portion of the corresponding film 159 and 162. The partially built object 128 is then moved downward along the build (z) axis to contact the coating, and a solidification energy pattern 142 is projected to solidify selected portions of the coating in contact with object 128. Cartridge 152, film 159 and rigid or semi-rigid transparent solidification substrate 148 collectively define a solidifiable material supply unit for supplying solidifiable material 131. Correspondingly, cartridge 158, film 162, and rigid or semi-rigid transparent solidification substrate 150 collectively define a solidifiable material supply unit for supplying solidifiable material 133 (FIG. 16).

Referring to FIG. 11, system 120 is shown following the coating of film 159 with a thin layer solidifiable material 131. Film 159 is in an extended configuration in which it stretches across the surface of rigid or semi-rigid transparent solidification substrate 148. A variety of techniques and devices can be used to extend film 159 from cartridge 152, such as by connecting the free end of film 159 to a linear drive mechanism that pulls film 159 away from cartridge 152. Such mechanisms are disclosed and described in U.S. Pat. No. 7,614,866, mentioned previously. In certain examples, rollers 156 and 157 are provided and are spaced apart along the x-axis (i.e., along the direction in which solidifiable material assembly 129 moves). In FIG. 11, film 162 is in a retracted configuration with respect to cartridge 158 as solidifiable material container assembly 134 is not being used.

Figure 12:
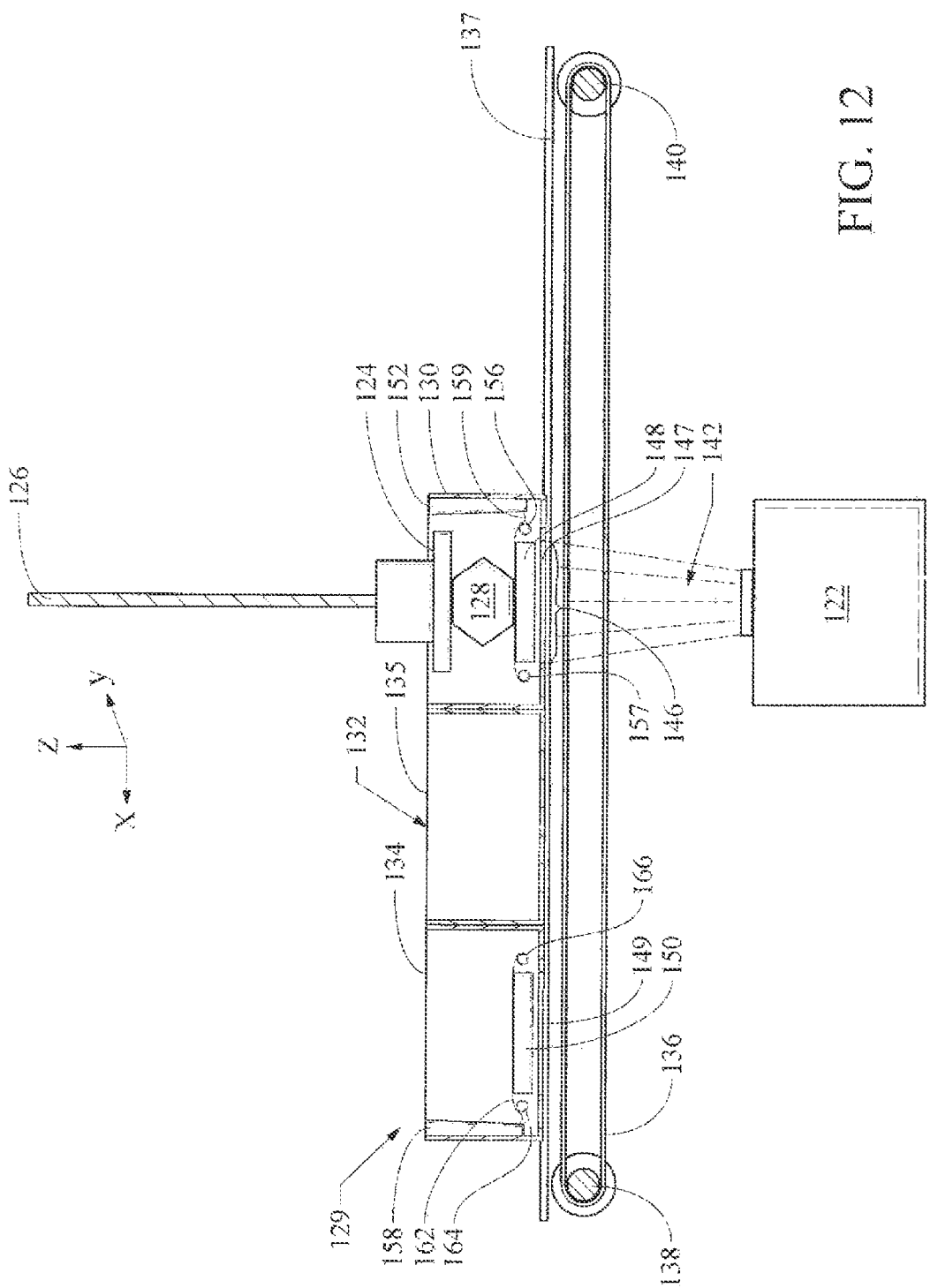
FIG. 12 is a depiction of the system of FIG. 11 in a second configuration.

Following the application of a coating of solidifiable material 131 to film 159, build platform 124 is moved from the position of FIG. 11 in the negative build (z) axis direction toward solidifiable material container assembly 130 until arriving at the build (z) axis position shown in FIG. 12. In FIG. 12, partially built object 128 is in contact with the coating (not shown) of solidifiable material 131 on transparent film 159. Once object 128 is in contact with the coating, a desired energy pattern 142 is projected from pattern generator 122 to solidify portions of the coating in contact with film 159 and in correspondence with the shape of the object defined by the object data (e.g., voxels, bitmaps, etc.) at the current build (z) axis position. Projected energy pattern 142 travels through an opening 147 in the bottom of solidifiable material container assembly 130, through rigid or semi-rigid transparent solidification substrate 148, and through film 159. The projected energy pattern 142 determines which regions of the coating solidify. Following the solidification of solidifiable material 131, build platform 124 is moved (or continues to move) vertically upward in the positive build (z) axis direction, thereby separating object 128 from film 159. Film 159 is then partially retracted into cartridge 152 to apply fresh coating to film 159. The film 159 is then extended and the process repeats until either cleaning or a change in solidifiable material is desired. In certain embodiments, cartridge 152 includes a blade or similar device at the opening through which film 159 projects to remove uncured solidifiable material and to ensure an even coating level.

Figure 13:
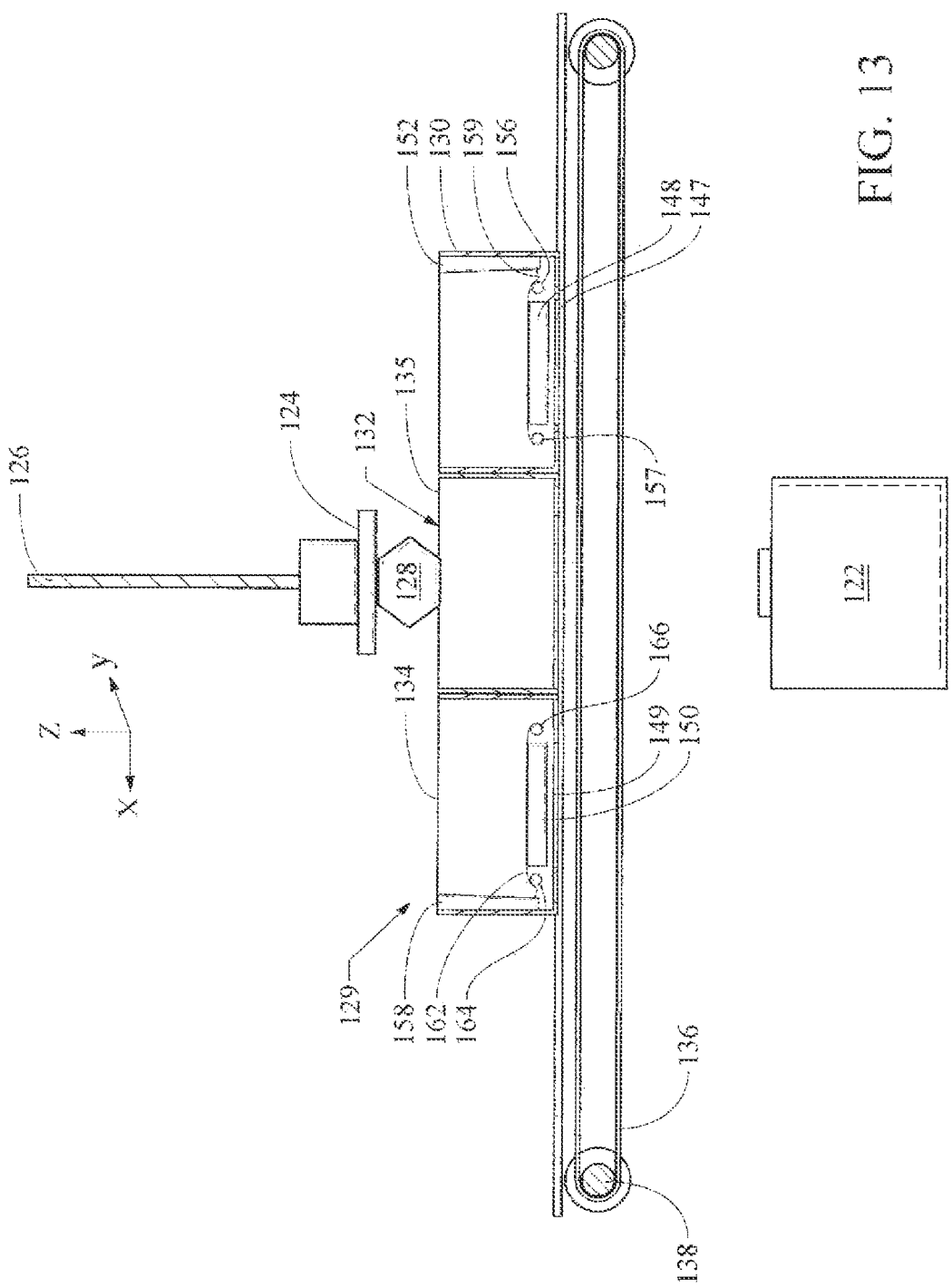
FIG. 13 is a depiction of the system of FIG. 11 in a third configuration.

Following the desired number of coating and solidification operations with solidifiable material 131, solidifiable material assembly 129 is moved in the x-direction to move cleaning station 132 and solidifiable material container assembly 134 toward build platform 124 and the build (z) axis. Simultaneously, solidifiable material container assembly 130 moves in the x-axis direction away from build platform 124 and the build (z) axis. Cleaning station 132 is similar to cleaning station 32 described previously. As shown in FIG. 13, build platform 124 is moved vertically downward in the negative build (z) axis direction to engage object 128 with cleaning station 132 and remove any residual solidifiable material 131. If a planarizer is provided, it may be used to planarize the lower exposed surface of object 128. Solidification energy may then be applied to solidify any remaining unsolidified solidifiable material that was not removed by cleaning station 32.

Following a cleaning operation, solidifiable material 133 may be applied. Thus, object 128 is disengaged from cleaning station 132 by moving build platform 124 in the positive build (z) axis direction. Solidifiable material assembly 129 is then moved in the x-direction to move solidifiable material container assembly 134 toward build platform 124 and the build (z) axis. Simultaneously, both cleaning station 132 and solidifiable material container assembly 130 move away from build platform 124 and the build (z) axis in a direction along the x-axis, i.e., along the direction of movement of solidifiable material assembly 129.

Figure 14:
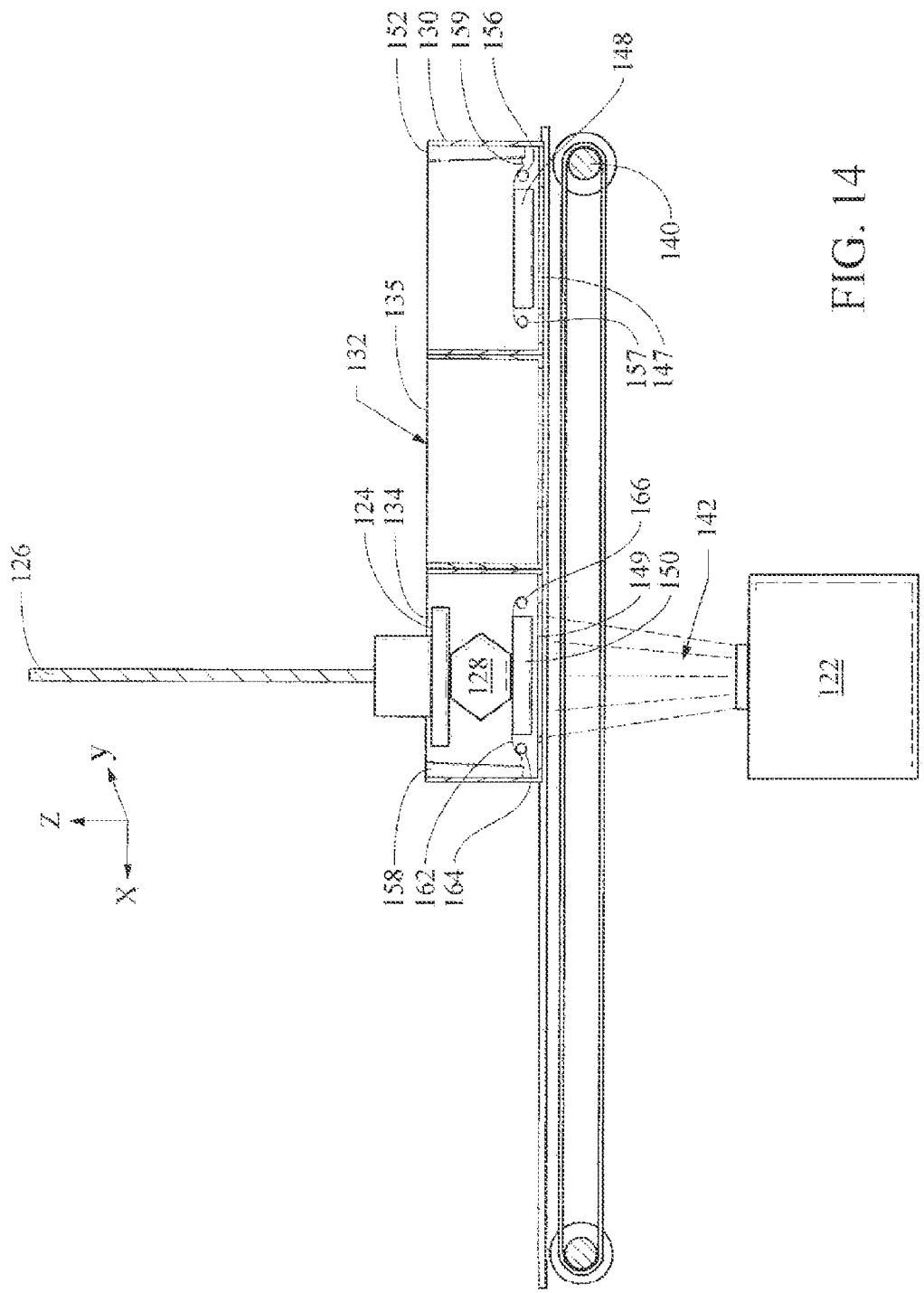
FIG. 14 is a depiction of the system of FIG. 11 in a fourth configuration.

As shown in FIG. 14, film 162 is extended from the retracted configuration shown in FIG. 12 to an extended configuration in which film 162 extends along the upper surface of rigid or semi-rigid transparent solidification substrate 150. A variety of techniques and devices can be used to extend film 162 from cartridge 158, such as those described previously with respect to film 159. The extension of film 162 causes a coating to be applied from cartridge 158 to the upper facing surface of film 162. In the example of FIGS. 11-14, rollers 164 and 166 are spaced apart along the x-axis and assist in maintaining film 162 in a taut condition flush against rigid or semi-rigid transparent solidification substrate 150.

Once a coating of solidifiable material 133 (not shown in FIG. 14) is applied to the upper surface of film 162, build platform 124 moves in the negative build (z) axis direction to contact the coating. Pattern generator 122 then projects an energy pattern corresponding to the shape of object 128 at its current build (z) axis position. Projected energy pattern 142 travels through opening 149 in the bottom of solidifiable material container assembly 134, through rigid or semi-rigid solidification substrate 150, and through film 162, causing solidifiable material 133 to solidify in contact with film 162 and in a pattern corresponding to the projected energy pattern 142. Following the solidification, film 162 is retracted into cartridge 158 to apply fresh solidifiable material 133 thereto.

In certain examples, the cartridge opening through which film 162 is extendably and retractably disposed may include a blade or other device for scraping unsolidified material 133 from the upper surface of film 162 and to ensure that the subsequently applied coating is applied evenly. The process then repeats itself until a cleaning operation or change in solidifiable material is desired, or the conclusion of the build process is reached.

Figure 15:
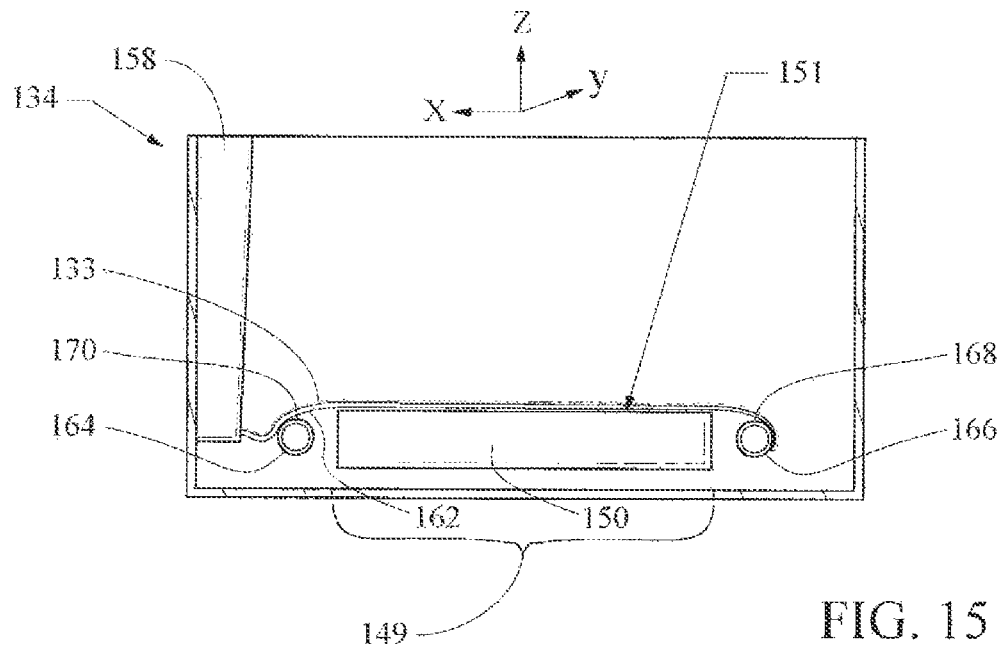
FIG. 15 is a close-up cross-sectional schematic view of an exemplary solidifiable material container assembly comprising a film transfer imaging assembly.

Referring to FIGS. 15-16, close-up views of alternate embodiments of a solidifiable material container assembly comprising a film transfer imaging apparatus are depicted. The depicted embodiments may be used for either or both of solidifiable material container assembly 130 and 134. FIGS. 15 and 16 illustrates their respective examples using assembly 134.

As mentioned previously, in certain examples it is desirable to ensure that film 162 is stretched smoothly and tautly across the upper surface 151 of rigid or semi-rigid transparent solidification substrate 150. In the example of FIG. 15, this is achieved by providing rollers 164 and 166 such that their upper tangent points 168 and 170 are below (in the negative build (z) axis direction) the upper surface 151 of rigid or semi-rigid transparent solidification substrate 150. In the embodiment of FIG. 15, film 162 is stretched over the uppermost tangent point 170 of roller 164 and over roller 166. Another implementation is depicted in FIG. 16 in which film 162 is stretched under roller 164. The implementation of FIG. 16 causes roller 164 to contact solidifiable material coating 133 on film 162. Thus, measures are preferably taken to minimize coating distortion due to contact with the roller 164. In contrast, in the example of FIG. 15, the coating 133 does not contact the roller 164. However, in certain implementations, positioning the lower tangent point of roller 164 below the cartridge 158 opening (not shown) through which film 162 retractably extends and positioning the upper tangent point of roller 164 below upper surface 151 of rigid or semi-rigid transparent solidification substrate 150 improves the tautness and planarity of film 162, thereby improving the smoothness and accuracy of object 128.

As discussed earlier, a variety of techniques may be used to extend and retract film 162 from cartridge 158, including those disclosed and described in U.S. Pat. No. 7,614,866. However, film 162 may also be spooled on roller 166, and the rotation of roller 166 may be driven (e.g., by a motor drive) to extend the film from cartridge 158. The other end of film 162 may be spooled on an internal spool within cartridge 158. The internal spool may be spring loaded to bias the spool into the retracted configuration.

The embodiment of FIGS. 11-14 advantageously allows multiple solidifiable materials to be used to create a three-dimensional object using film imaging techniques. In certain embodiments, the three-dimensional object may comprise a finished object region and a support region, as illustrated in the examples of FIGS. 9 and 10. Like the example of FIGS. 1-4, system 120 allows multiple materials to be used to construct a three-dimensional object while maintaining a fixed alignment in the x-y plane (i.e., orthogonal to the build (z) axis) between the build platform 124 and pattern generator 122, thereby eliminating distortions in object 128 that can arise when the x-y alignment between build platform 124 and pattern generator 122 is disturbed during solidifiable material changes or cleaning operations.

In the example of FIGS. 11-16, the solidifiable material container assemblies 130 and 134 each include film transfer imaging assemblies (i.e., cartridge 158/film 162 and cartridge 152/film 159) in which the film 159, 162 moves with respect to its corresponding cartridge 152, 158. In accordance with a modification of the assemblies 130 and 134 of FIGS. 11-16, each assembly may include corresponding stationary films which are coated with a corresponding solidifiable material 131, 133 by a corresponding brush, wiper, roller or other type of applicator. Solidification of the solidifiable materials 131, 133 by pattern generator 122 would occur as in the example of FIGS. 11-16. However, the solidification process will leave residual solidifiable material on the stationary films. Thus, the brush, wiper, roller or other type of applicator will traverse its corresponding stationary film to remove residual unsolidified solidifiable material following a solidification step and will then apply a fresh coating to the stationary film prior to a subsequent solidification step. Alternatively, different applicators can be used to apply fresh solidifiable material and to remove residual solidifiable material remaining after solidification.

Referring to FIGS. 18-23, a second alternate embodiment of a system for making a three-dimensional object from multiple solidifiable materials is depicted. The system is a modified version of the system 20 and solidifiable material assembly 29 of FIGS. 1-4, and like numerals in FIGS. 18-23 refer to like components in FIGS. 1-4. Thus, solidifiable material assembly 29 moves in the x-axis direction relative to build platform 24 and shaft 26. Shaft 38 is rotatably driven by a motor (not shown) to rotate pulley 40 (and a parallel counterpart pulley that is not shown) and move belt 36 and a parallel counterpart belt (not shown) to translate the assembly 29 along a frame assembly (not shown). The modified version of solidifiable material assembly 29 includes a cleaning station 32 that itself comprises at least two cleaning stations (or "substations"). In the depicted embodiment, cleaning station 32 comprises four cleaning stations 232a-232d. The at least two cleaning stations, 232a and 232c, are intended to provide successive washes to remove residual solidifiable material from a surface of object 28. In the example of FIGS. 18-23, second solidifiable material 33 is solidified to create a first solidified portion of object 28 before applying and solidifying first solidifiable material 31, as would be the case when second solidifiable material 33 is used to form a support section and first solidifiable material 31 is used to form a finished object section. Thus, following the application and solidification of solidifiable material 33, an object surface formed from solidified solidifiable material 33 is created which may have residual unsolidified solidifiable material 33 on it. To best ensure a clean transition between solidifiable materials 31 and 33, the residual unsolidified solidifiable material 33 is preferably removed.

Cleaning stations 232a-232d are disposed between solidifiable material container assemblies 30 and 34 and are movable toward and away from build platform 24 in the x-direction. Cleaning stations 232a and 232c each include a volume of a liquid, 238 and 236, respectively, that is used to remove residual solidifiable material 33 from object 28. In certain examples, liquids 236 and 238 are of the typed described previously with respect to cleaning station 32. In further examples, one or both of liquids 236 and 238 is polar. In other examples, one or both of liquids 236 and 238 is an organic alcohol. In further examples, one or both of liquids 236 and 238 is a glycol ether. One preferred glycol ether is tripropyl methyl glycol ether (TPM). In additional examples, one or both of liquids 236 and 238 is a mixture of an organic alcohol and water, such a mixture of isopropyl alcohol and water. Ultrasonic wave generators may also be provided for either or both of cleaning stations 232a and 232c in the manner described previously with respect to cleaning station 32.

The first cleaning station 232a may be described as providing a "dirty wash" because in the sequence of operations depicted in FIGS. 18-23 it provides primary cleaning and contacts object 28 first. Second cleaning station 232c may be described as providing a "clean wash" because in the sequence of operations depicted in FIGS. 18-23 it provides secondary cleaning after the "dirty wash" of cleaning station 236a.

In certain examples, the at least two cleaning stations of FIGS. 18-23 comprises all four depicted cleaning stations 232a-232d. Cleaning stations 232b and/or 232d may be provided to remove residual liquid (i.e., residual solvent 238 and 236 respectively as well as residual second solidifiable material 33). In the depicted example, cleaning stations 232b and 232d each include an air blower that blows air onto at least the exposed (bottom) surface of object 28. Each cleaning station 232b and 232d may be connected to a drain system that removes any liquid blown off of object 28. The drain system may be connected to a vacuum source to facilitate liquid removal from the interior of the cleaning stations 232b and 232d. As shown in the figures, cleaning stations 232b and 232d are located between solidifiable material container assemblies 30 and 34 along the x-axis direction. Cleaning station 232c (i.e., the "clean wash") is located between cleaning stations 232b and 232d. During or following the cleaning operations carried out by the cleaning stations 232a-232d, solidification energy may be applied to object 28 to solidify any remaining unsolidified solidifiable material that was not removed by the cleaning operation.

A method of using the system 20 depicted in FIGS. 18-23 will now be described. In FIGS. 18-23, solidifiable material assembly is shown in six different positions along the x-axis relative to the build (z) axis defined by shaft 26 and the build region 46, each of which has a fixed position along the x-axis. In the first position of FIG. 18, a portion of object 28 is immersed in second solidifiable material 33 proximate rigid or semi-rigid transparent solidification substrate 50. Pattern generator 22 projects a pattern of solidification energy 42 that is transmitted through proximate rigid or semi-rigid transparent solidification substrate 50 to contact and solidify a volume of second solidifiable material 33 located proximate substrate 50. After each volume of second solidifiable material 33 is solidified, build platform 24 moves upward in the z-axis direction away from pattern generator 22 and rigid or semi-rigid transparent solidification substrate 50, allowing fresh solidifiable material 33 to flow into the space between the lowermost exposed surface of object 28 and rigid or semi-rigid transparent solidification substrate 50, and another pattern 42 is projected. The process continues until a location (build (z) axis position) on the object 28 is reached at which it is desired to switch to solidifiable material 31.

Figure 19:
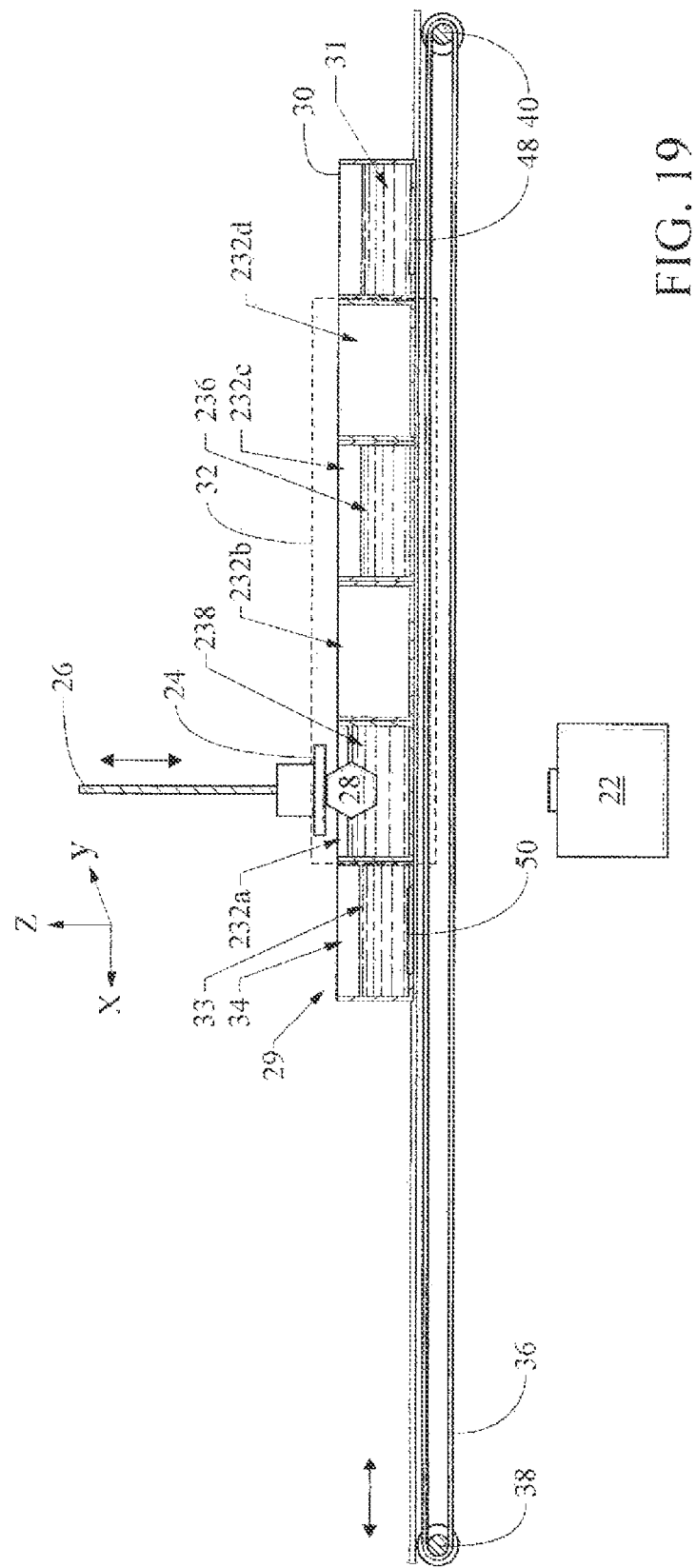
FIG. 19 is a depiction of the system of FIG. 18 in a second configuration.
Figure 20:
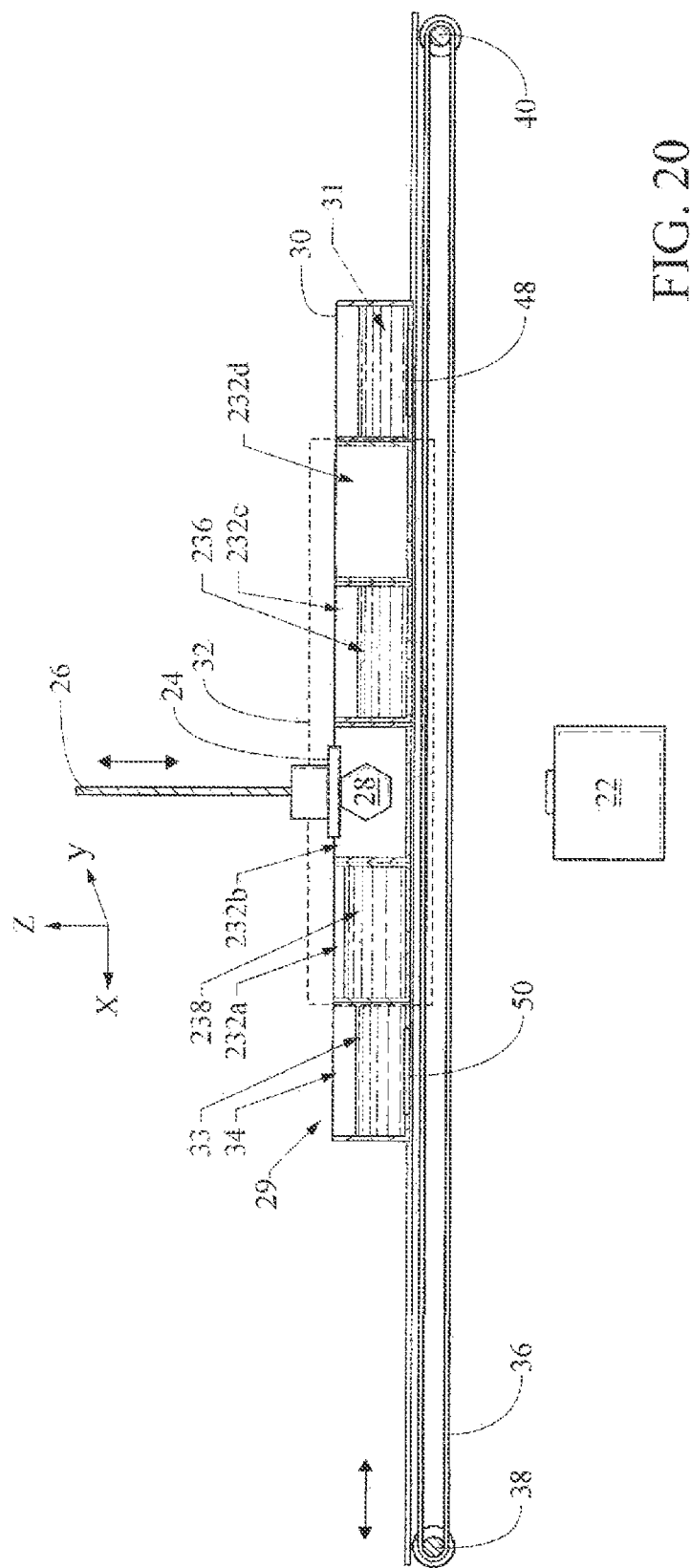
FIG. 20 is a depiction of the system of FIG. 18 in a third configuration.

Once it is desirable to switch to solidifiable material 31, build platform 24 is moved upward in the z-axis direction to remove object 28 from the interior of solidifiable material container assembly 34. A belt drive of the type described previously with respect to FIGS. 1-4 is then activated, causing shaft 38 and pulley 40 to rotate and belt 36 to circulate, which in turn moves solidifiable material assembly 29 along a frame and rail assembly (not shown) in the x-direction away from pattern generator 22 and build platform 24, thereby bringing cleaning station 232a to a position along the x-axis that is aligned with build area 46. As shown in FIG. 19, pattern generator 22 may be turned off because it is unnecessary during the cleaning process carried out by cleaning station 232a. However, it may be selectively activated to solidify any remaining unsolidified solidifiable material on the surface of object 28 which could not be removed by cleaning. As shown in FIG. 19, build platform 24 moves downward in the z-axis direction toward pattern generator 22 such that at least a portion of object 28 is immersed in cleaning liquid 238. Object 28 is allowed to sit in the cleaning liquid 238 for a period of time sufficient to remove a desired amount of residual second solidifiable material 33. As mentioned previously, ultrasonic wave generation may also be used to create turbulence and facilitate increased liquid removal.

Following the "dirty wash" operation provided by cleaning station 232a, build platform 24 is moved upward in the z-axis direction so that object 28 is removed from the interior of cleaning station 232a. The belt drive is then activated, causing shaft 38 and pulley 40 to rotate such that belt 36 carries solidification material assembly 29 to the x-axis position shown in FIG. 20. Build platform 24 is then lowered such that at least a portion of object 28 is disposed in the interior of cleaning station 232b. A primary air blower (not shown) is then activated to remove residual liquid 238 from cleaning station 232a and/or residual second solidifiable material 33 from object 28. The removed liquid is then collected in cleaning station 232a and optionally drained therefrom. The object 28 may then be exposed to solidification energy to solidify any residual unsolidified solidifiable material that was not removed by cleaning. The belt drive is then activated to move solidification material assembly 29 into the position shown in FIG. 21.

Figure 21:
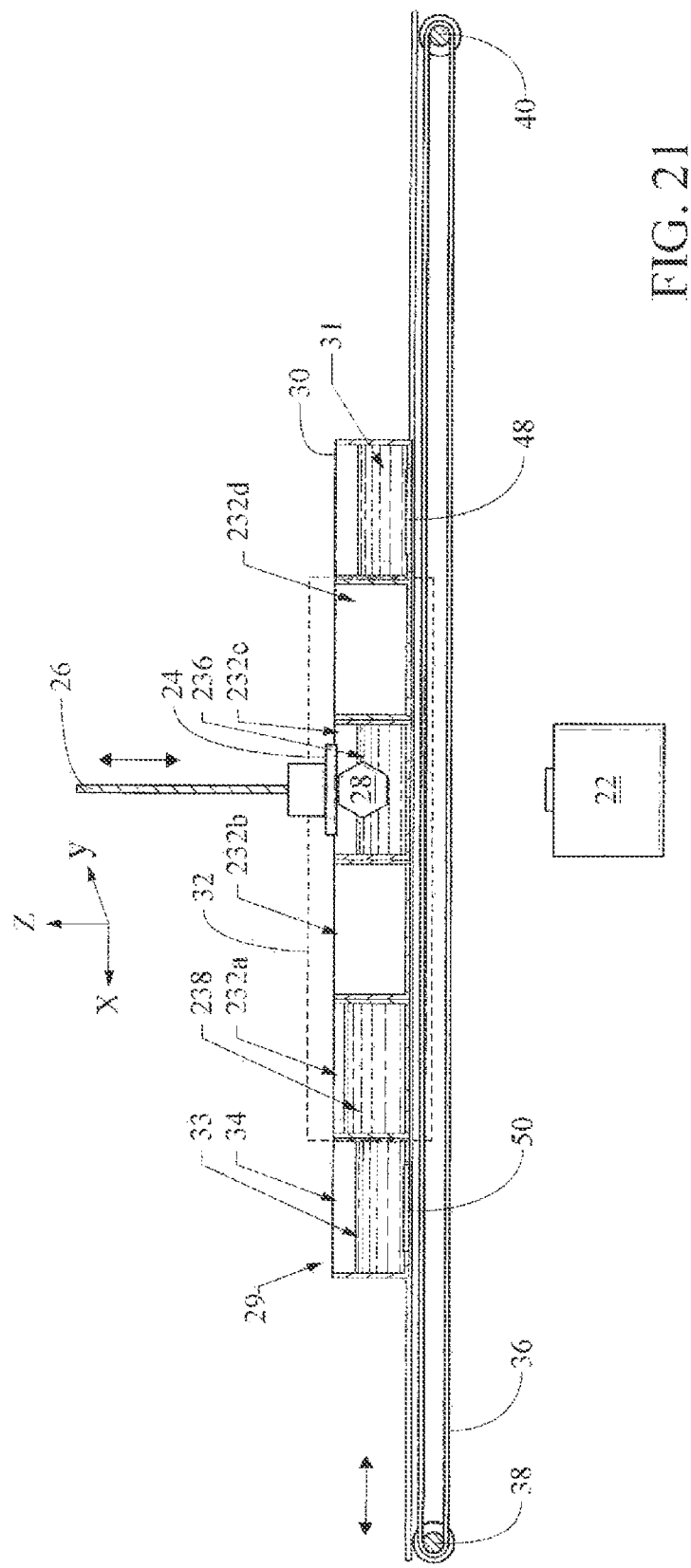
FIG. 21 is a depiction of the system of FIG. 18 in a fourth configuration.
Figure 22:
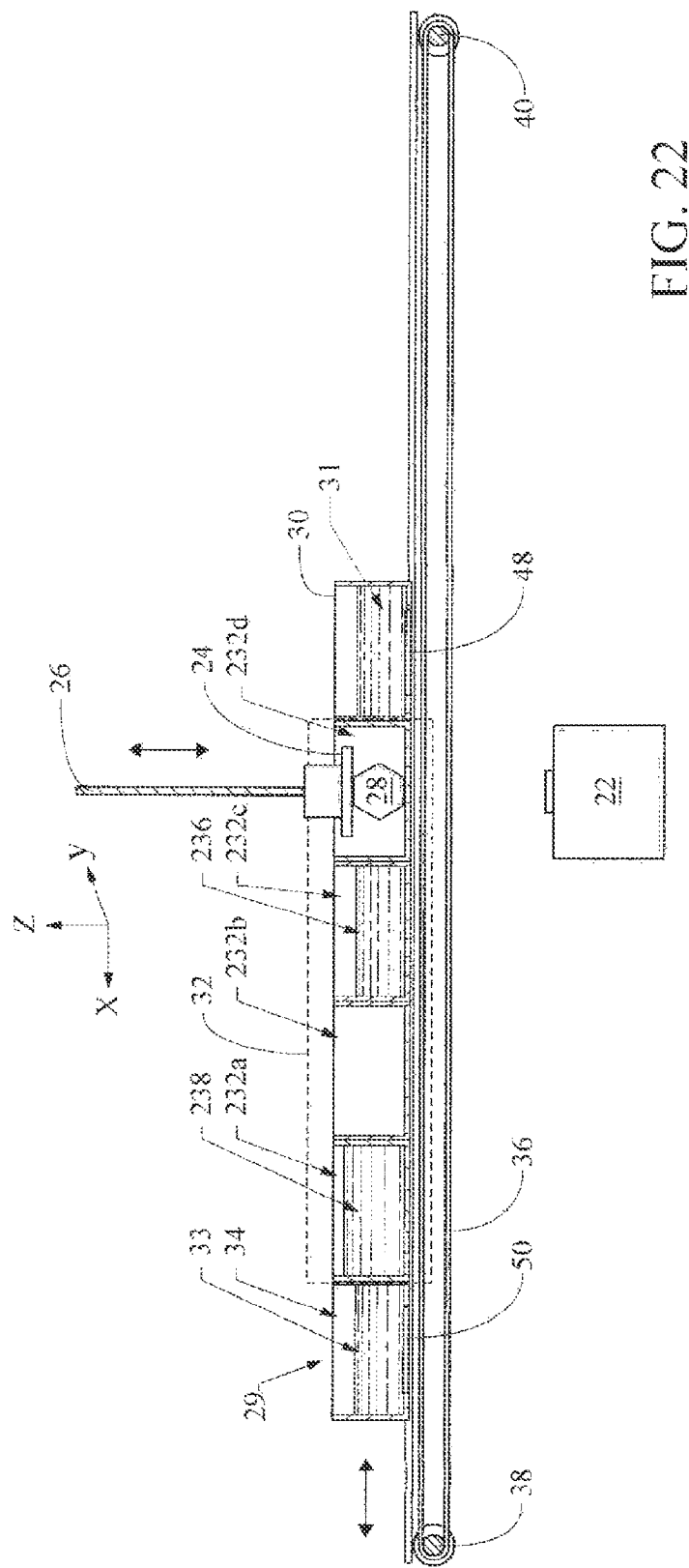
FIG. 22 is a depiction of the system of FIG. 18 in a fifth configuration.

FIG. 21 depicts a secondary or "clean" wash operation provided by cleaning station 232c. The cleaning operation works in the same manner described with respect to cleaning station 232a. Following the clean wash, the belt drive is activated, thereby moving solidifiable material assembly 29 along the x-axis and into the position shown in FIG. 22. In FIG. 22 a secondary air blowing operation is carried out by cleaning station 232d in the same fashion as the primary air blowing operation is carried out by cleaning station 232b. The object 28 may then be exposed to solidification energy to solidify any residual unsolidified solidifiable material that was not removed by cleaning.

Figure 23:
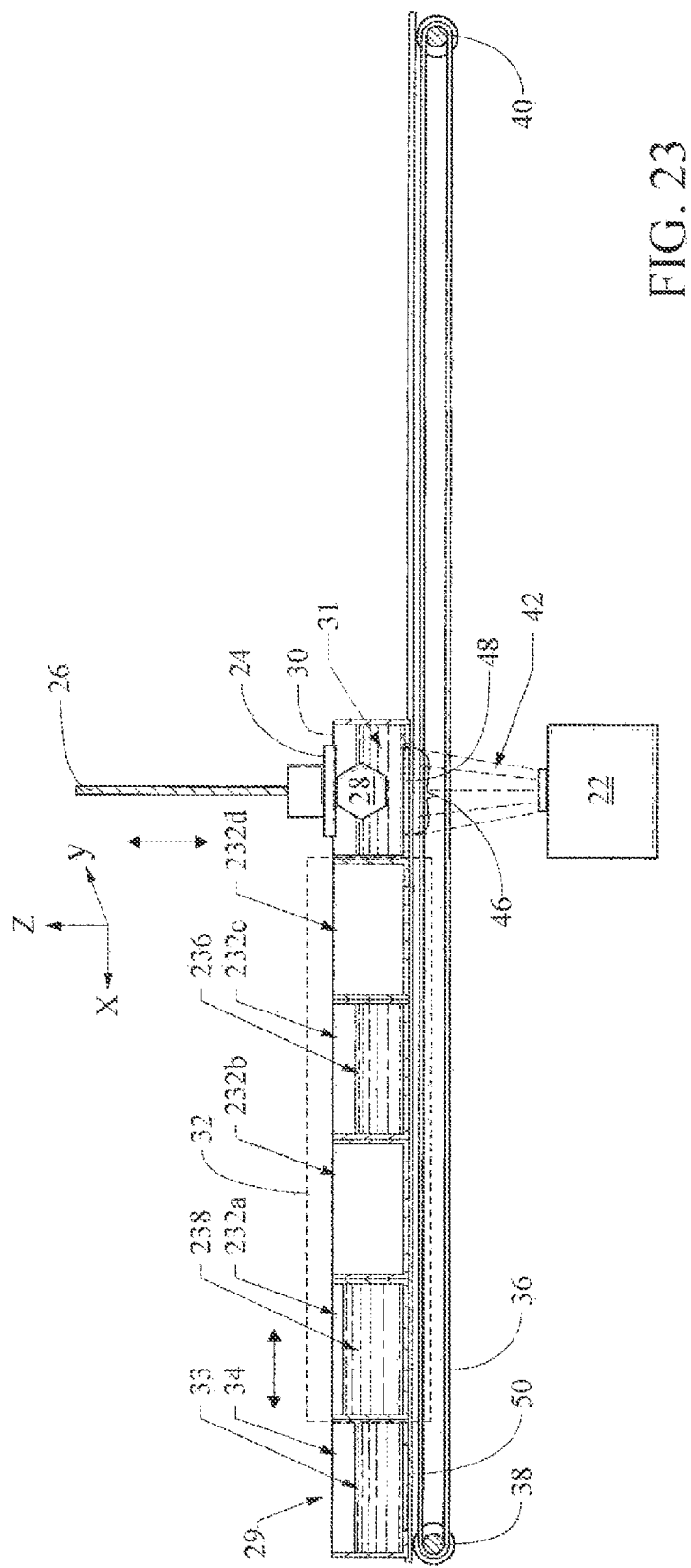
FIG. 23 is a depiction of the system of FIG. 18 in a sixth configuration.

Following the cleaning operations carried out by cleaning stations 232a-232d, the build platform 24 is elevated in the z-axis direction so that object 28 is removed from the interior of cleaning station 232d. The belt drive is then activated to move solidifiable material assembly 29 along the x-axis to the position of FIG. 23. In FIG. 23, solidifiable material container assembly 30 is positioned along the x-axis so that its rigid or semi-rigid transparent solidification substrate 48 is located in build region 46. Build platform 24 is lowered in the build (z) axis direction so that the lower-most exposed surface of object 28 is spaced apart from rigid or semi-rigid transparent solidification substrate 48 by a desired amount. Pattern generator 22 supplies a pattern to solidify all or part of the volume of first solidifiable material 31 located between the lower most exposed surface of object 28 and rigid or semi-rigid transparent solidification substrate 48. First solidifiable material 31 solidifies in contact with rigid or semi-rigid transparent solidification substrate 48 in accordance with the solidification energy pattern 42 projected by pattern generator 22. In certain configurations, solidifiable material container assembly 30 is configured to tilt to peel the solidified first solidifiable material 31 from rigid or semi-rigid transparent solidification substrate 48. Following solidification, build platform 24 moves upward in the build (z) axis direction to allow fresh first solidifiable material 31 to flow between the lower-most exposed surface of object 28 and rigid or semi-rigid transparent solidification substrate 48 and the process repeats itself until a desired amount of the first solidifiable material 31 has been solidified (i.e., until the desired z-axis thickness of first solidifiable material 31 has been solidified).

In certain implementations of the solidifiable material assembly 29 of FIGS. 18-23, multiple regions of first solidifiable material 31 and second solidifiable material 33 may be solidified to create object 28. In certain examples, cleaning station 232c may serve as a dirty wash for removing either or both of first solidifiable material 31 and second solidifiable material 33 from object 28 and cleaning station 232a may then serve as a clean wash for removing either or both of first solidifiable material 31 and second solidifiable material 33 so that the entire solidifiable material assembly 29 would reciprocate between the positions shown in FIGS. 18-23 as alternating regions of the two solidifiable materials 31 and 33 are crated.

Figure 18:
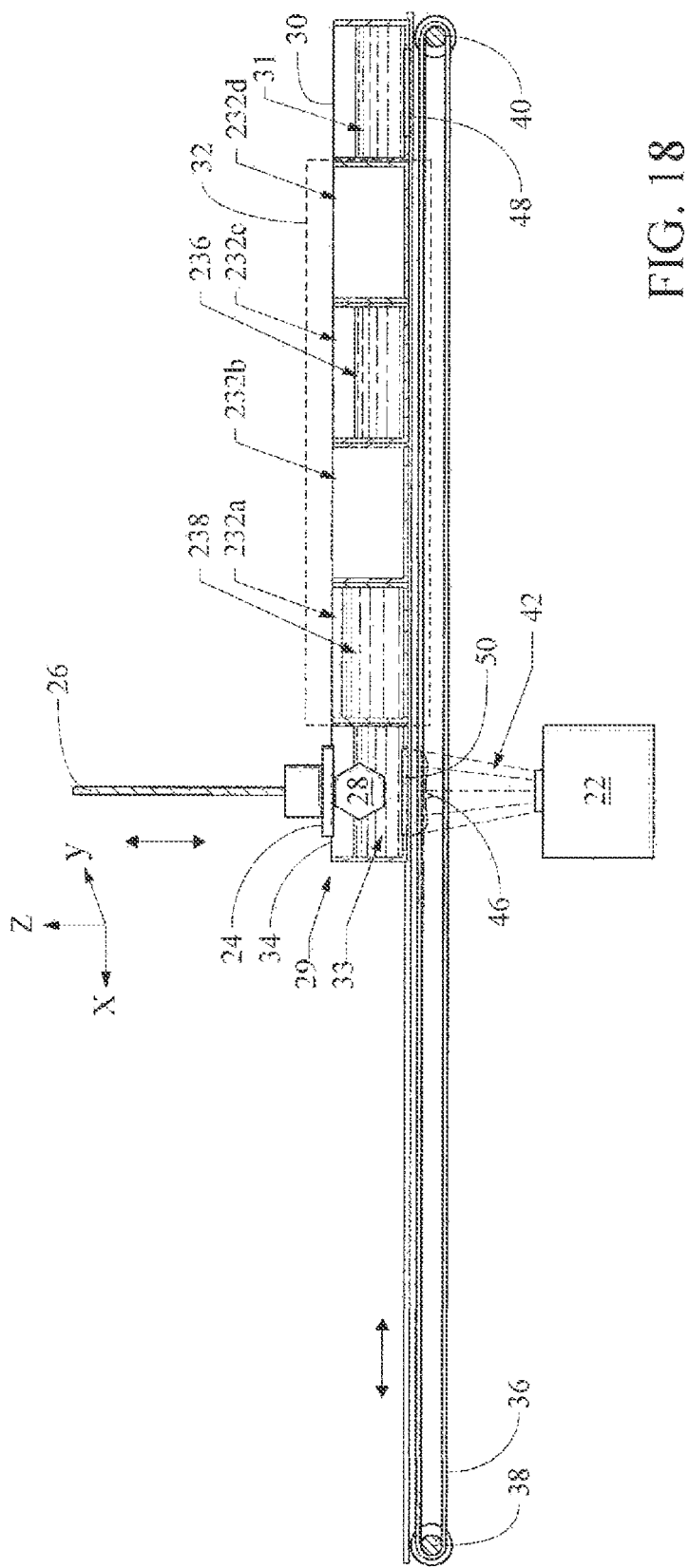
FIG. 18 is a cross-sectional schematic view of a second alternate embodiment of a system for making a three-dimensional object from multiple solidifiable materials depicted in a first configuration.

Alternatively, instead of using cleaning stations 232a and 232c to provide successive washes, each cleaning station 232a and 232c may be dedicated to the removal of one or the other of the first and second solidifiable materials 31 and 33 from object 28. This provides a way to create alternating sections of each material 31 and 33 while minimizing the contamination of one wash with the solidifiable material that it is not dedicated to. Thus, in one example, second solidifiable material 33 may be applied and solidified as shown in FIG. 18 followed by cleaning with cleaning station 232a or the combination of cleaning stations 232a and 232b or 232d. The belt drive may then be activated to move solidifiable material assembly 29 along the x-axis to the position shown in FIG. 23, in which first solidifiable material 31 is applied and solidified to object 28. If it is then desired to again add second solidifiable material 33 to object 28, cleaning station 232c or the combination of cleaning station 232c and 232d or 232b may be used to first remove any residual first solidifiable material 31. In certain examples, the movement of the belt drive and the build platform are controlled by a controller that is operated by control software which allows a user to determine which sequence of operations will be applied. Following cleaning, object 28 may be exposed to solidification energy to remove any residual unsolidified solidifiable material remaining on the surface of object 28.

Figure 26:
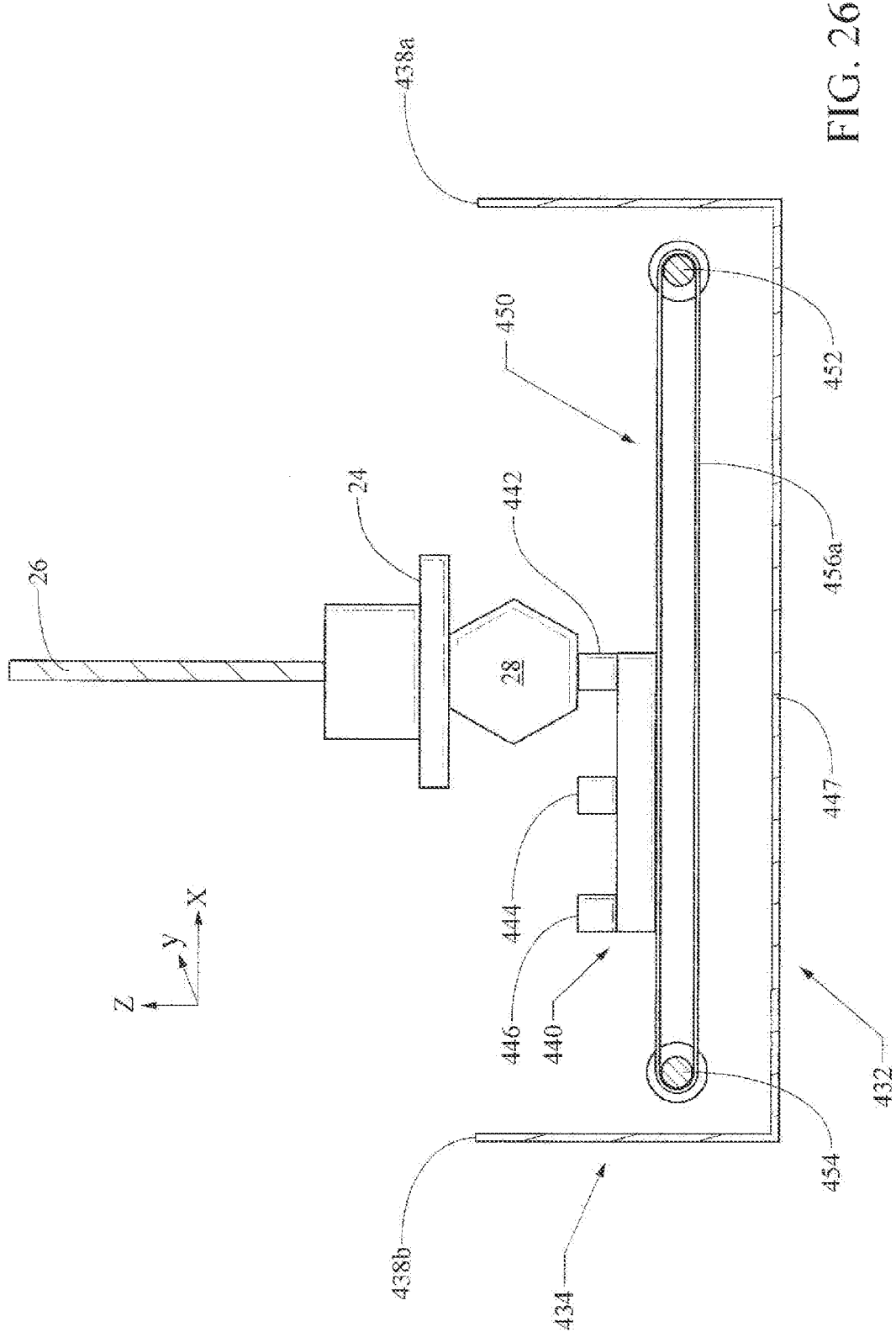
FIG. 26 is a cross-sectional view of a cleaning station for use with a system of making a three-dimensional object from multiple solidifiable materials in a first configuration.
Figure 27:
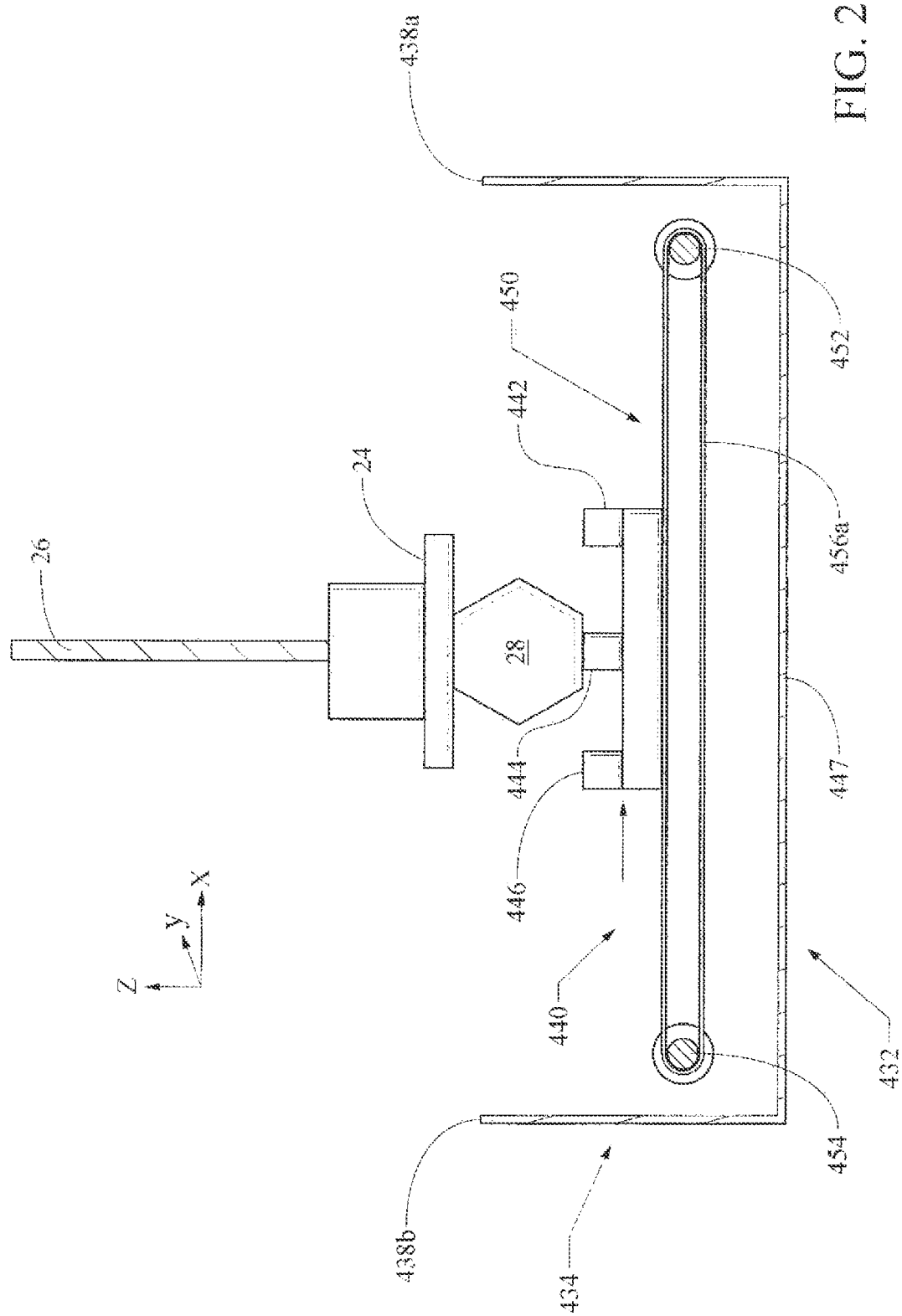
FIG. 27 is a depiction of the cleaning station of FIG. 26 in a second configuration.
Figure 28:
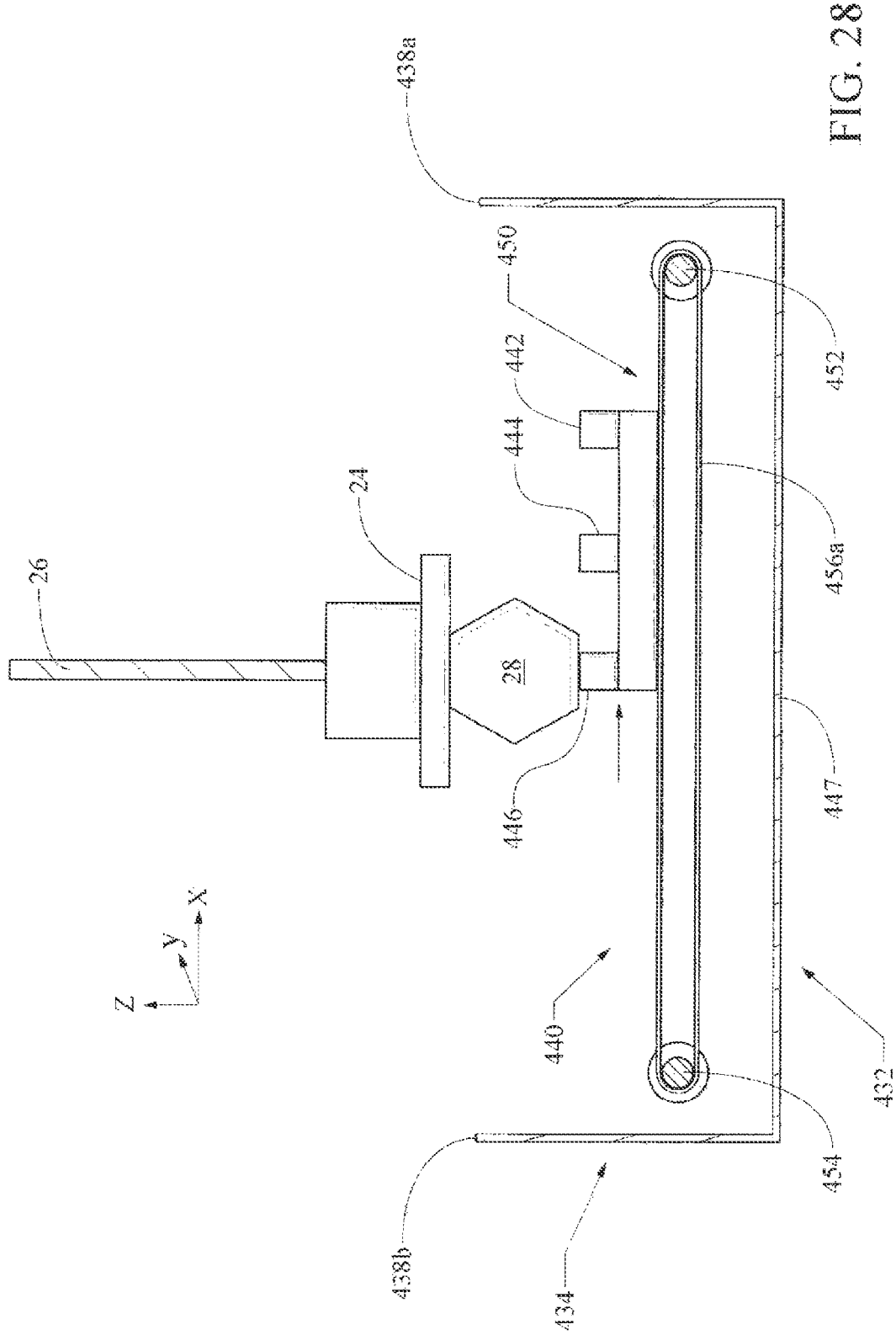
FIG. 28 is a depiction of the cleaning station of FIG. 26 in a third configuration.

Referring to FIGS. 26-28, a cleaning station 432 for use in a system of making a three-dimensional object from multiple solidifiable materials is depicted. Cleaning station 432 preferably provides at least two cleaning operations and optionally a third. In certain examples, cleaning station 432 provides at least a vacuum cleaning operation and a solidification cleaning operation to eliminate residual liquid from the lower-most exposed surface of object 28. In other examples, cleaning station 432 provides an additional optional sponge cleaning operation. The cleaning station of FIG. 26 may be used, for example, as part of the solidifiable material assembly 29 of FIGS. 1-4 and 18-26 or in assembly 129 of FIGS. 11-16 or the additional systems described below.

Cleaning station 432 comprises an enclosure 434 that includes side walls 438a and 438b and bottom 447. Back and front walls are also provided but are not shown. The top of enclosure 434 is preferably open. Cleaning station 432 also provides multiple, different cleaning operations in a single cleaning station 432.

Cleaning device 440 is provided within the interior of enclosure 434 and in certain embodiments moves in the x-axis direction with respect to enclosure 434. In other embodiments, cleaning device 440 moves in the x-axis direction with respect to build platform 24 and/or with respect to enclosure 434. When used in the systems for making a three-dimensional object from multiple solidifiable materials described previously, the enclosure 434 will also move in the x-axis direction as build platform 24 transitions from a solidifiable material container assembly such as assemblies 30, 130, 34, and 34 to the cleaning station 432. Thus, in certain examples, the direction of travel of the entire solidifiable material assembly 29, 129 will be the same as the direction of travel of the cleaning device 440. While cleaning device 440 may traverse the lower exposed surface of object 28 by moving relative to enclosure 434, it need not. If cleaning device 440 is included in an enclosure 434 that moves with respect to object 28, the movement of the enclosure 434 relative to object 28 can be used to traverse the cleaning device 440 along the lower exposed surface of object 28.

Cleaning device 440 includes a vacuum device 444 and a solidification device 446. Cleaning device 440 may also include a stationary or rotating sponge 442. As shown in the sequence of configurations depicted in FIGS. 26-28, in certain examples, the sponge 442, vacuum device 444, and linear solidification device 446 sequentially traverse the lower-most exposed surface of object 28, i.e., the surface that has been most recently formed from a solidifiable material such as material 31, 131, 33, or 133. Cleaning device 440 is carried by a belt drive system 450 comprising two shafts 452 and 454, each end of which is connected to a belt 456a or 456b (not shown). Cleaning device 440 may be connected to a set of linear slide rails (not shown) by linear bearings which are in turn connected to belts 456a and 456b (not shown). A motor (not shown) is provided to rotate shafts 452 and 454. However, cleaning device 440 may be stationary with respect to enclosure 434, in which case the movement of enclosure 434 relative to build platform 24 is used to traverse cleaning device 440 along the lower exposed surface of object 28.

As shown in FIGS. 26-28, in one example, a cleaning operation begins by traversing cleaning device 440 in the x-axis direction relative to object 28 and object build platform 24 such that sponge 442 first contacts the lower exposed surface of object 28. Sponge 442 may be stationary or may be provided on rotatable roller. As the sponge 442 contacts object 28, some amount of residual unsolidified solidifiable material 31, 131, 33, or 133 will be removed and/or collected by sponge 442.

In FIG. 26, sponge 442 performs an absorbing cleaning operation on object 28. In FIG. 27, vacuum device 444 provides a vacuum cleaning operation on object 28. Vacuum device 444 is spaced apart from sponge 442 in the direction of travel (x-axis) direction of cleaning device 440, preferably by a fixed amount. Vacuum device 444 comprises a rectangular enclosure with an air-permeable upper surface that is brought into contact with or close to the lower-most surface of object 28, which has just been solidified in one of the solidifiable material container assemblies 30, 34, 130, 134. Vacuum device 444 may be similar to the vacuum station 332 depicted in FIG. 24 and includes a hollow interior that is selectively maintainable at a subatmospheric pressure. In certain examples, vacuum device 444 includes a port that is connectable to a vacuum line which connects to a vacuum source. Thus, when vacuum device 444 is activated in a vacuum generating mode and placed proximate to or in contact with the lower-most exposed surface of object 28, residual unsolidified solidifiable material 31, 33, 131, or 133 will be drawn into the enclosure of vacuum device 444 in which it may be collected or from which it may be drained (such as by a drain hose). In certain examples, a control unit is programmed to selectively activate and deactivate a vacuum source that is in fluid communication with the interior of vacuum device 444. In one example, a sensor may be used to determine when vacuum device 444 is within the x-axis dimension of build platform 24 based on the movement of cleaning device 440 (such as by placing a sensor on the shaft of the motor used to move the cleaning device and detecting its total number of revolutions). In another example, a force or pressure sensor may directly or indirectly detect contact between vacuum device 444 and object 28, and a control unit program may use the detected force or pressure (or change in either variable) to determine when to activate or deactivate the vacuum source.

In FIG. 28, solidification device 446 performs a solidification cleaning operation on object 28. Solidification device is 446 is spaced apart from vacuum device 444 in a direction along the x-axis, preferably by a fixed amount, and is also spaced apart from sponge 442 in the x-axis direction, preferably by a fixed amount. Solidification device 446 applies solidification energy to residual unsolidified solidifiable material on the lower-most exposed surface of object 28. In certain preferred examples, solidification device 446 provides a broad spectrum of solidification energy to enable it to solidify different residual solidifiable materials on the lower exposed surface of object 28. In one example, solidification device 446 projects energy having a plurality of wavelengths ranging from about 380 nm to about 420 nm, preferably from about 370 nm to about 430 nm, and more preferably from about 350 nm to about 450 nm. In certain examples, solidification device is a linear solidification device that provides solidification energy in a series of generally linear patterns lying adjacent one another along the x-axis. One suitable linear solidification device is one or more LED arrays, each extending along the y-axis, perpendicular to the direction of travel of cleaning device 440 and the build (z) axis.

Figure 29A:
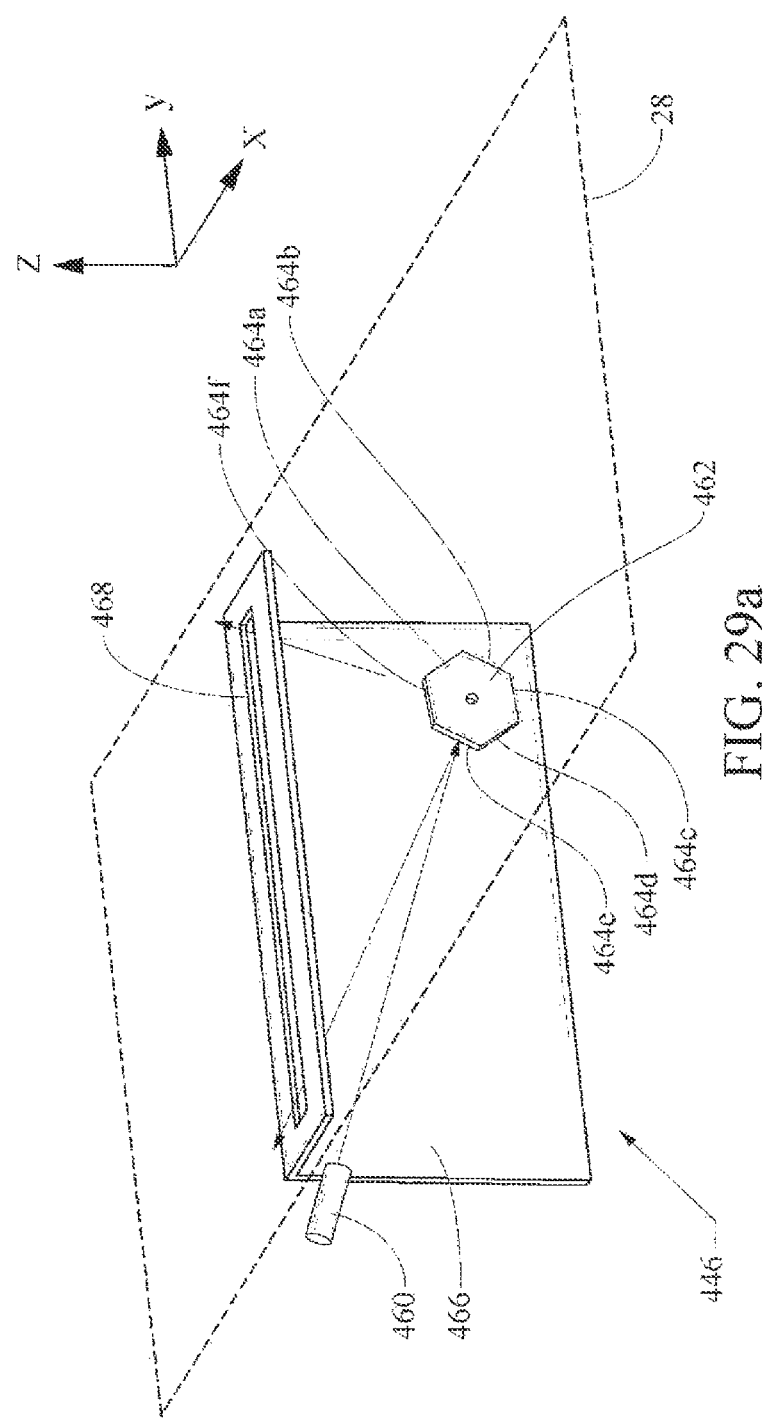
FIG. 29A is a perspective view of an embodiment of a linear solidification device for use in the cleaning station of FIG. 26 in operation and solidifying unsolidified solidifiable material from an object surface.
Figure 29C:
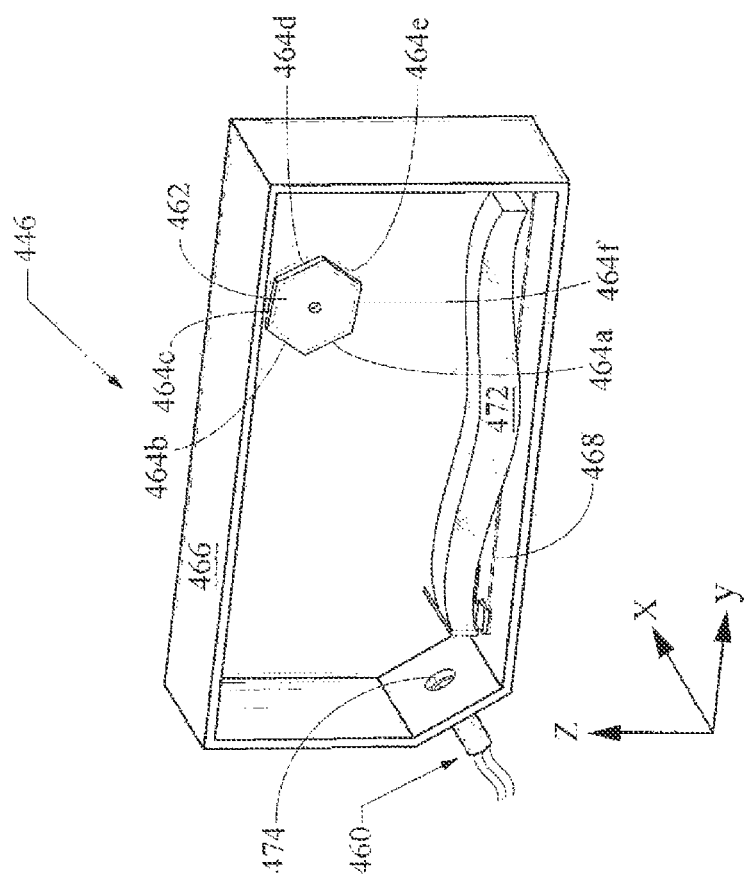
FIG. 29C is a front perspective view of the linear solidification device of FIG. 29B.
Figure 29B:
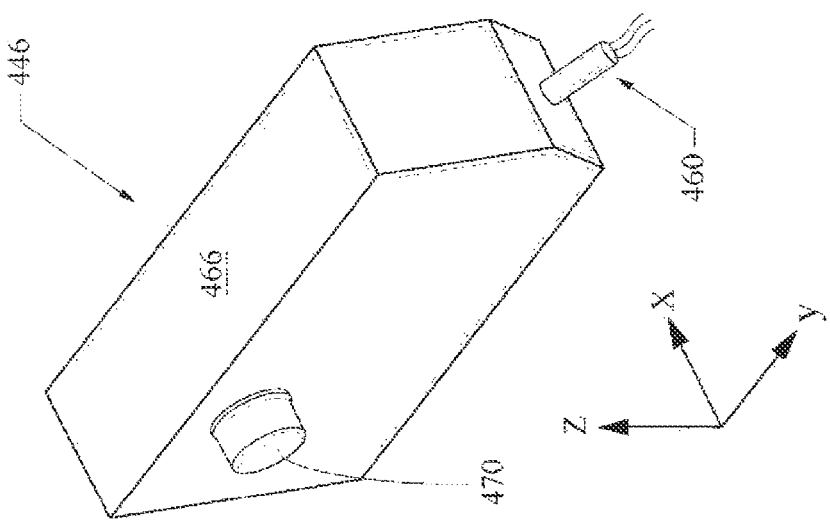
FIG. 29B is a rear perspective view of a linear solidification device for use in the cleaning station of FIG. 26.

Another exemplary suitable linear solidification device that may be used as solidification device 446 is shown in FIGS. 29A-29C. A portion of housing 466 is removed in FIG. 29A for ease of viewing. Solidification device 446 progressively scans solidification energy in the y-axis direction along and through a slot 468 formed in the bottom of housing 466 to solidify residual unsolidified material adjacent to slot 468 as linear solidification device 446 travels in the x-axis direction.

Rotating energy deflector 462 deflects solidification energy that is incident upon it toward flat field lens 472 (omitted in FIG. 29A). Rotating energy deflector 462 preferably rotates in a rotation plane as linear solidification device 446 moves in the length (x-axis) direction. In certain examples, the rotation plane is substantially perpendicular to the direction in which the linear solidification device 446 moves (i.e., rotation plane is the y-z plane shown in FIGS. 29B-20C). In certain examples, rotating energy deflector 462 rotates at a substantially constant rotational speed. In other examples, the linear solidification device 446 moves at a substantially constant speed in the length (x-axis) direction. In further examples, the rotating energy deflector 462 rotates at a substantially constant rotational speed and the linear solidification device 446 moves in the length (x-axis) direction at a substantially constant speed. The flat field lens 472 (not shown in FIG. 29A) redirects reflected solidification energy that would otherwise strike the surface of the solidifiable material at an angle so that it strikes the material substantially perpendicularly.

When solidification energy source 460 is a light source, rotating energy deflector 462 is preferably a rotating light deflector capable of deflecting visible or UV light. In one exemplary embodiment, solidification energy source 460 is a selectively activatable laser source and rotating energy deflector 462 is a polygonal mirror having one or more facets 464a, b, c, etc. defined around its perimeter. In accordance with such embodiments, the timing of the solidification energy source 460 activation and deactivation dictates the y-axis profile of solidification energy applied to the solidifiable material adjacent slot 468. In the example of FIGS. 29A and 29B, rotating energy deflector 462 is a hexagonal mirror having facets 464a to 464f. Each facet 464a-464f has at least one rotational position, and preferably several, at which it will be in optical communication with solidification energy source 460 to receive light projected therefrom. As the rotating energy deflector 462 rotates, solidification energy (e.g., visible or ultraviolet light) will be deflected along the length of each facet 464a-464f in succession. At any one time, one of the facets 464a-464f will receive and deflect solidification energy. As the facet changes its rotational position, the angle of incidence of the solidification energy with respect to the facet will change, altering the angle of deflection, and therefore, the y-axis location at which the deflected solidification energy strikes the object 28 and the residual solidifiable material on it.

Facets 464a-464f are ideally planar to ensure that deflected solidification energy traverses a substantially linear path in the y-axis direction without any deviations in the x-axis direction, a condition sometimes referred to as "pyramid error" or "deflection error." However, in certain cases one or more of the facets 464a-464f may deviate from a perfectly planar surface shape. In such cases flat field lens 472 may be combined with other optical devices to reduce the extent of pyramid error or deflection error. In one example, two F-theta lenses are provided in the place of single flat field lens 472, wherein each F-theta lens has a curvature in two dimensions to create a flat field of solidification energy which does not have an appreciable x-axis deviation striking the solidifiable material The maximum length of scan in the y-axis direction will correspond to the full length of an individual facet 464a-464f. That is, as the light progressively impinges along the entire length of any one facet 464a-464f, the deflected light will correspondingly complete a full scan length in the y-axis direction. The number of facets 464a, 464b, etc. on the rotating energy deflector 462 will correspond to the number of y-axis scans that are performed for one complete revolution of rotating energy deflector 462. In the case of a hexagonal mirror, six y-axis scans will occur for every complete rotation of rotating energy deflector 462. For rotating energy deflectors that maintain a constant rotational direction (e.g., clockwise or counterclockwise), the scans will be uni-directional along the y-axis. Put differently, as light transitions from one facet 464a to another 464b, the scan will return to its starting position in the y-axis, as opposed to scanning back in the opposite direction. However, other rotating energy deflector configurations may be used including those in which the deflector 462 rotates in two rotational directions to produce a "back and forth" scan in the y-axis direction.

FIGS. 29B and 29C show opposite sides of the linear solidification device 446. Housing 466 is a generally polygonal structure. As depicted in the figures, housing 466 has an open face, but the face may be closed. Rotating energy deflector 462 is spaced apart from solidification energy source 460 in both the height (z-axis) and width (y-axis) directions, and may be slightly offset from solidification energy source in the length (x-axis) direction as well. Rotating energy deflector 462 is rotatably mounted to housing 466 so as to rotate substantially within a plane that may preferably be oriented substantially perpendicularly to the length (x-axis) direction (i.e., deflector 462 rotates within the y-z plane). Solidification energy source port 474 is provided for mounting solidification energy source (e.g., a laser diode) such that it is in optical communication with at least one, and preferably only one, facet 464a-464f of rotating energy deflector 462 at any one time. As indicated previously, lens 472 is spaced apart and below from rotating energy deflector 462 in the height (z-axis) direction and is located above housing light opening 468.

Motor 470 (FIG. 29 B) is mounted on a rear surface of housing 466 and is operatively connected to rotating energy deflector 462. Motor 470 is connected to a source of power (not shown). When motor 470 is energized, rotating energy deflector 462 rotates, bringing the various facets 464a-464f sequentially into optical communication with solidification energy source 460. A control unit (not shown) may also be provided to selectively energize motor 470, solidification energy source 460 and/or motor 470.

In certain implementations, it is desirable to provide a y-axis scanning speed (i.e., a speed at which solidification energy moves along the exposed surface of the solidifiable material in the y-axis direction) that is significantly greater than the x-axis speed at which the linear solidification device 446 moves. Providing this disparity in y-axis and x-axis speeds helps to better ensure that the scanned energy pattern is linear and orthogonal to the x-axis direction, thereby reducing the likelihood of missing and failing to solidify residual solidifiable material on object 28. In certain examples, the scanning speed in the y-axis direction is at least about 1000 times, preferably at least about 1500 times, more preferably at least about 2000 times, and still more preferably at least about 2200 times the speed of movement of linear solidification device 446 in the x-axis direction. In one example, linear solidification device 446 moves at a speed of about 1 inch/second in the x-axis direction and the y-axis scanning speed is about 2400 inches/second. When solidification device 446 is used in a cleaning operation to solidify residual unsolidified solidifiable material that could not be removed by a liquid removal operation, it is preferred to scan the entire y-axis dimension without selectively deactivating the source of solidification energy 460 because in this mode, it is not desired to create a particular solidified object pattern. However, when solidification device 446 is used to form a three-dimensional object, solidification energy source 460 is selectively activated to create a y-axis solidification profile at each x-axis location of the solidification device 446 which corresponds to the desired object shape.

The scanning speed at which solidification energy is progressively applied to the lower-most exposed surface of object 28 in the width (y-axis) direction corresponds to the rotational speed of rotating energy deflector 462 divided by the number of facets 464a-f. In certain examples, the rotational speed is from about 1,000 to about 10,000 rpm, preferably from about 2,000 to about 8,000 rpm, and more preferably from about 3,000 to about 5,000 rpm.

Figure 30:
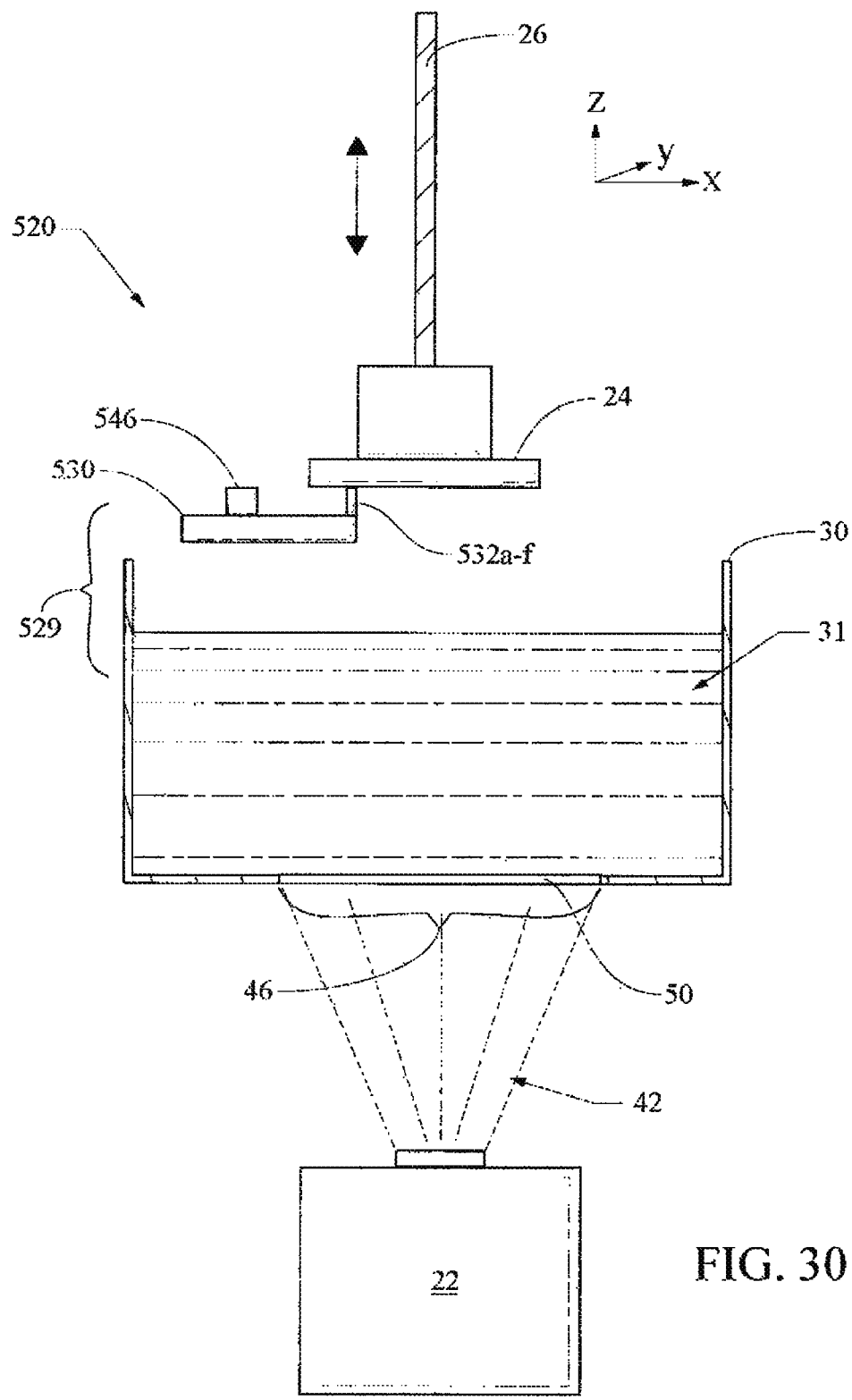
FIG. 30 is a cross-sectional schematic view of a third alternate embodiment of a system for making a three-dimensional object from multiple solidifiable materials.
Figure 31:
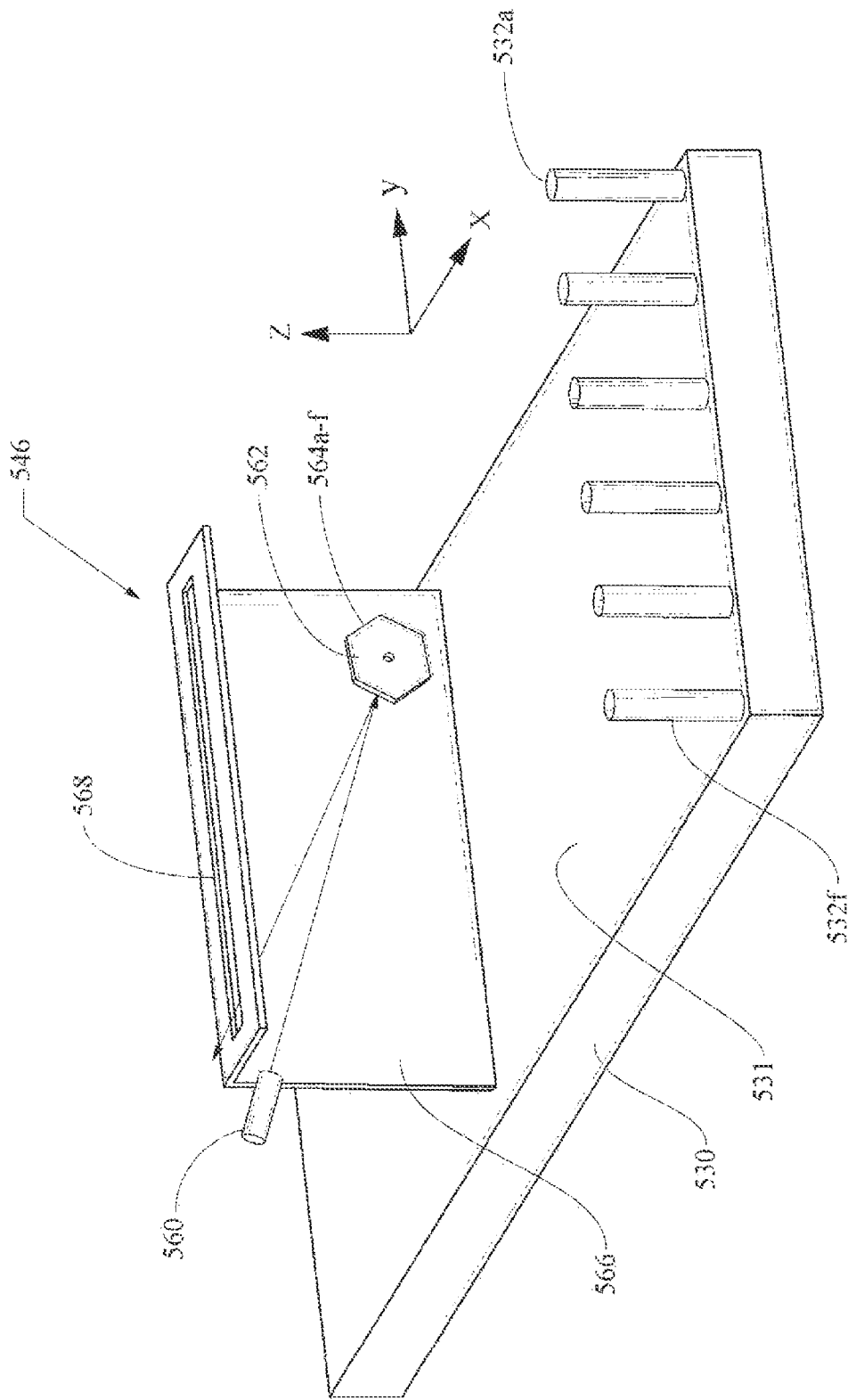
FIG. 31 is a close-up perspective view of an integrated solidifiable material dispensing and solidification device used in the system of FIG. 30.

Referring to FIGS. 30-31, a third alternate embodiment of a system 520 for making a three-dimensional object from multiple solidifiable materials is depicted. System 520 includes a solidifiable material assembly 529, a pattern generator 22, a build platform 24 and a shaft 26 along which build platform moves in the build (z) axis direction. Solidifiable material assembly 529 includes a solidifiable material container assembly 30 (or 130) and a support former 530.

In the example of FIGS. 30-31, a solidifiable material container assembly 30 is provided along with a fill tube (not shown) through which the solidifiable material 31 is dispensed as needed to replenish the amount of unsolidified solidifiable material 31. Although not depicted, a suitable frame and drive system is provided to support former 530 and translate it in the x-axis direction relative to solidifiable material container assembly 30. For example, a belt drive may be provided which is operatively connected to support former 530 and which causes support former 530 to slide along linear slide rails in the x-axis direction.

Support former 530 comprises a source of a first solidifiable material that includes a solidifiable material dispenser (such as a plurality of nozzles 532a-532f) and a solidification device 546, which may be a pattern generator of the type described previously. Support former 530 is referred to as such because in certain exemplary implementations, it is used to create removable supports that connect a finished object to the build platform 24. However, it can also be used to dispense solidifiable materials that form part of the finished object.

Nozzles 532a-532f dispense a first solidifiable material upward toward build platform 24 in the build (z) axis direction. Nozzles 532a-532f are in fluid communication with a source of the first solidifiable material, which may be included within support former 530. The nozzles 532a-532f may comprise piezo jets and are spaced apart in a direction (y-axis) that is perpendicular to the direction (x-axis) of movement of support former 530 and perpendicular to the build (z) axis direction. While only one row of nozzles is depicted, several may be provided, and the nozzles in one row may be offset from those in another row along the y-axis direction to provide more complete coverage along the y-axis direction. The nozzles 532a-532f are selectively activated as support former 530 moves in the x-axis direction. The specific nozzles 532a-532f that are activated at any one time will correspond to the desired solidifiable object pattern being created from the first solidifiable material. At each location along the x-axis, the nozzles 532a-532f that are activated will dictate the y-axis profile of the solidifiable material.

Solidification device 546 may be any suitable solidification energy device that is configured to cause the material dispensed from nozzles 532a-532f to solidify. In certain examples, solidification device 546 provides energy of a wavelength that causes cross-linking and/or polymerization to occur. In additional examples, the solidifiable material dispensed by nozzles 532a-532f includes a photoinitiator that responds to particular wavelengths of solidification energy to initiate cross-linking and/or polymerization.

In one example, solidification device 546 is a linear solidification energy device. Suitable linear solidification energy devices include linear arrays of imaging elements (e.g., LEDs) and those described previously with respect linear solidification device 446 in FIGS. 26-28. In FIG. 31, a linear solidification energy device 546 is depicted which comprises a solidification energy source 560 that is in optical communication with one of several facets 564a-f of a rotating solidification energy deflector 562 mounted on a housing 566. The housing is partially removed and the flat field lens 472 is removed in FIG. 31 for ease of understanding. However, in all aspects device 546 works in the same manner as device 446. As indicated in FIG. 31, the plurality of nozzles 532a-f are spaced apart from linear solidification energy device 546 in the direction (x-axis) of travel of support former 530, preferably by a fixed distance. Both the nozzles 532a-f and the solidification device 546 are provided on a base 531. When nozzles 532a-f are selectively activated to dispense solidifiable material in a pattern, linear solidification device 546 need not supply a variable energy pattern to solidify the solidifiable material, but can do so if desired.

As mentioned previously, in certain examples, support former 530 is used to apply a first solidifiable material (not shown) via nozzles 532a-f that is different from a second solidifiable material 31 used to form the finished object. As shown in FIG. 30, system 20 includes a pattern generator 22 that is spaced apart from support former 530 in the build (z) axis direction and which supplies solidification energy suitable for solidifying second solidifiable material 31. Solidifiable material container assembly 30 acts as a source of solidifiable material 31. In accordance with such examples, the first and second solidifiable materials are preferably formulated to solidify in response to different solidification energy spectra. In one example, the first (support) solidifiable material is formulated with a photoinitiator having a peak excitation wavelength that is different from a peak excitation wavelength of a photoinitiator used to formulate second (finished object) solidifiable material 31. In certain examples, the peak excitation wavelength for the first solidifiable material differs from the peak excitation wavelength of the second solidifiable material by an amount that is no less than about 200 nm, preferably no less than about 250 nm, and even more preferably no less than about 300 nm. In other examples, the peak excitation wavelengths for the first and second solidifiable materials differ by no more than about 450 nm, more preferably no more than about 425 nm, and even more preferably no more than about 400 nm. Correspondingly, the solidification device 546 projects solidification energy having a peak wavelength that differs from the peak wavelength of solidification energy provided by pattern generator 22 by an amount that is no less than about 200 nm, preferably no less than about 250 nm, and even more preferably no less than about 300 nm. In other examples, the peak wavelengths for the solidification device 546 and pattern generator 22 differ by no more than about 450 nm, more preferably no more than about 425 nm, and even more preferably no more than about 400 nm.

In one example, the support material has a peak excitation wavelength greater than that of the finished object material. In another example, the support material solidifies in response to infrared solidification energy, and the finished object material (e.g., second solidifiable material 31) solidifies in response to ultraviolet solidification energy. In another example, the support material has a peak excitation energy of about 780 nm, and the finished object material has a peak excitation energy of about 390 nm. Irgacure 819 is a known photoinitiator with a peak excitation energy of 390 nm. For support materials that solidify in response to infrared solidification energy, known suitable photoinitiators include Camphorquinone, supplied by Hampford Research and the Hu-Nu640, Hu-Nu745, and Hu-Nu820 photoinitiators supplied by Spectra Group Limited, wherein the last three digits of each compound refers to the wavelength for which the initiator is most efficient. The use of photoinitiators having different excitation wavelengths is only one exemplary technique for providing first and second solidifiable materials that solidify in response to different wavelengths of solidification energy. Solid fillers such as powders, packing foam, and plasticizers may also be used to provide solidifiable materials with different solidification characteristics.

In certain examples, the solidifiable finished object material 31 and the support material have different solubility characteristics when solidified. The differential solubilities allow the three-dimensional object to be contacted with a liquid capable of selectively removing the solid supports without damaging the finished object. In certain implementations, the solidified support material is soluble in a polar liquid such as water or an organic alcohol in which the finished object material is insoluble.

A method of forming a three-dimensional object comprising a finished three-dimensional object and supports using system 520 will now be described. In accordance with the method, support former 530 prints a solidifiable support material onto build platform 24. Support former 530 moves in the x-axis direction, and support material is dispensed along the y-axis direction by nozzles 532a-f. At any given x-axis location, the particular nozzles 532*a-f* that dispense material along the y-axis direction will correspond to the desired support pattern and geometry. Solidification device 546 also moves in the x-axis direction and projects solidification energy onto the printed support material to solidify it. The process repeats itself until the support region is complete and has reached its desired build (z) axis height.

Once the supports are complete, support former 530 is moved away from the build platform 24 (in the x-axis and/or y-axis directions). Build platform 24 is then moved in the build (z) axis direction toward rigid or semi-rigid transparent solidification substrate 50 at the bottom of solidifiable material container assembly 30 to a position that is spaced apart from substrate 50 by the maximum desired solidification depth. Solidification energy is then supplied by pattern generator 22 to solidify the finished object solidifiable material 31 in contact with the solidified support material. The build platform 24 is moved away in the build (z) axis direction to allow fresh finished object solidifiable material 31 to flow underneath the newly formed solidified finished object solidifiable material that is attached to the solidified support material, and the pattern generator 22 again supplies solidification energy in a pattern corresponding to the desired three-dimensional object shape. As discussed previously, the support material and finished object material 31 may have different peak excitation wavelengths, and the solidification device 546 and pattern generator 22 may supply solidification energy having different peak wavelengths as described previously.

Referring to FIGS. 32-36, a fourth alternate embodiment of a system 620 for making a three-dimensional object from multiple solidifiable materials is depicted. System 620 includes a solidifiable material assembly 629, a build platform 624, and a build platform drive assembly 623. Unlike the previous embodiments of systems for making a three-dimensional object, in system 620 the build platform 624 and its drive assembly 623 move in a direction perpendicular to the build axis (z) direction, which in the case of FIGS. 32-36 is the y-axis direction.

Solidifiable material assembly 629 comprises solidifiable material container assemblies 630 and 634 which are spaced apart from one another in the y-axis direction, i.e., perpendicularly to the build (z) axis direction and parallel to the direction of travel of the build platform drive assembly 623. Solidifiable material assembly 629 also comprises cleaning station 632 which is located between the solidifiable material container assemblies 630 and 634. Assemblies 630 and 634 act as sources of corresponding solidifiable materials. System 620 also includes first and second solidification devices 668*a* and 668*b*, which correspond to solidifiable material container assemblies 630 and 634, respectively.

Solidifiable material assembly 629 also comprises a work table 664 and a rack retainer 671. First and second solidifiable material container assemblies 630 and 634 are disposed in respective openings within work table 664 and are held in place by rack retainer 671. The first and second solidifiable material containers 630 and 634 are stationary relative to work table 664.

Each solidifiable material container assembly 630 and 634 is configured as a basin for holding a solidifiable material. Each assembly 630 and 634 comprises four side walls and a bottom (648 and 650, respectively) and is open in the direction facing upward in the build (z) axis direction. The bottoms may be configured as a rigid or semi-rigid transparent solidification substrate similar to substrates 48 and 50 described previously. However, in the specific example of FIGS. 32-36, the bottoms are configured as curved rigid or semi-rigid transparent solidification substrates 648 and 650 with a curvature along the x-axis direction (i.e., perpendicularly to both build (z) axis direction and the direction of travel of the build platform drive assembly 623 in the y-axis direction. Resilient coatings of the type described previously may be provided on the upward (build (z) axis direction) facing surface of substrates 648 and 650 to facilitate separation of certain solidified solidifiable materials. In addition, non-resilient coatings of the type described previously may be provided.

As an alternative, either or each of solidifiable material container assembly 630 and 634 may comprise a tiltable basin having a substantially planar rigid or semi-rigid transparent solidification substrate 648, 650. In one example, a basin comprising a transparent resilient bottom and resilient side walls is used. In certain implementations, both the transparent resilient bottom and the non-resilient side walls are formed from the same or different silicone polymers. In another implementation, a basin comprising non-resilient acrylic side walls and a resilient silicone bottom is used. In another example, the bottom of the basin is defined by a rigid or semi-rigid transparent solidification substrate 648 and/or 650 that is connected to side walls formed of a resilient or plastically deformable polymeric material. In a further example, the substrate 648 and/or 650 may be coated with a resilient transparent material, such as a silicone, that extends only a portion of the way to the side walls, leaving a peripheral gap around the coating and between the coating and the sidewalls. In yet another example, the substrate 648 and/or 650 may be coated with a resilient transparent material that extends all the way to the side walls. In certain examples, a tilting mechanism may be provided that tilts the basins with respect to the build platform 24 to peel solidified solidifiable material from the bottom of the basin. A non-resilient material such as a transparent non-resilient film 54 may also be provided as a layer on top of the resilient bottom between the resilient bottom and the build platform 24.

Build platform drive assembly 623 is includes build platform rails 626*a* and 626*b* which are mounted on corresponding vertical supports 625*a* and 625*b* (not shown). A bracket 628 connects build platform support 625 to the rails 626*a* and 626*b*. Build platform 624 is selectively attachable to and detachable from build platform support 625. A motor (not shown) is selectively activatable to move the bracket 628 in the build (z) axis direction along rails 629*a* and 629*b* to move build platform 624 and build platform support 625 in the build (z) axis direction.

Build platform drive assembly 623 also includes a motor 652, rails 656*a* and 656*b*, a rack gear 657, and a pinion gear 658. Motor 652 is selectively activatable to rotate pinion gear 658. Pinion gear 658 includes teeth that engage complementary teeth on rack gear 657. Thus, the rotation of pinion gear 658 causes pinion gear 658 to travel in the y-axis direction along the length of rack gear 657. As pinion gear 658 travels in the y-axis direction, the motor 652, vertical supports 625*a*, 625*b*, build platform 624, and build platform support 625 also move in the y-axis direction. Linear bearings (not shown) connected to the base on which the vertical supports 625*a* and 625*b* are mounted engage the rails 656*a* and 656*b* to allow for sliding movement of the pinion gear 658, motor 652, vertical supports 625*a*, 625*b*, build platform 624, and build platform support 625 in the y-axis direction. As a result, the build platform 624 can be moved from solidifiable material container assembly 630 to cleaning station 632 and to solidifiable material container assembly 634.

Figure 36:
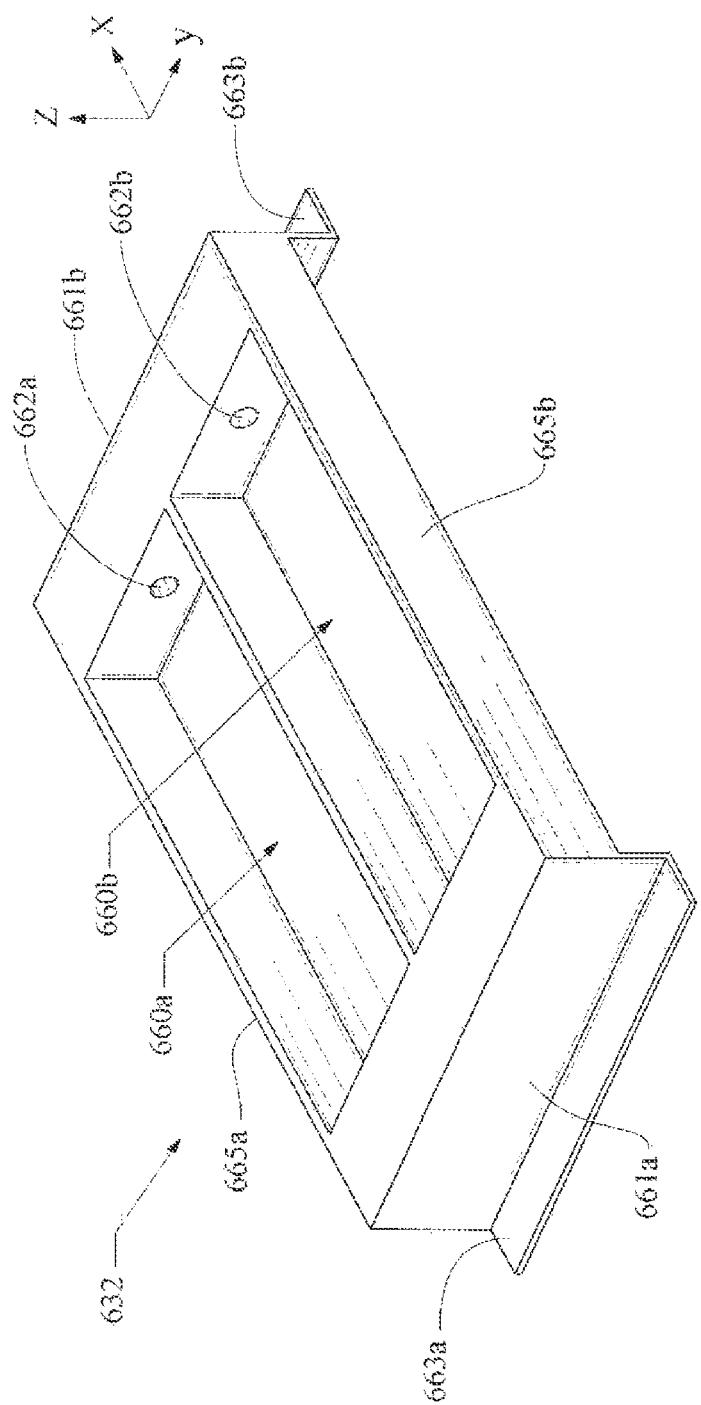
FIG. 36 is a perspective view of a cleaning station used in the system of FIG. 32.

Cleaning station 632 may be configured similarly to cleaning stations 32, 132, 232*a-d* and 332. In certain examples, cleaning station 632 comprises at least one vacuum cleaning section. In other examples, cleaning station 632 comprises a number of vacuum cleaning sections equal to the number of solidifiable materials and/or solidifiable material containers that are used. One specific example of a cleaning station comprising two vacuum sections is depicted in FIG. 36. As shown in the figure, cleaning station 632 comprises a first vacuum section 660a and a second vacuum section 660b which lie adjacent one another in a direction perpendicular to the build (z) axis, which in the figure is along the y-axis. Cleaning station 632 comprises first and second side walls 661a and 661b and third and fourth side walls 665a and 665b. Sidewalls 661a and 661b are spaced apart from one another in the x-axis direction and include horizontal sections 663a and 663b which define a supporting base for the cleaning station 632.

Each vacuum section 660a and 660b has a hollow interior and a port 662a and 662b, respectively, to which a vacuum source may be connected. A perforated mesh top such as perforated mesh top 340 shown in FIG. 24 may be provided (not shown in FIG. 36) and may also include a second mesh layer such as mesh layer 342 in FIG. 24. The hollow interiors of each vacuum section are selectively maintainable at a sub-atmospheric pressure, which allows residual liquid on the surface of a solidified object to be collected in the hollow interiors. In certain examples, the collected liquid may be removed through the ports 662a and 662b by a vacuum source. The use of separate vacuum sections 660a and 660b allows each section to be dedicated to the removal of a specific solidifiable material, which reduces the chances of contaminating one material with the other on the three-dimensional object as it is being built. In embodiments with mesh tops that come into contact or close proximity to the surface of a three-dimensional object, this can be particularly helpful. Nevertheless, in certain examples, it may be desirable to provide a cleaning station 632 that comprises a single vacuum station.

Figure 35:
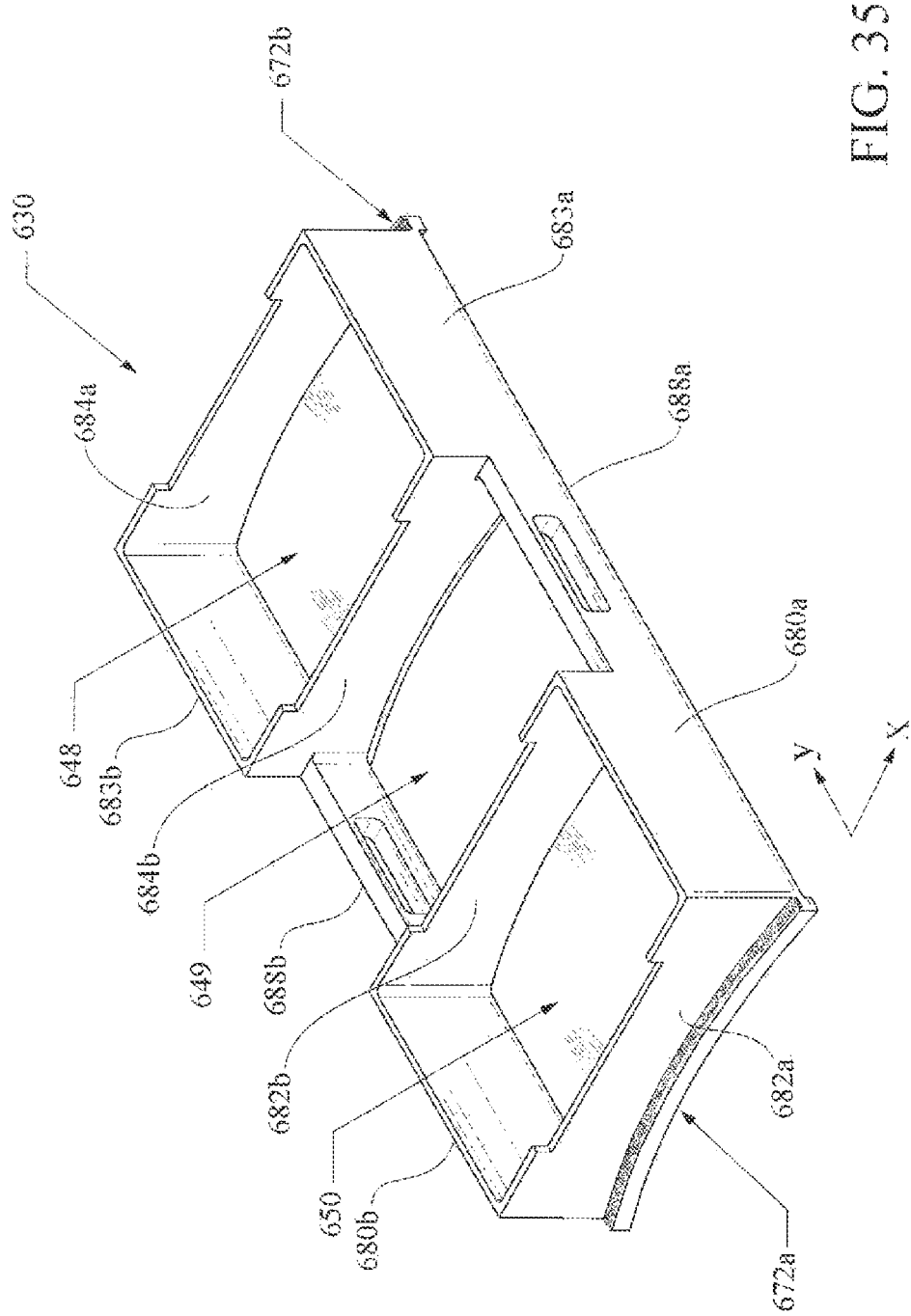
FIG. 35 is a perspective view of a tray assembly used in the system of FIG. 32.

In certain cases, it may be desirable to provide the solidifiable material container assemblies 630 and 634 as a unitary, integral structure. An example of such a structure is depicted in FIG. 35. As shown in the figure, solidifiable material container assembly 630 is connected to solidifiable material container assembly 634 by two connecting walls 688a and 688b that are spaced apart from one another in the x-axis direction. Solidifiable material container assembly 634 includes a cam 672a, and solidifiable material container assembly 630 includes a cam 672b. The cams 672a and 672b are spaced apart from one another along the y-axis direction and each has a length extending along the x-axis direction.

Figure 32:
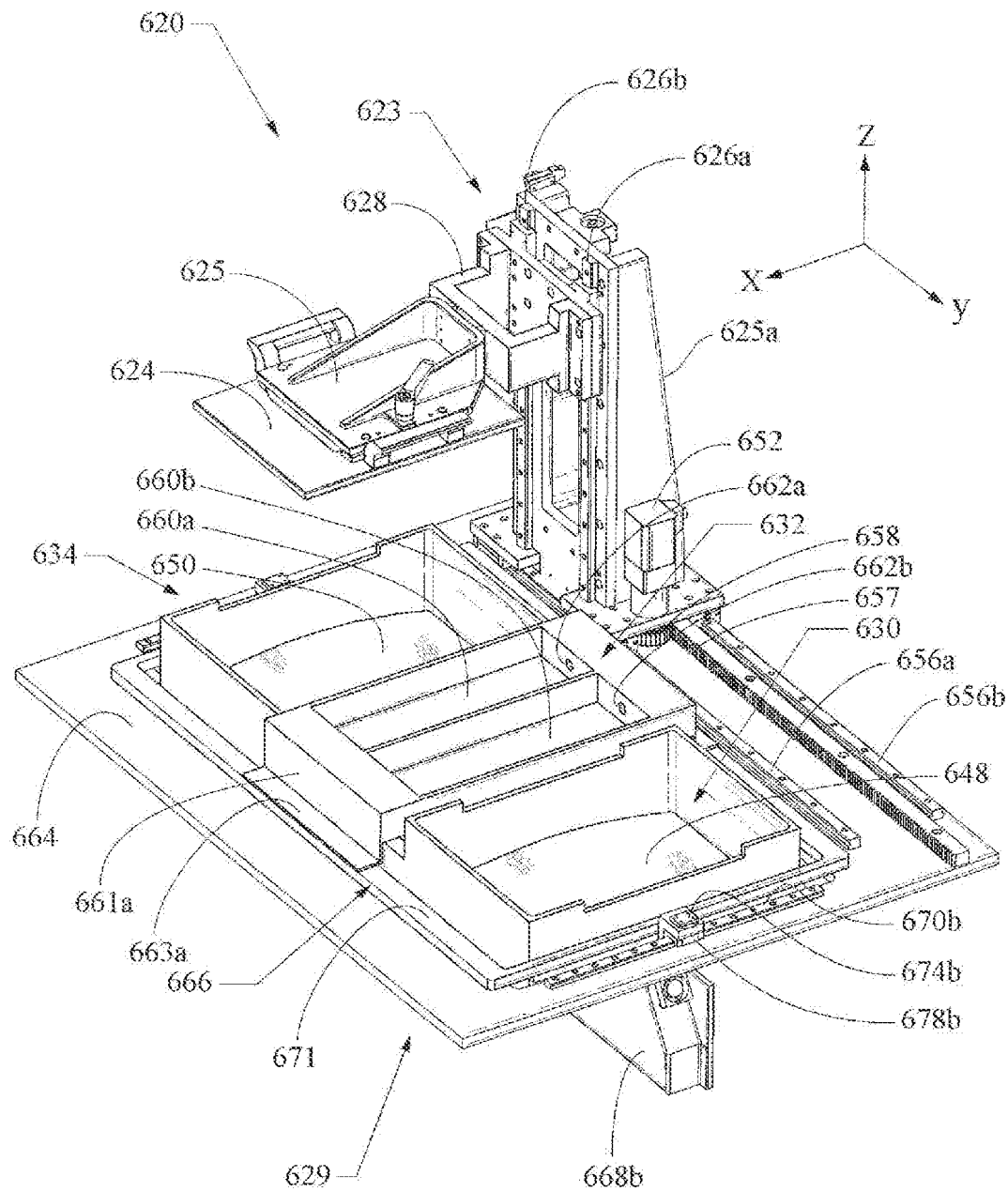
FIG. 32 is a perspective view of a fourth alternate embodiment of a system for making a three-dimensional object from multiple solidifiable materials.

The side walls 682b and 684b along with side connecting walls 688a and 688b define an enclosure 649 in which cleaning station 632 may be placed as shown in FIG. 32. As shown in FIG. 35, enclosure 649 may have no top or bottom. Alternatively, a bottom may be provided. More specifically, cleaning station 632 may be positioned with its horizontal support sections 663a and 663b positioned outwardly of enclosure 649 and over connecting walls 688a and 688b. In this configuration, the connecting walls 688a and 688b restrain the movement of the cleaning station 632 in the x-axis direction, while side walls 684a and 682b of the solidifiable material container assemblies 630 and 634 restrain the movement of the cleaning station 632 in the y-axis direction. Thus, cleaning station 632 is easily removed from enclosure 649 for cleaning or replacement. In another example, a single piece of integrally formed material is used as the rigid or semi-rigid transparent solidification substrates 648 and 650, thus providing a bottom for the enclosure 649.

Figure 34:
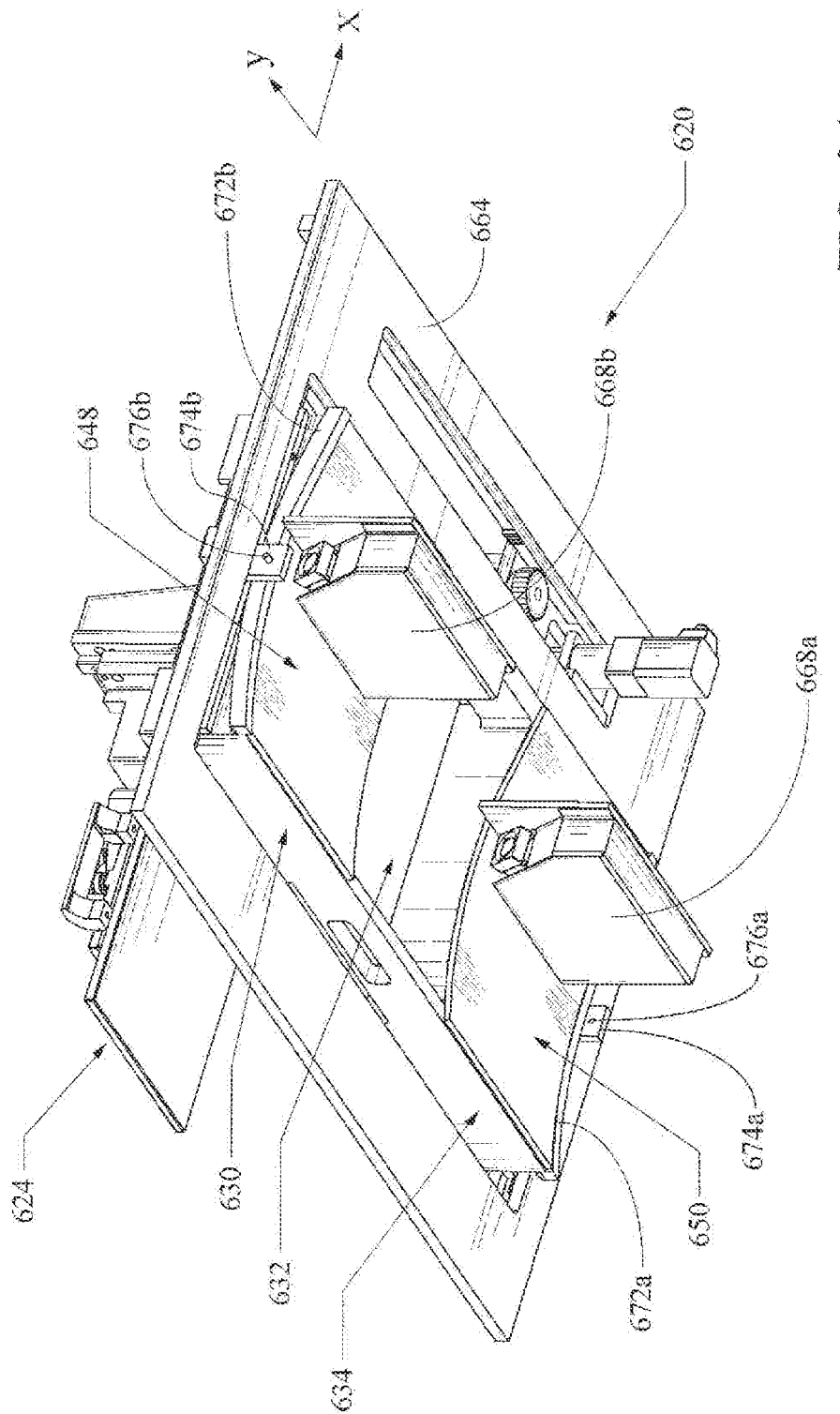
FIG. 34 is a bottom perspective view of the system of FIG. 32.

As best seen in FIG. 34, solidification devices 668a and 668b are provided as part of system 620. Solidification devices 668a and 668b may be pattern generators of the type described previously. However, in certain examples, and as illustrated in the figure, they are linear solidification devices that are movable in the x-axis direction. Suitable linear solidification devices include arrays of imaging elements (e.g., LED arrays) as well as linear solidification devices comprising a selectively activatable laser source in optical communication with a rotating light deflector. In the specific example of FIG. 34, each solidification device 668a and 668b is configured in the same manner as linear solidification device 446 illustrated in FIGS. 29A-C. Solidification devices 668a and 668b are also connected to a drive system (not shown) that moves them in the y-axis direction, preferably in response to a control signal from a control unit. In certain examples, solidification devices 668a and 668b include blue light laser diodes as solidification energy sources that are in optical communication with respective rotating light deflectors.

Solidification devices 668a and 668b are spaced apart from one another in the y-axis direction. As they travel in the x-axis direction, they progressively project solidification energy in the y-axis direction through their respective solidification substrates 648 and 650, causing the solidifiable materials contained in the corresponding solidification material container assemblies 630 and 634 to solidify in contact with the substrates 648 and 650. In the example of FIG. 34, the solidified material is separated from the rigid or semi-rigid transparent solidification substrates 648 and 650 by rocking the substrates 648 and 650 relative to build platform 624 and a three-dimensional object formed thereon.

The rocking of the substrates 648 and 650 is caused by the engagement of cam followers 676a and 676b (FIG. 34) with their respective cams 672a and 672b. In the example of FIG. 34, cam followers 676a and 676b are rollers that traverse the surface of cams 672a and 672b. Each solidification device 668a and 668b is connected to a respective bracket 674a and 674b to which the cam followers 676a and 676b are respectively connected. As best seen in FIG. 32, each bracket 674a and 674b is connected to a respective linear bearing 678a (not shown) and 678b which in turn engages a respective rail 670a and 670b (FIGS. 33A-D). The engagement of the linear bearings 678a and 678b with their respective rails 670a and 670b allows the corresponding solidification device 668a and 668b to slide along the rail 670a and 670b.

As the cam followers 676a and 676b traverse their respective cams 672a and 672b, they exert an upward force against the lower most cam surfaces (i.e., the surfaces of cams 672a and 672b facing away from work table 664 in the build (z) axis direction) in the build (z) axis direction. At the midpoint along the length of the cams 672a and 672b, there is substantially no tilting of the rigid or semi-rigid solidification substrates 648, 650. However, at the endpoints of the cams 672a and 672b, the tilting reaches a maximum due to the curvature of the cams 672a and 672b in the x-axis direction.

To further facilitate the separation of the rigid or semi-rigid transparent solidification substrates 648 and 650 from solidifiable material that has solidified in contact with the substrates 648 and 650, the substrates 648 and 650 are curved in the x-axis direction (i.e., the direction of tilting). In certain examples, the degree of curvature of the substrates 648 and 650 is substantially equal to the curvature of the corresponding cam 672b and 672a. Accordingly, in the illustrated embodiment, as the solidification devices 668a and 668b move in the x-direction, they cause a tilting of the substrates 648 and 650b in the x-axis direction that is dependent on the x-axis location of the solidification devices 668a and 668b along cams 672a and 672b.

At any one time, only one solidifiable material container assembly 630 and 634 will be in use, depending on the position of the build platform 624 along the y-axis. The system 620 for making a three-dimensional object from multiple solidifiable materials may be configured so that only one solidification device 668a and 668b moves in the x-axis direction at any one time. However, in cases wherein the solidifiable material container assemblies 630 and 634 are connected (as in FIG. 35), it may be desirable to have the two solidification devices 668a and 668b move together in the x-axis direction even though only one of them will be projecting solidification energy at a given time. Otherwise, the connected solidifiable material container assemblies 630 and 634 may tilt unevenly.

A method of using the system 620 of FIGS. 32-36 to make a three-dimensional object from multiple solidifiable materials will now be described. In accordance with the method, a first solidifiable material is provided in solidifiable material container assembly 630 and a second solidifiable material is provided in solidifiable material container assembly 634. Build platform 624 is moved in the y-axis direction to the position shown in FIG. 33a (starting from the position shown in FIG. 32) and then moved downward in the z-axis direction until it is spaced apart from the rigid or semi-rigid solidification substrate 648 by a desired thickness of the solidifiable material contained in solidifiable material container assembly 630.

Figure 33A:
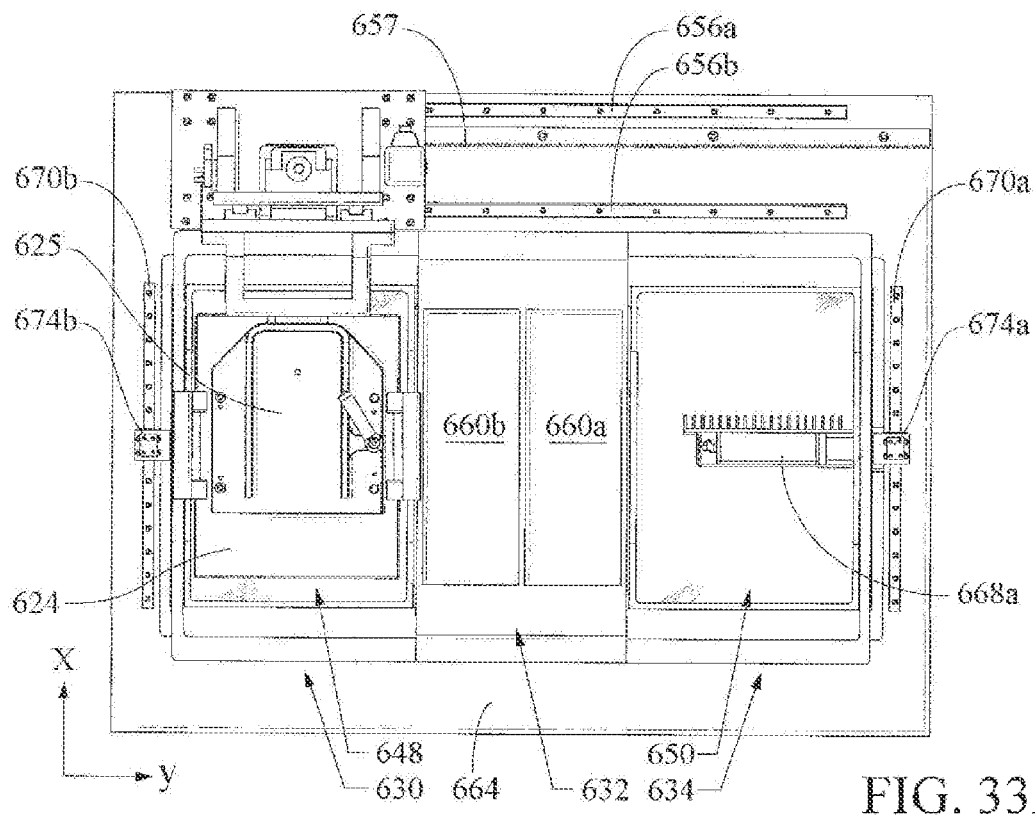
FIG. 33a is a top plan view of the system of FIG. 32 in a first configuration.

Solidification device 668b is then initialized to a position at one end of the cam 672b along the x-axis direction. A control unit activates a drive system to move the solidification device 668b in the x-axis direction, and solidification device 668b scans solidification energy in the y-axis direction as it moves in the x-axis direction. As discussed previously, each facet of a rotating solidification energy deflector (e.g., facets 464a-f of rotating energy deflector 462 in FIG. 29C) will correspond to a single scan. Thus, a series of generally linear scanned regions is provided, with each linear region extending along the y-axis direction and the set of linear scanned regions extending along the x-axis direction. At any given x-axis location, the solidification energy source (e.g., source 460 from FIGS. 29B-29C) will be selectively activated in a manner that corresponds to the desired y-axis profile of the three-dimensional object at that x-axis location. As the solidification device 668b moves in the x-axis direction, the engagement of cam follower 676b and cam 672b causes the rigid or semi-rigid solidification substrate 648 and its solidifiable material container assembly 630 to tilt along the x-axis relative to the x-y plane to separate solidified material from substrate 648. While undergoing this first solidification operation, the system 620 will appear (as viewed from above) as shown in FIG. 33A.

Once the solidification device 668b makes a full traverse of the cam 672b, build platform 624 will be moved upward by an amount sufficient to allow fresh liquid to flow beneath the lower-most exposed surface of the three-dimensional object (not shown). The process then repeats itself as solidifiable material is progressively solidified and the object grows in the build (z) axis direction.

Figure 33B:
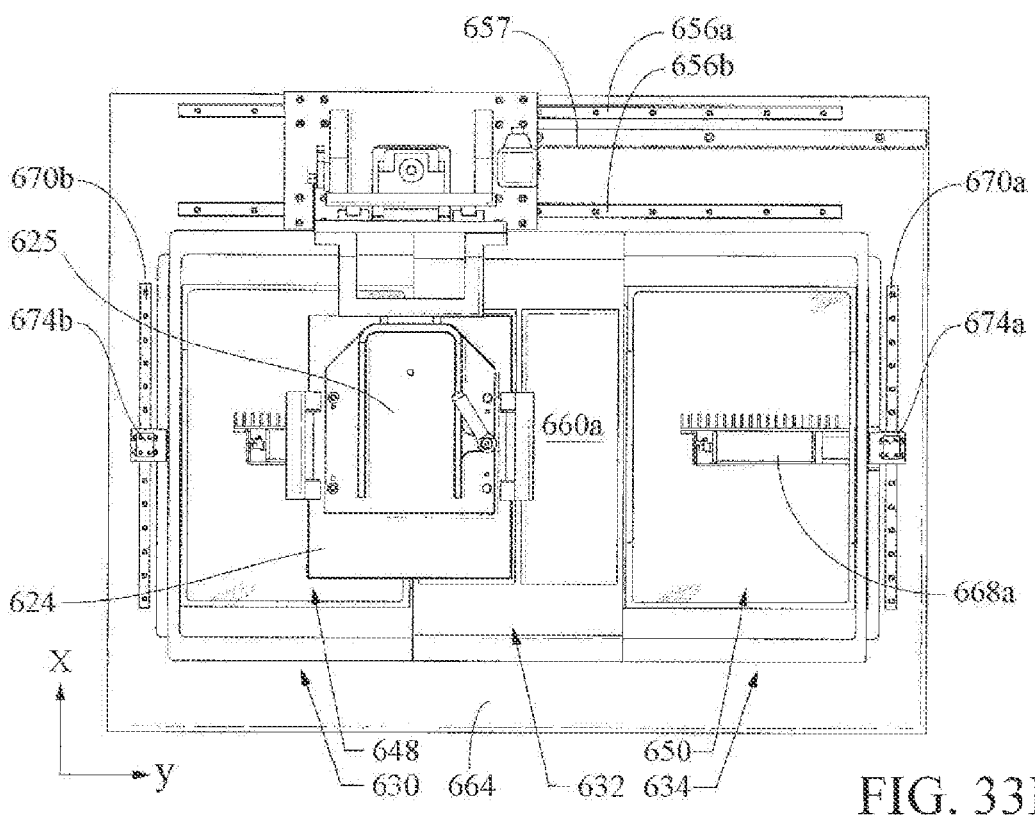
FIG. 33b is a top plan view of the system of FIG. 32 in a second configuration.
Figure 33C:
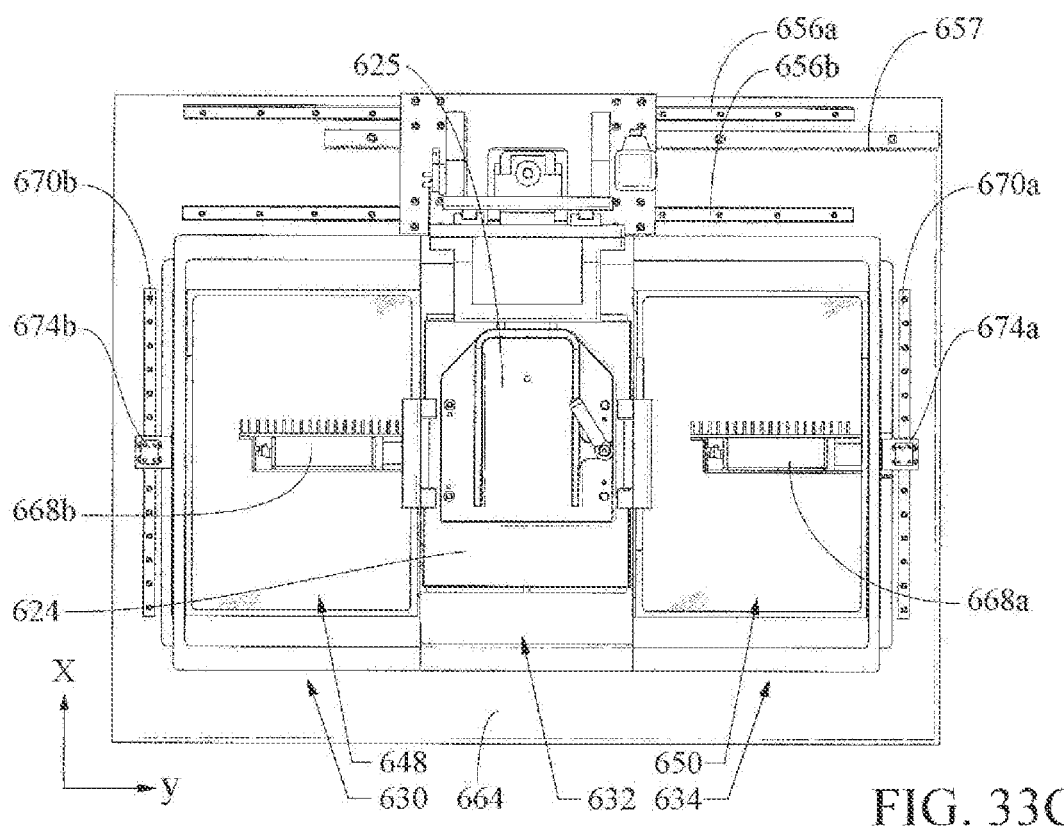
FIG. 33c is a top plan view of the system of FIG. 32 in a third configuration.

At some point in the process, it is desirable to switch solidifiable materials. Motor 652 is then activated to cause pinion gear 658 to engage rack gear 657, thereby moving the build platform 624 along the y-axis direction from the position shown in FIG. 33A to the position shown in FIG. 33B. In the position of FIG. 33B, build platform 624 is placed proximate to or in contact with an upper surface (e.g., a mesh air-permeable surface) of vacuum section 660b. As shown in the figure, in certain examples, only a portion of the build platform can extend over the vacuum section 660b in the y-axis direction, depending on the dimensions of the build platform 624 and the vacuum section 660b. While in this position, a subatmospheric pressure is applied to the interior of vacuum section 660b to remove residual liquid on a first portion of the solidified object surface. The motor 652 is then again activated to move the build platform 624 along the y-axis direction to the position shown in FIG. 33C so that a second portion of the object may come into fluid communication with the vacuum section 660b for cleaning. Once in this position, a subatmospheric pressure is again applied to the interior of vacuum section 660b to remove residual liquid from the second portion of the object surface. Thus, in the method illustrated by FIGS. 33B-C, two cleaning operations are carried out in vacuum section 660b on two portions of the object which are adjacent one another in the y-axis direction.

Figure 33D:
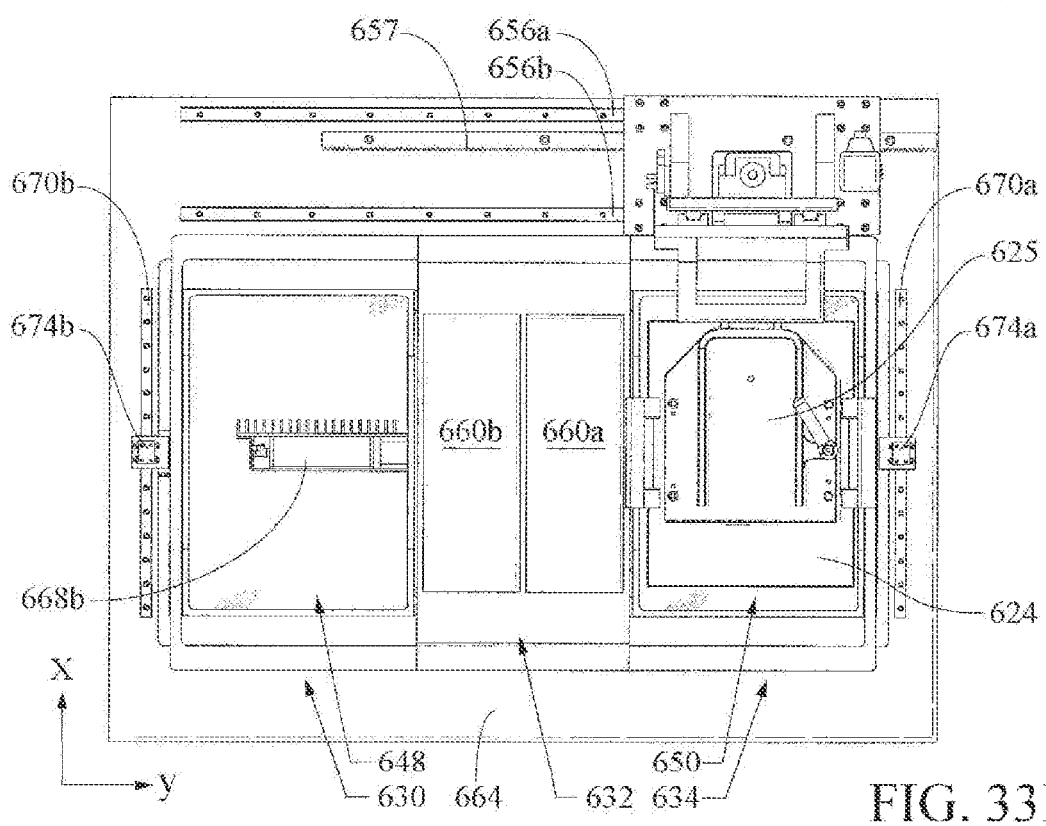
FIG. 33d is a top plan view of the system of FIG. 32 in a fourth configuration.

Motor 652 is then activated to move build platform 624 into the position shown in FIG. 33D. Solidifiable material container assembly 634 is filled with a second solidifiable material that may be different from the material provided in solidifiable material container assembly 630. In certain examples, one of the two solidifiable materials is used to form supports and the other is used to form a finished object to which the removable supports are initially connected, as described previously.

Once in the position shown in FIG. 33D, the build platform 624 is lowered in the build (z) axis direction to a desired distance from the rigid or semi-rigid transparent solidification substrate 650. Solidification device 668a is then initialized to a position along the cam 672a and is moved in the x-axis direction. As solidification device 668a moves in the x-axis direction, solidification energy is scanned in the y-axis direction in a manner that corresponds to the desired object shape, as explained previously with respect to solidification device 668a.

The process then repeats itself until a desired amount of the solidifiable material provided in solidifiable material container assembly 634 has been added. The build platform 624 is moved in the y-axis direction so that the object is in fluid communication with vacuum station 660a. The vacuum station 660a is then activated to remove liquid from the object. The object may be placed in contact with vacuum section 660a in two steps, so that two-portions of the object are sequentially cleaned by vacuum section 660a. If desired, the build platform 624 may be moved in the y-axis direction again to apply solidifiable material in solidifiable material container assembly 634 to the object. Otherwise, the process terminates, and the build platform 624 is lifted in the build (z) axis direction so that the build platform 624 may be removed from support 625. The object is then removed from the build platform 624.

Figure 37:
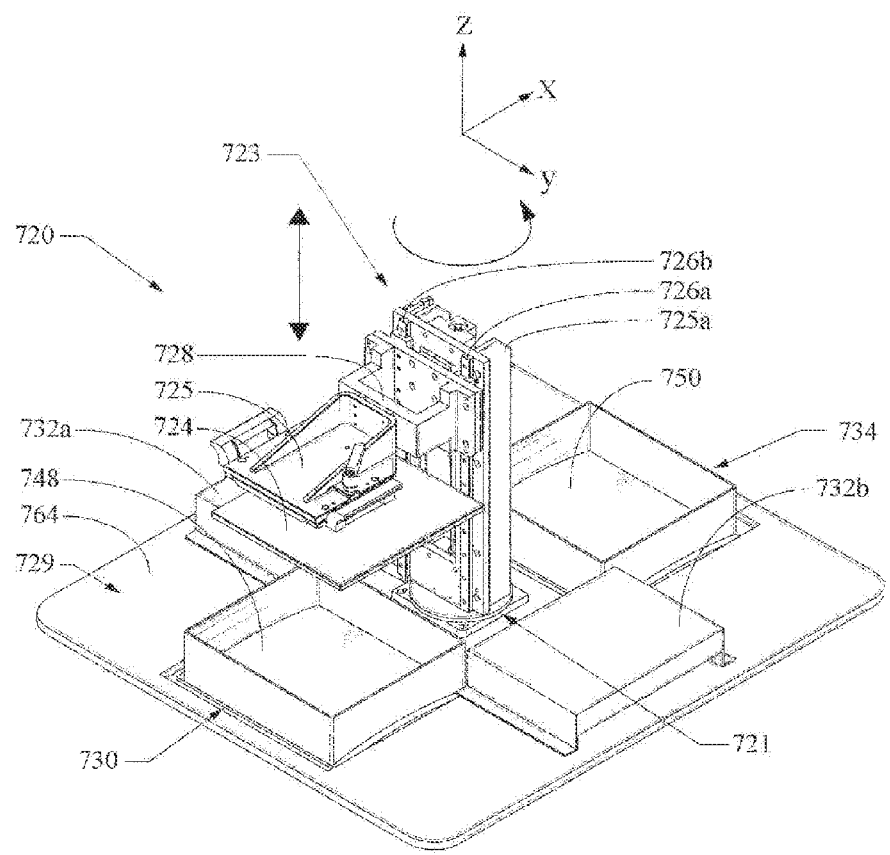
FIG. 37 is a perspective view of a fifth alternate embodiment of a system for making a three-dimensional object from multiple solidifiable materials.
Figure 38:
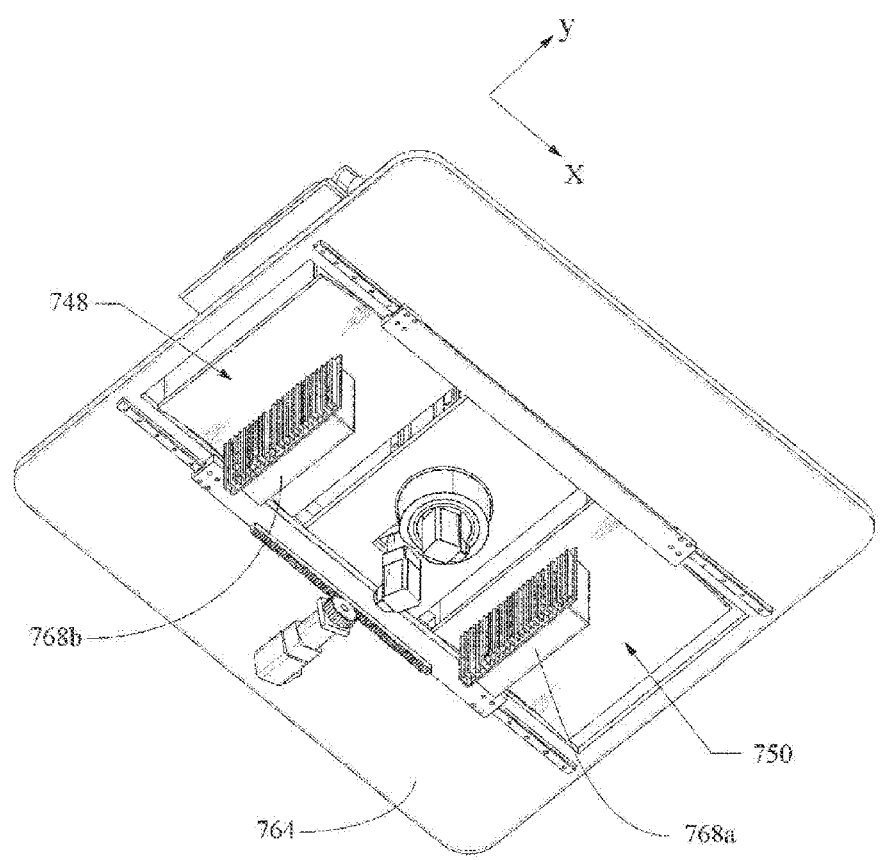
FIG. 38 is a bottom perspective view of the system of FIG. 37.
Figure 39:
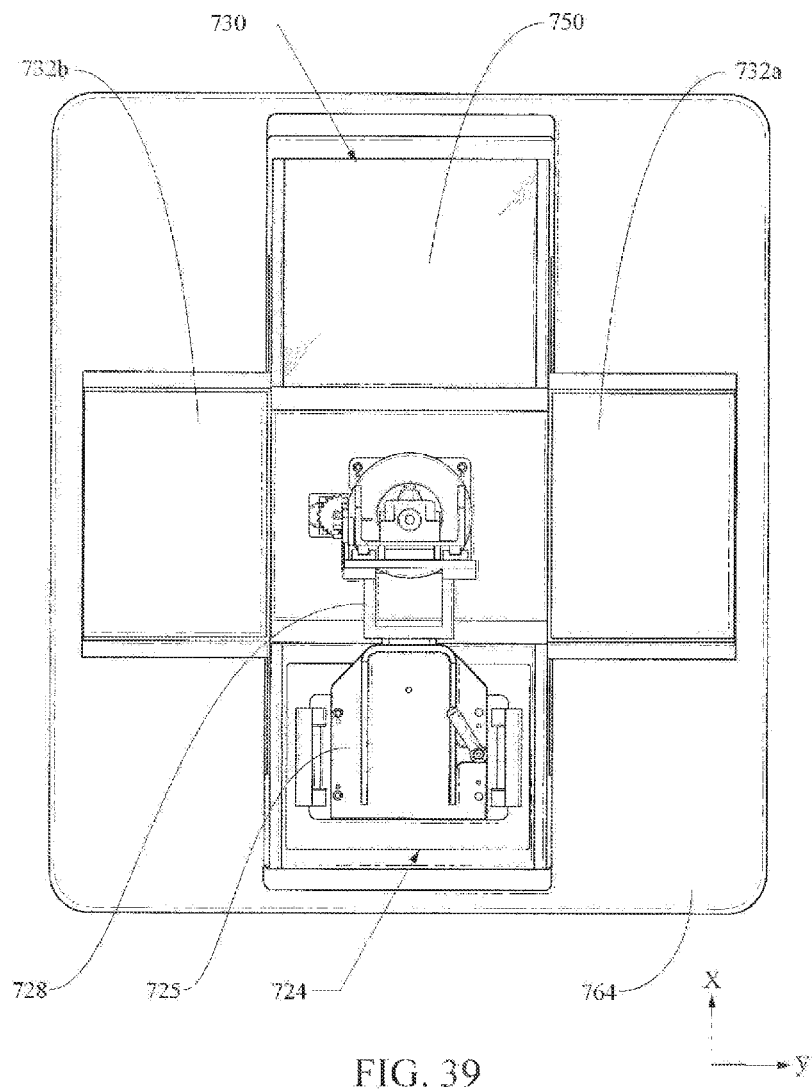
FIG. 39 is a top plan view of the system of FIG. 37.

Referring to FIGS. 37-39, a fifth alternate embodiment of a system for making a three-dimensional object from multiple solidifiable materials is depicted. System 720 comprises a solidifiable material assembly 729, a build platform 724, and a build platform drive assembly 723. In this embodiment, build platform 724 is movable along the direction of the build (z) axis and is also rotatable in a rotational direction around the build (z) axis (i.e., rotatable within the x-y plane perpendicular to the build (z) axis).

Solidifiable material assembly 729 comprises first and second solidifiable material container assemblies 730 and 734, which act as sources of corresponding solidifiable materials and are spaced apart from one another in a direction perpendicular to the build (z) axis, which in this embodiment is the x-axis. Solidifiable material assembly 729 also includes cleaning stations 732a and 732b which are spaced apart from one another in a direction perpendicular to the build (z) axis and in a direction perpendicular to the direction in which the solidifiable material container assemblies 730 and 734 are spaced apart, which in this embodiment is the y-axis. As the build platform 724 rotates about the build (z) axis in the direction of rotation from the position shown in FIG. 37, it sequentially arrives at cleaning station 732b, solidifiable material container assembly 734, cleaning station 732a, and back to solidifiable material container assembly 730.

The cleaning stations 732a and 732b may be configured in the same manner as any of the cleaning stations 32, 132, 232a-d, 332, and 632 previously described. In one particular example, each of the cleaning stations 732a and 732b is a vacuum station with an air permeable upper surface and a hollow interior that is selectively maintainable at a subatmospheric pressure.

The solidifiable material container assemblies 730 and 734 may be configured similarly to solidifiable material container assemblies 30, 34, 130, 134, 630, 634. As shown in FIG. 38, solidification devices 768a and 768b are provided. One or both of the solidification devices 768a and 768b may be configured as a pattern generator. In the example of FIG. 38, solidification devices 768a and 768b are linear solidification devices comprising a solidification energy source (e.g., a laser) in optical communication with a rotating solidification energy deflector in the same manner as described earlier with respect to linear solidification device 446 of FIGS. 29A-29C. Although not shown in FIG. 38, each solidification device 768a and 768b is operatively connected to a drive system that translates the solidification device 768a and 768b in the x-axis direction, toward and away from the build platform build (z) axis drive assembly 723. Although not depicted, in certain examples each solidifiable material container assembly 730 and 734 includes cams spaced apart in the y-axis direction which have the profile of cams 672a and 672b of FIGS. 34-35. Thus, solidifiable material container assemblies 730 and 734 provide the same tilting mechanism for separating solidified material from rigid or semi-rigid transparent solidification substrates 748 and 750 as described for system 620. As the solidification devices 768a and 768b move in the x-axis direction, they progressively provide solidification energy in the y-axis direction to solidify solidifiable material in contact with their respective rigid or semi-rigid transparent solidification substrates 750 and 748, and the solidified sections are peeled from the substrates 750 and 748 via the tilting mechanism. Resilient coatings of the type described previously may be provided on the upward (build (z) axis direction) facing surface of substrates 748 and 750 to facilitate separation of certain solidified solidifiable materials. In addition, non-resilient coatings of the type described previously may be provided. In an alternative implementation, either or both of solidifiable material container assemblies 730 and 734 may comprise polymeric basins or the other alternative structures described with respect to solidifiable material container assemblies 630 and 634, above.

Each solidifiable material container assembly 730 and 734 is mounted in a corresponding opening within work table 764. Build platform drive assembly 723 comprises vertical supports 725a and 725b (not shown) on which rails 726a and 726b are mounted. Bracket 728 is connected to a build platform support 725 which is detachably connected to build platform 724. The vertical supports 725a and 725b (not shown) are mounted on a rotating base 721. Rotating base 721 is connected to a rotational drive system (not shown), which is operatively connected to a rotational motor (not shown).

A method of using the system 720 for making a three-dimensional object using multiple materials will now be described. Referring to FIG. 37, solidifiable material container assemblies 730 and 734 are each filled with respective solidifiable materials. Starting from the position shown in FIG. 37, a solidification operation is commenced. A motor operatively connected to the build platform build (z) axis drive assembly 723 is activated to move the build platform 724 vertically downward in the build (z) axis direction to a specified distance from the rigid or semi-rigid transparent solidification substrate 748. Solidification device 768b is then initialized to a starting position along the x-axis. A motor (not shown) is then activated to energize a drive system (not shown) and move solidification device 768b in the x-axis direction. As solidification device 768b moves in the x-axis direction, it projects solidification energy onto selected locations along the y-axis direction in accordance with the desired shape of the three-dimensional object being formed. As solidification device 768b moves in the x-axis direction, the solidifiable material container assembly 730 and rigid or semi-rigid transparent solidification substrate 748 tilt with respect to build platform 724 and the partially formed object attached to it. Once the solidification device 768b completes a full traversal in the x-axis direction, build platform 724 is moved upward in the build (z) axis direction to allow fresh solidifiable material to flow between it and rigid or semi-rigid transparent solidification substrate 748. The process then repeats itself until the desired amount of the solidifiable material contained in solidifiable material container assembly 730 has been solidified.

At this point, the build platform 724 is elevated in the build (z) axis direction and then rotated around the build (z) axis to cleaning station 732b to perform a cleaning operation. Cleaning station 732b removes residual unsolidified solidifiable material from the surface of the three-dimensional object. In the specific example of FIG. 37, the cleaning station 732b is connected to a source of vacuum that is selectively activated to maintain the interior of cleaning station at 732b at a sub-atmospheric pressure, causing unsolidified solidifiable material to be drawn into the interior of cleaning station 732b. The object may then optionally be exposed to solidification energy to solidify any residual unsolidified solidifiable material on the surface of the object which was not removed during the a liquid removal cleaning operation.

Once the cleaning operation performed by cleaning station 732b is complete, build platform 724 is rotated about the build (z) axis to the solidifiable material container assembly 734 to begin a second solidification operation. The build platform 724 is then lowered to a specified distance from rigid or semi-rigid transparent solidification substrate 750. The position of solidification device 768a is initialized along the x-axis, and a motor (not shown) is activated to move the drive mechanism (not shown) operatively connected to solidification device 768a, which causes the device 768a to begin moving in the x-axis direction. As device 768a moves in the x-axis direction, its solidification energy source is selectively activated to project solidification energy to those locations in the y-axis direction that correspond to the geometry of the three-dimensional object be built. Once the solidification device 768a completes a full traversal in the x-axis direction, build platform 724 is lifted in the build (z) axis direction. The process is repeated until the desired amount of solidifiable material in solidifiable material container assembly 734 has been solidified.

Once the second solidification operation is completed, build platform 724 is rotated about the build (z) axis to the cleaning station 732a, and a second cleaning operation is performed. The object may then optionally be exposed to solidification energy to solidify any residual unsolidified solidifiable material on the surface of the object which was not removed during the cleaning operation.

If desired, build platform 724 is then rotated to the solidifiable material container assembly 730 so that more of the solidifiable material contained in it can be solidified. Otherwise, the build platform 724 is elevated and the build platform 724 is removed from the support 725, after which the three-dimensional object is removed from the build platform 724.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus for manufacturing a three-dimensional object by solidifying multiple solidifiable materials, comprising:
    a first solidifiable material source comprising a first container having a transparent bottom and containing the first solidifiable material;
    a pattern generator selected from a digital light projector and a linear solidification device;
    a second solidifiable material source comprising a second container having a transparent bottom and containing the second solidifiable material, wherein the second solidifiable material source is spaced apart from the first solidifiable material source in a first direction defining a first axis and the second solidifiable material is different from the first solidifiable material; and
    a build platform movable along a second direction defining a second axis, wherein the build platform and the pattern generator are fixed relative to one another along the first axis, thereby maintaining a fixed registration between the build platform and the pattern generator along the first axis, the first and second containers are translatable along the first axis relative to the build platform such that a select one of the first and second containers is alignable with the pattern generator along the first axis at a given time, and during an object solidification operation, the pattern generator projects solidification energy through at least one of the first container transparent bottom and the second container transparent bottom.

2. The apparatus of claim 1, wherein the build platform is movable along the first axis relative to each of the first solidifiable material source and the second solidifiable material source.

3. The apparatus of claim 1, further comprising a cleaning station between the first solidifiable material source and the second solidifiable material source.

4. The apparatus of claim 3, wherein the cleaning station comprises at least one enclosure with an interior that is selectively maintainable at a sub-atmospheric pressure.

5. The apparatus of claim 1, wherein the first container bottom comprises a first rigid or semi-rigid transparent solidification substrate, and during the object solidification operation the at least one pattern generator projects solidification energy through the first rigid or semi-rigid transparent solidification substrate and moves in a third direction defining a third axis, and as the at least one pattern generator moves in the third direction, the first rigid or semi-rigid transparent solidification substrate tilts.

6. The apparatus of claim 1, wherein the pattern generator is a linear solidification device.

7. The apparatus of claim 6, wherein the linear solidification device comprises a laser source in optical communication with a rotating light reflector.

8. The apparatus of claim 1, wherein the pattern generator is a digital light projector.

9. The apparatus of claim 1, wherein the first container bottom comprises a first rigid or semi-rigid transparent solidification substrate, and the first rigid or semi-rigid transparent solidification substrate is curved in a third direction along a third axis.

10. The apparatus of claim 1, wherein the first container bottom includes a first rigid or semi-rigid transparent solidification substrate having a resilient coating.

11. The apparatus of claim 10, wherein the pattern generator comprises a laser source in optical communication with a rotating light deflector.

12. The apparatus of claim 1, wherein the first container bottom is resilient.

13. The apparatus of claim 12, wherein the first container comprises first resilient sidewalls attached to the first container bottom.

14. The apparatus of claim 12, wherein the second container bottom is resilient.

15. The apparatus of claim 14, wherein the first container comprises first resilient sidewalls attached to the first container bottom and the second container comprises second resilient sidewalls attached to the second container bottom.

16. The apparatus of claim 1, wherein the first container bottom comprises a first rigid or semi-rigid transparent solidification substrate.

17. The apparatus of claim 16, further comprising a first transparent coating on the first rigid or semi-rigid transparent solidification substrate.

18. The apparatus of claim 16, wherein the second container bottom comprises a second rigid or semi-rigid transparent solidification substrate.

19. The apparatus of claim 18, further comprising a first transparent coating on the first rigid or semi-rigid transparent solidification substrate and a second transparent coating on the second rigid or semi-rigid transparent solidification substrate.

20. The apparatus of claim 1, wherein the first container is tiltable to relative to the build platform.

21. The apparatus of claim 20, wherein the second container is tiltable relative to the build platform.

22. The apparatus of claim 1, wherein the first container bottom comprises a first rigid or semi-rigid transparent solidification substrate, and the first container further comprises a first film stretched against the first rigid or semi-rigid solidification substrate.

23. The apparatus of claim 22, wherein the first container comprises a first inner frame and a first outer frame, and a portion of the first film is disposed between the first inner frame and the first outer frame.

24. The apparatus of claim 22, wherein the second container bottom comprises a second rigid or semi-rigid transparent solidification substrate, and the second container further comprises a second film stretched against the second rigid or semi-rigid solidification substrate.

25. The apparatus of claim 24, wherein the first container comprises a first inner frame and a first outer frame, a portion of the first film is disposed between the first inner frame and the first outer frame, the second container comprises a second inner frame and a second outer frame, and a portion of the second film is disposed between the second inner frame and the second outer frame.

* * * * *

UNITED STATES PATENT AND TRADEMARK OFFICE
CERTIFICATE OF CORRECTION

PATENT NO.        : 8,801,418 B2                              Page 1 of 1
APPLICATION NO.   : 13/361803
DATED             : August 12, 2014
INVENTOR(S)       : Ali El-Siblani and Alexandr Shkolnik It is certified that error appears in the above-identified patent and that said Letters Patent is hereby corrected as shown below:

In the Claims

Claim 20, Column 42, Line 49, delete "to" after "tiltable"

Signed and Sealed this
Seventh Day of October, 2014

Michelle K. Lee
*Deputy Director of the United States Patent and Trademark Office*